(12) United States Patent
Hamamoto et al.

(10) Patent No.: US 6,282,611 B1
(45) Date of Patent: Aug. 28, 2001

(54) DIGITAL INFORMATION SYSTEM, DIGITAL AUDIO SIGNAL PROCESSOR AND SIGNAL CONVERTER

(75) Inventors: Nobuo Hamamoto, Tokyo; Minoru Nagata, Kodaira; Masatoshi Ohtake, Ome; Katsutaka Kimura, Akishima; Toshio Sasaki, Hachioji; Hiroshi Kishida, Yokohama; Isamu Orita, Kokubunji; Katsuro Sasaki, Kunitachi; Naoki Ozawa, Akishima; Kazuhiro Kondo, Fuchu; Toshiaki Masuhara, Tokyo; Tadashi Onishi, Hachioji; Hidehito Obayashi, Tokyo; Kiyoshi Aiki; Hisashi Horikoshi, both of Hachioji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/446,278

(22) Filed: May 22, 1995

Related U.S. Application Data

(63) Continuation of application No. 07/727,420, filed on Jul. 9, 1991.

(30) Foreign Application Priority Data

| Jul. 11, 1990 | (JP) | 2-181402 |
| Aug. 8, 1990 | (JP) | 2-208072 |
| Feb. 27, 1991 | (JP) | 3-057972 |
| Feb. 28, 1991 | (JP) | 3-057930 |

(51) Int. Cl.[7] .................................................. G06F 12/00
(52) U.S. Cl. ............................ 711/115; 381/124; 705/57; 380/53; 380/59
(58) Field of Search .................................... 395/164, 800; 381/124; 380/53, 59; 711/115; 705/57

(56) References Cited

U.S. PATENT DOCUMENTS

| 4,667,088 | * | 5/1987 | Kramer et al. | 235/380 |
| 4,698,776 | * | 10/1987 | Shibata | 395/164 |
| 4,772,873 | * | 9/1988 | Duncan | 341/110 |
| 4,791,741 | * | 12/1988 | Kondo | 40/124.1 |
| 4,813,014 | * | 3/1989 | DeBell | 365/45 |
| 4,855,842 | * | 8/1989 | Hayes et al. | 358/342 |
| 5,032,918 | * | 7/1991 | Ota et al. | 358/209 |
| 5,032,927 | * | 7/1991 | Watanabe et al. | 358/335 |
| 5,045,327 | * | 9/1991 | Tarlow et al. | 381/51 |
| 5,173,888 | * | 12/1992 | Ti-Sung | 369/33 |

FOREIGN PATENT DOCUMENTS

| 59100968 | * | 6/1984 | (JP) . |
| 61236222 | * | 10/1986 | (JP) . |
| 6361391 | * | 3/1988 | (JP) . |
| 8808716 | * | 11/1988 | (WO) . |

* cited by examiner

Primary Examiner—Kevin J. Teska
Assistant Examiner—Samuel Broda
(74) Attorney, Agent, or Firm—Antonelli, Terry, Stout & Kraus, LLP

(57) ABSTRACT

In a digital information system for realizing the sale of information or the like having a commercial value in the form of a digital signal, and an audio processor, and signal processor suitably used with the system, when a digital signal is received/delivered, a digital signal source is connected directly to a player for receiving and storing a specified information, which is reproduced by the player independently. A voice interval of a digital audio signal is processed to realize the slow and fast playback. The system includes a data compressor and a data extender of simple configuration. The value of the digital signal received/delivered can be exhibited directly. A selling system is constructed easily, and the player is simple in configuration and easy to operate by anyone. The fast and slow playback are possible without deteriorating the sound quality, and ripples can be greatly reduced against the digital input signal, thereby making possible a faithful data compression of an acoustic signal or the like by a simple configuration. The self-diagnosis function permits the use of a defective memory chip, thereby leading to a very economical system.

37 Claims, 46 Drawing Sheets

( VOICE INTERVAL DELETED )

( VOICE INTERVAL ENLARGED n TIMES )

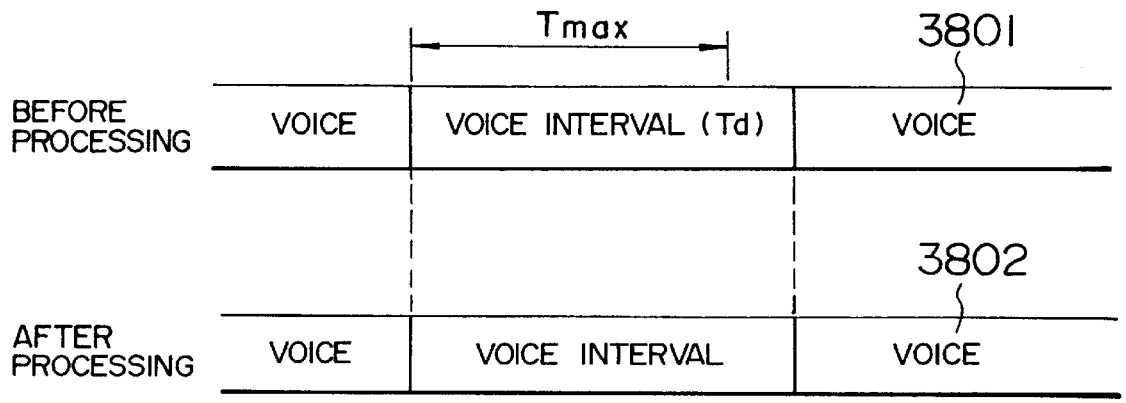
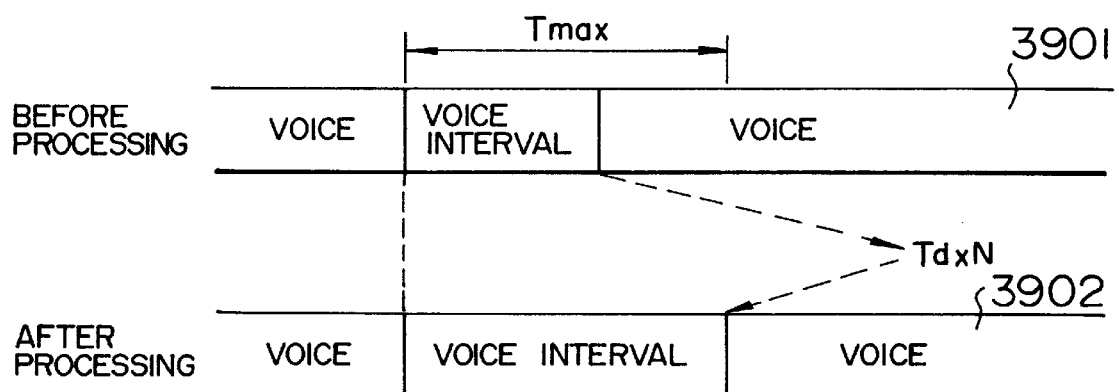
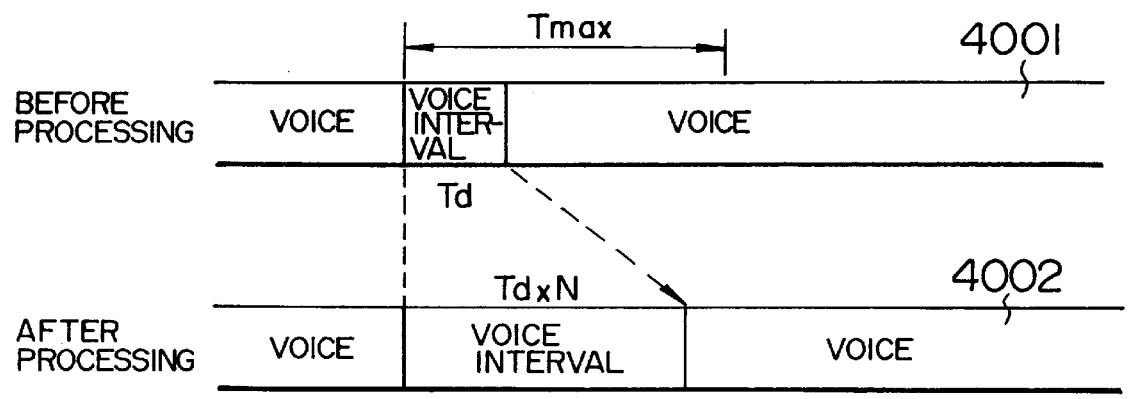

FIG.65

| PIN | NAME | I/O | FUNCTION | PIN | NAME | I/O | FUNCTION |
|---|---|---|---|---|---|---|---|
| 1 | GND | | | 35 | GND | | |
| 2 | D3 | I/O | | 36 | CD1 | O | CARD DETECTION |
| 3 | D4 | I/O | | 37 | D11 | I/O | |
| 4 | D5 | I/O | | 38 | D12 | I/O | |
| 5 | D6 | I/O | | 39 | D13 | I/O | |
| 6 | D7 | I/O | | 40 | D14 | I/O | |
| 7 | CE1 | I | CARD ENABLE | 41 | D15 | I/O | |
| 8 | A10 | I | | 42 | CE2 | I | CARD ENABLE |
| 9 | OE | I | OUTPUT ENABLE | 43 | RFSH | I | REFRESH (FOR PSRAM) |
| 10 | A11 | I | | 44 | RFU | NC | RESERVE |
| 11 | A9 | I | | 45 | RFU | NC | RESERVE |
| 12 | A8 | I | | 46 | A17 | I | |
| 13 | A13 | I | | 47 | A18 | I | |
| 14 | A14 | I | | 48 | A19 | I | |
| 15 | WE/PGM | I | WRITE ENABLE | 49 | A20 | I | |
| 16 | RDY/BSY | O | RDY BSY(EEPROM) | 50 | A21 | I | |
| 17 | VCC | | | 51 | VCC | | |
| 18 | VPP1 | | PROGRAM POWER (EVEN-NUMBERED BYTES) | 52 | VPP2 | | PROGRAM POWER (ODD-NUMBERED BYTES) |
| 19 | A16 | I | | 53 | A22 | I | |
| 20 | A15 | I | | 54 | A23 | I | |
| 21 | A12 | I | | 55 | A24 | I | |
| 22 | A7 | I | | 56 | A25 | I | |
| 23 | A6 | I | | 57 | RFU | NC | RESERVE |
| 24 | A5 | I | | 58 | RFU | NC | RESERVE |
| 25 | A4 | I | | 59 | RFU | NC | RESERVE |
| 26 | A3 | I | | 60 | RFU | NC | RESERVE |
| 27 | A2 | I | | 61 | REG | I | ATTRIBUTE MEMORY SELECTION |
| 28 | A1 | I | | 62 | BVD2 | O | BATTERY VOLTAGE DETECTION |
| 29 | A0 | I | | 63 | BVD1 | O | |
| 30 | D0 | I/O | | 64 | D8 | I/O | |
| 31 | D1 | I/O | | 65 | D9 | I/O | |
| 32 | D2 | I/O | | 66 | D10 | I/O | |
| 33 | WP | O | WRITE PROTECT | 67 | CD2 | O | CARD DETECTION |
| 34 | GND | | | 68 | GND | | |

FIG. 66

| ITEM | | SIGNAL | MEMORY CARD | SYSTEM | MEMORY CARD OUTPUT FORMAT |
|---|---|---|---|---|---|
| CONTROL SIGNAL | | CE1 CE2 REG | PULL UP TO VCC R≧10KΩ | — | — |
| | | OE WE/PGM | PULL UP TO VCC R≧10KΩ, OR NO RESISTANCE | — | — |
| | | RDY/BSY | — | PULL UP | NOT DETERMINED |
| | | RFSH | NC | — | — |
| ADDRESS | | A0-A25 | PULL DOWN TO GND R≧100KΩ, OR NO RESISTANCE | — | — |
| DATA BUS | | D0-D15 | PULL DOWN TO GND R≧100KΩ, OR NO RESISTANCE | — | THREE-STATE |
| CARD DETECTION | | CD1 CD2 | CONNECT CARD GND | PULL UP | CONNECT TO GND IN MEMORY CARD |
| WRITE PROTECTION | | WP | — | — | "H" OR "L" |
| BATTERY VOLTAGE DETECTION | | BVD1 BVD2 | — | PULL UP | "H" OR "L" |
| RESERVE PIN | | RFU | NC | NC | — |

DIGITAL INFORMATION SYSTEM, DIGITAL AUDIO SIGNAL PROCESSOR AND SIGNAL CONVERTER

This application is a continuation application of Ser. No. 07/727,420, filed Jul. 9, 1991.

BACKGROUND OF THE INVENTION

The present invention relates to a digital information system, a digital audio signal processor and a signal converter, such as a digital information system for realizing the sale or supply of specified audio data or the like by transmitting it to a specified person in the form of an electrical signal, an audio signal processor and a signal converter suitable for the system, and a technique applicable for use in a data compressing and expanding circuit.

As a conventional example of commercialized information, there is a newspaper or magazine in which characters or the like are printed on paper as a medium. The paper used in this way may be replaced by various types of software stored on a memory medium, such as a floppy disk or an IC card. Another example is a communication network, such as cable television or satellite broadcasting, for supplying news or broadcast programs to specified subscribers.

Further, a portable computer, which differs from the conventional notebook-type personal computer or "electronic notebook", but which can easily send a message to another person, access a data base, or process information without being restricted by time or place, has been suggested in "Nikkei Electronics", Nov. 26, 1990, pp.116 to 124. This system proposes data transmission to a portable terminal through a public telephone or FM broadcasting or by the sale of IC cards at bookstores or station booths.

Also, a system for transmitting and receiving information is disclosed in JP-A-63-61391.

Furthermore, JP-A-61-236222 suggests a digital-to-analog converter that can be realized by a digital circuit.

In the case where information is commercialized and sold as an item which uses paper as a such as newspapers or magazines, the printing and transportation take a long time, which not only makes the system unsuitable for timely sale of information, but also adversely affects the earth's environment by deforestation to provide the materials for making paper and by the dispensing of garbage in the disposing of the paper. In the case where a IC card or floppy disk is used as a medium, such as for an electronic notebook or the like, a terminal device, such as the electronic notebook or personal computer, is needed. In addition, these terminal devices presuppose a capability for information processing, such as in the electronic notebook, so that the operation thereof is comparatively complicated and difficult in application, thereby preventing general extension of the use thereof. Also, in the case where a great amount of data are distributed through FM broadcasting, it is troublesome to select desired information, and this is also true of the satellite or cable television broadcasting, where even unnecessary information is received under a blanket contract.

SUMMARY OF THE INVENTION

Accordingly, the present inventors have developed a digital information system which makes it possible to deliver and receive information in the same form as general commodities as an electrical signal, while at the same time reproducing the received information using an ultrathin portable memory card having a playback function, and a digital audio signal processor and a signal converter suitably used therewith.

An object of the present invention is to provide a digital information system capable of realizing the sale of commercial information in the form of digital signal.

Another object of the present invention is to realize transfer of digital signals between a digital signal source and a memory card with a playback function, at a rate at least higher than the signal to be processed in the digital information system.

Still another object of the present invention is to provide a terminal device suitable for the above-mentioned digital information system.

A further object of the present invention is to provide a method and an apparatus for various types of high-quality reproduction of information from a memory card with a playback function suitable for the above-described digital information system.

A still further object of the present invention is to provide a method and an apparatus for efficiently transferring and assuring confidentiality of information in the above-mentioned digital information system.

A typical example of the systems according to the present invention disclosed by the present patent application will be briefly described. In the process of receiving a digital signal, a player of the ultrasmall, ultrathin card type having an earphone, such as a memory card with a playback function is connected to a terminal device as a digital signal source in one-to-one correspondence, so that a specified digital signal can be received and stored in a memory in its original form, and the stored digital signal can be independently reproduced in the player.

In this digital information system, for example, a digital signal is received from a digital signal source and is delivered to a memory card which has playback function at a speed at least higher than that at which the signal is processed. Also, between an original source of digital signals and a digital signal source, a digital signal is received and stored through a communication channel or an appropriate storage medium as required, while at the same time a specified digital signal is received by the connection through a connector with the memory card having a playback function (player). Further, the memory capacity of the terminal device is equal to or greater than that of the memory on the memory card having the playback function, and the terminal device is used with a hard disk memory unit having a comparatively large memory capacity as a backup memory. At the same time, the digital signal frequently received and delivered with the memory card having the playback function or the digital signal updated with the lapse of time is stored in a buffer memory configured as a semiconductor memory accessible at high speed, thereby making possible efficient reception and delivery of information. Furthermore, the storage area of a memory in the memory card with playback function is controlled. In addition, the above-mentioned terminal device realizes a digital information system having the function of audition with a part of designated digital signals reproduced and outputted over a predetermined length of time, and having an ultrasmall, ultrathin memory card with a playback function as the result of slow/fast playback by voice interval control and avoidance of quantizing noises.

The player receives a digital signal in the form of an electrical signal, and independently plays it back, so that the value of the digital signal received can be exhibited in direct form. As a consequence of the usability of a digital signal in direct form, a system for processing, production and sale thereof is configured easily. At the same time, the simple player construction in the form of an ultrasmall, ultrathin card, offers handling ease for every user. By enlarging or extending the voice interval of the digital audio signal substantially, the slow or fast playback is made possible without deteriorating the audio quality.

BRIEF DESCRIPTION OF THE DRAWINGS

FIG. 38 is a schematic diagram for explaining an example of operation of the slow playback circuit shown in FIG. 37;

FIG. 39 is a schematic diagram for explaining another example of operation of the slow playback circuit shown in FIG. 37;

FIG. 40 is a schematic diagram for explaining still another example of operation of the slow playback circuit shown in FIG. 37;

FIG. 65 is a table showing the pin arrangement of a memory card according to the JEIDA standard;

FIG. 66 is a table showing signal characteristics of a memory card according to the JEIDA standard;

DESCRIPTION OF THE PREFERRED EMBODIMENTS

Figure 1:
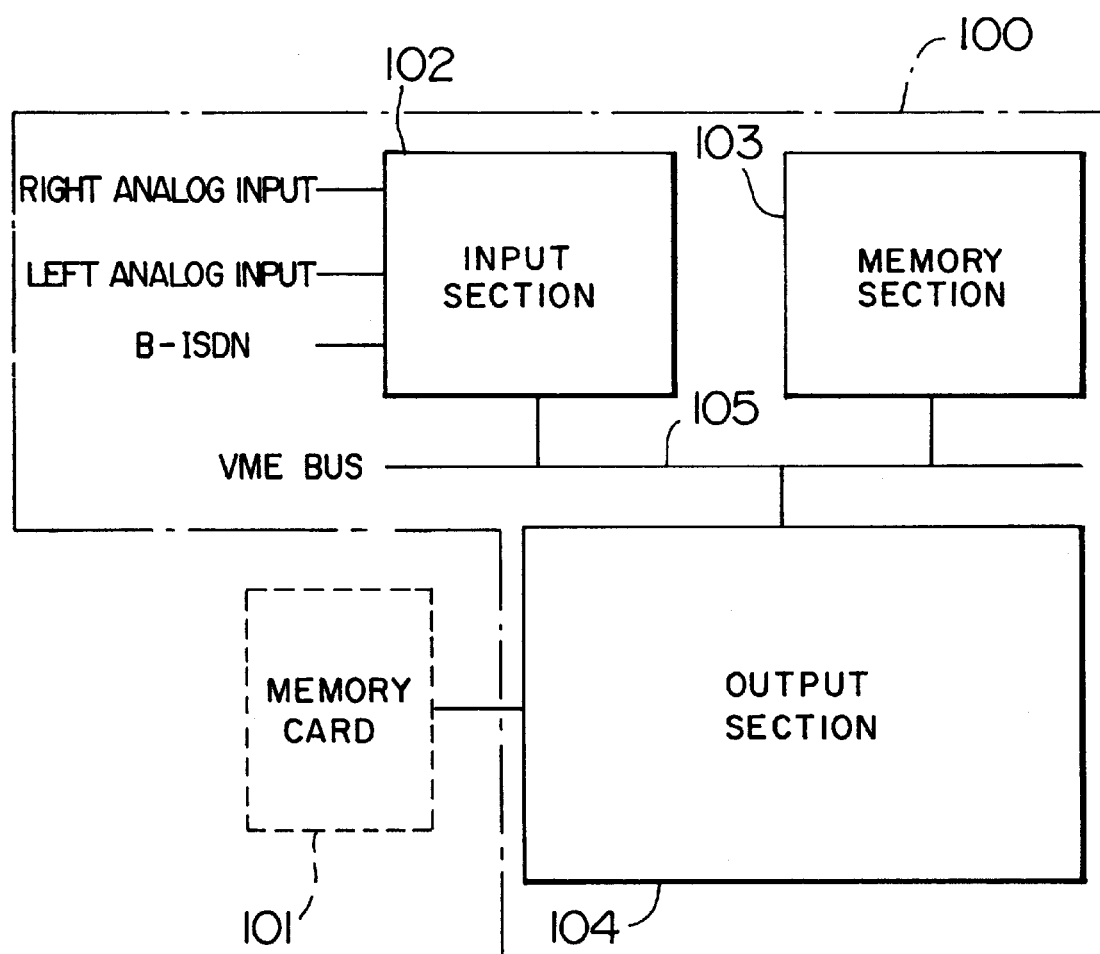
FIG. 1 is a block diagram showing the essential parts of a digital information system according to an embodiment of the present invention.

A block diagram of essential parts of a digital signal transmitting and receiving system according to an embodiment of the present invention is shown in FIG. 1. This embodiment is intended for a system to commercialize and sell information in the form of a digital signal. In other words, the sale of the information is made available as one of the forms of the transmitting and receiving of a digital signal.

FIG. 1 is shown a block diagram of a terminal device of a digital signal selling system. This terminal device 100 may be looked upon as equivalent to a vending machine for cigarettes or soft drinks, such as juice, and functions as an information server. The terminal equipment 100, is connected to an original supplier of a digital signal through a broad band integrated services digital network (B-ISDN) to receive the digital signal as a commodity without specific limitation. As a result of employment of this system, the digital signal is transferred only to a specified terminal device 100 through a communication network in a manner similar to such commodities as cigarettes and juice. In this case, the digital signal as a commodity can be transferred at high speed and carry a great amount of data, free of any traffic jam or air pollution, unlike the case of general commodities. The terminal device 100 may be installed in front of a store, like a station booth, a cigar stand or a book shop.

The terminal device 100 is roughly comprised of an input section 102, a memory section 103 and an output section 104. Each circuit section, which is connected to a VME bus 105, is adapted to receive digital and various control signals. This terminal device 100, which is connected to a memory card 101 which has a built-in reproducing function (hereinafter called "the player"), as shown by a dotted line in FIG. 1, is used to directly receive a specific signal as a commodity.

Figure 2:
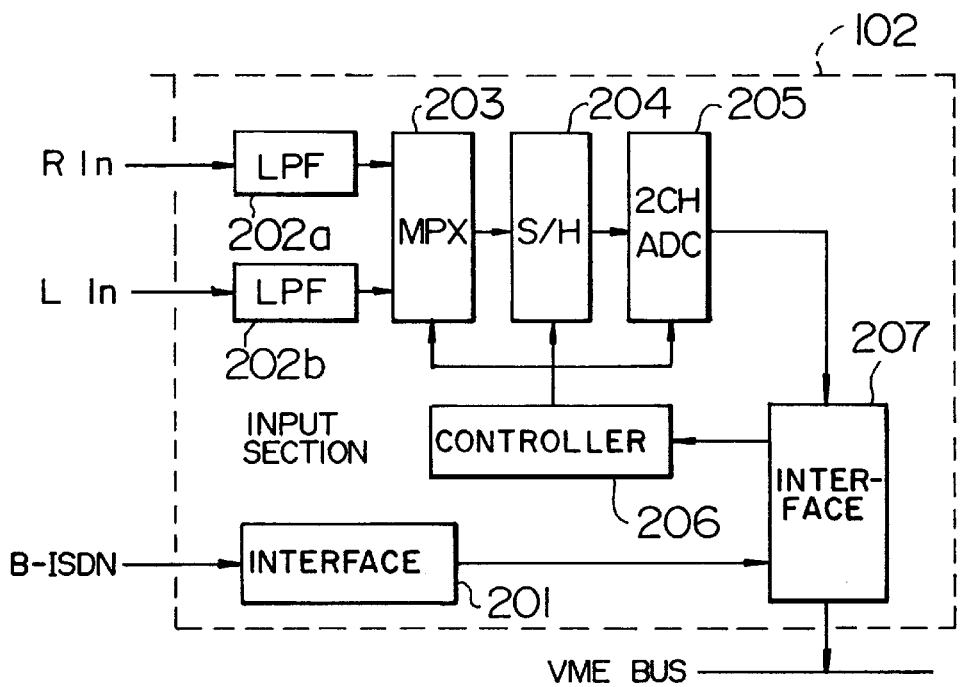
FIG. 2 is a block diagram showing an input section of the terminal device of FIG. 1.

FIG. 2 is a block diagram showing an example of the input section 102 of the terminal device 100. The input section 102 of the terminal device 100 has a VME interface 201 for a broad band integrated services digital network (B-ISDN) and an analog input interface (right and left analog inputs) for receiving an input signal in an analog form. The analog input interfaces are provided with low-pass filters 202a, 202b, associated with the right input Rin and the left input Lin, for eliminating extraneous frequency band components contained in the analog input signals Rin and Lin in advance, respectively. These input signals Rin and Lin are alternately selected through a multiplexer 203 with respect to time, introduced to a sample-and-hold circuit 204 and converted into a digital signal by an analog-to-digital converter 205. At this time, the analog-to-digital converter 205 outputs two-channel (stereo) time-shared digital signals of right and left channels in time series, which signals are introduced to the VME interface of the input section 207. Such analog input interfaces are used for digitalizing and storing music programs, regular news, stock market information, various commodity market situations or the like sent by broadcasting in a memory.

A monaural signal is inputted as the above-mentioned right or left input signal. The function may be added to broaden band widths of the low-pass filters 202a, 202b for input signals having broad band widths, such as music, and to narrow the band widths of the low-pass filters 202a, 202b for input signals having narrow band widths, such as news. Reference numeral 206 designates an input section controller, and numeral 201 a network interface corresponding to the B-ISDN.

Each analog input interface may be adapted to receive a message from an automatic answering telephone set by being connected to a telephone line. In such a case, the function of a telephone set may be added to the terminal device 100 connected with the automatic answering telephone set to receive a recorded message therefrom. When the analog input interface is used in this way, the message transfer time is undesirably lengthened. If a subscriber to a digital line system uses a digital automatic answering telephone set to store messages in a digital form, the messages recorded can be received in a very short time, and by doing so, the user can confirm the messages at the desired time while being in transportation means or in a like situation.

Figure 3:
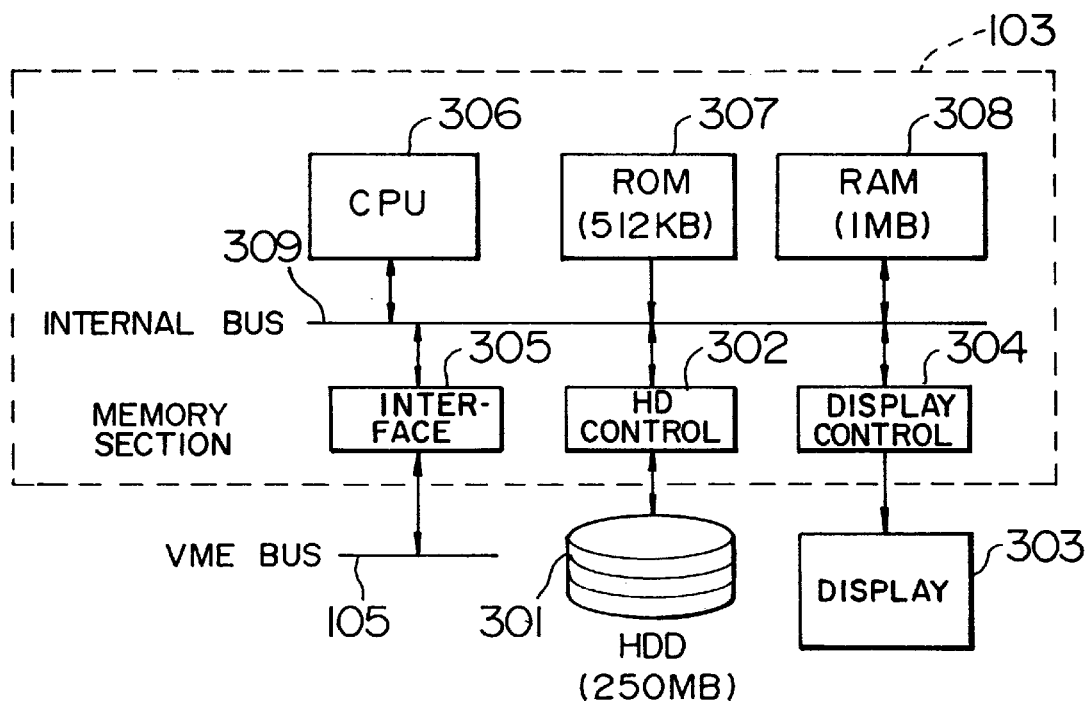
FIG. 3 is a block diagram showing a memory section of the terminal device of FIG. 1.

FIG. 3 is a block diagram showing a structure of an embodiment of the memory section in the terminal device 100. This memory section includes an external memory like a hard disk memory 301, a RAM (random access memory) 308 as a buffer memory, a ROM (read only memory) 307 for storing various programs, and a microprocessor 306 for processing information or performing control operations in accordance with these programs. The programs include the information-processing program for a digital or analog input operation, a data exchange operation with the hard disk memory 301, a display operation of a LCD 303 or a data transfer operation with a player 101 connected to the output section. The RAM 308, though not specifically limited in capacity, has a storage capacity of approximately 1 MB (megabyte as referred to in the same way hereinafter), and the ROM 307 a storage capacity of approximately 512 KB (kilobyte as referred to in the same way hereinafter). The hard disk memory 301, though not specifically limited in capacity, has a storage capacity of approximately 250 MB, and functions as a backup memory in case of power failure or interruption. In addition, it functions like a warehouse for storing a great variety of digital signals. This hard disk memory 301, which is connected to an internal bus 309 through a hard disk controller 302, is adapted to write and read data in response to an instruction from the microprocessor 306.

The LCD 303 is used for displaying an information menu, operating instructions, etc. The surface of the LCD 303 has a touch-key function and is used for selecting one of the displayed menu, display switching, etc. When the player 101 is connected, for example, (1) Music, (2) news, (3) Weather forecasting, (4) Stock market situation, (5) Reading, etc. are displayed as the first information menu on the display screen. If one of them, say, (2) News is selected, the screen is shifted to display (1) NHK, (2) FEN, (3) Traffic information, (4) Sports, etc. By designating a desired one of these news programs, a digital signal corresponding to the selected program is received by the player 101.

In a case of (1) Music, for instance, such music categories as classic, popular and jazz are displayed, so that if a specific music category is selected, a name of marketable music is displayed. Such music information, though not specifically limited to a particular storage location, is assumed to be stored in a specific area of the hard disk memory 301 or the ROM 307. When the desired music is not available in the hard disk memory 301, the device 100 is connected to an original supplier of the digital signals through the B-ISDN to transmit a requested music program to the player 101. The LCD 303, which is connected to the internal bus 309 through an LCD controller 304, is used for the above-mentioned display and input operations through the touch keys.

A bus interface 305 is a VME bus interface for connecting the internal bus 309 and the VME bus 105 to each other.

Figure 4:
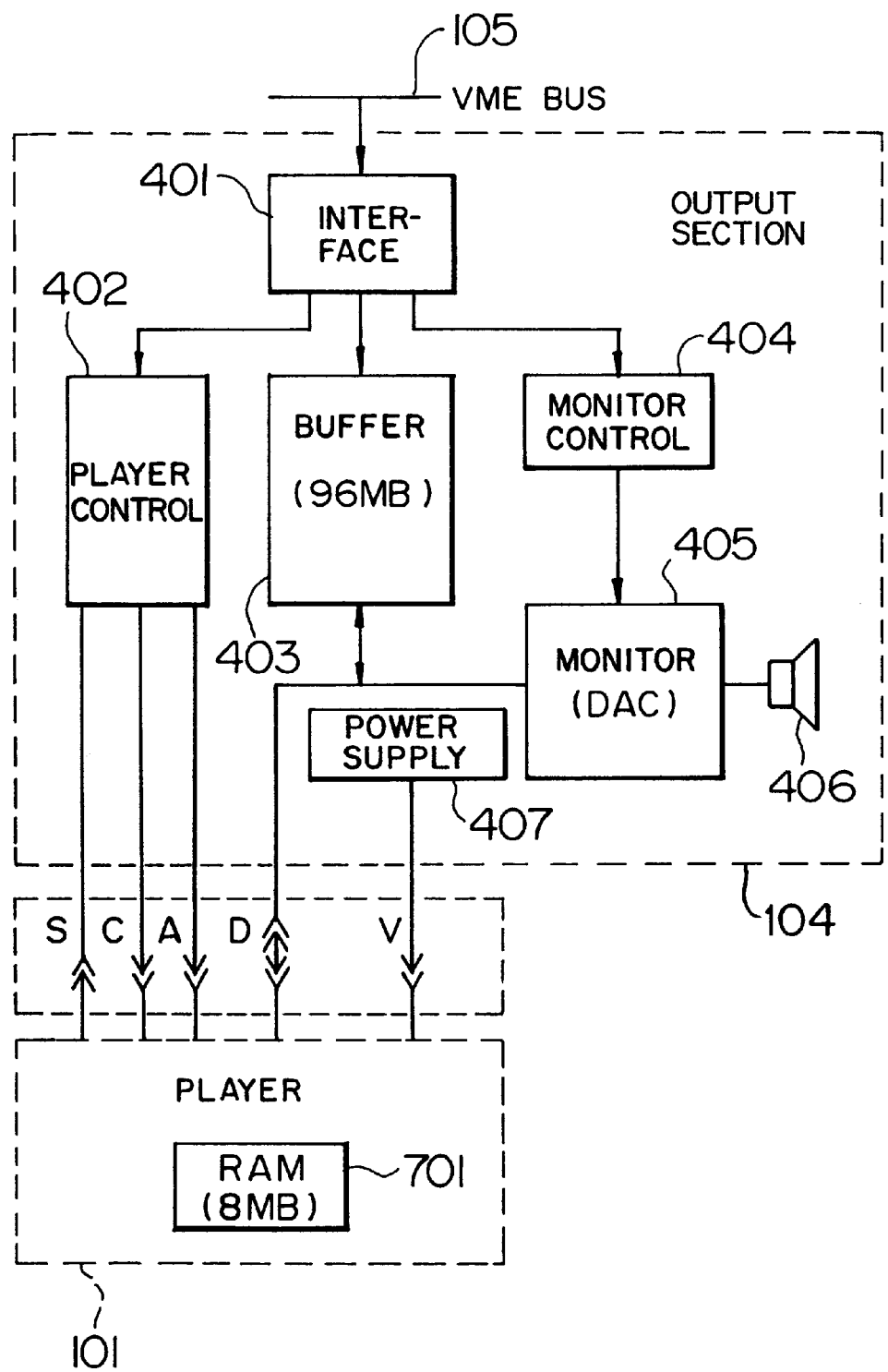
FIG. 4 is a block diagram showing an output section of the terminal device of FIG. 1.

The news, the stock market situation and the like, which are required to be replaced by the latest information as time passes, are stored in a buffer memory 403 included in the output section 104 as seen in FIG. 4. As a result, the information can be directly transferred to the player 101 without accessing the hard disk memory 301 on each occasion. Also, the music program, if large in sales amount, may be stored in the buffer memory 403. In this case, the top ten items in sales volume of each music category may be displayed as a display menu to facilitate selection by the user.

The output section 104 of the terminal device 100 includes a VME interface 401 connected to the VME bus 105, a player controller 402, a buffer memory 403, a monitor controller 404, a monitor 405, etc, as shown in FIG. 4. The output section is connected to the player 101 through a connector for receiving a digital signal as a commodity. The buffer memory 403 has a comparatively large storage capacity of approximately 96 MB, which is equivalent to about ten times as large as the maximum storage capacity 8 MB of the player 101 as described later.

The monitor 405, though not specifically limited, has a speaker 406 and a headphone output and is used for reproducing a starting part of a given music selected from the music program. This function is one like reading a book while standing in a bookstore, and is effective to promote the sale of the invisible digital signal or prevent an error in selection of the digital signal. The output function of the monitor, though not specifically limited, is activated during about ten seconds as a maximum time length only when the touch-key or the like is turned on. As a result, the monitor output is stopped as soon as the object of the selection is achieved, and therefore any wasted time of monitor playback is eliminated. The monitor 405 and the monitor controller 404 used in this configuration are equivalent to those used in the playback circuit of the player 101 described later.

As explained above, cigarettes and juice sold by a vending machine are encased in a package or a container integrally therewith. Commercialized in formation or the like, on the other hand, is sold by use of paper or a floppy disk or an IC memory functioning as a medium package or container. A music program is also offered for sale in a form integrated together with a storage medium, such as magnetic tape or compact disk. These media have no commercial value of their own. Only in combination with an "electronic notebook", a personal computer or the like terminal device, can information be retrievable and processed as a commodity. Also, the value of a music program as a commodity is exhibited only in combination with a cassette tape recorder or other reproducing devices.

In contrast, according to the present invention, a digital signal as a commodity is received in its own form without any intermediary of a storage medium functioning as a container of the type mentioned above. For the purpose of receiving a digital signal, a memory circuit 701 is mounted on the player 101 as described later. A digital signal introduced to this memory circuit 701 can be reproduced through a playback circuit of the player 101. Specifically, the received commodity directly exhibits the value thereof as a commodity. These two features make the present invention conspicuously different from the conventional commodity transactions. Further, according to a system in which the player 101 is connected to the terminal device 100 and in which a digital signal is transmitted and received as a commodity as described above, only the required information is specified and sold when required.

In FIG. 4, numeral 407 designates a power supply, which, though not specifically limited, supplies power from the terminal device 100 to the player 101 for the purpose of transmitting a high-speed digital signal, i.e., to effect a writing operation. Also, in the case where a rechargeable secondary battery is used as a power supply of the player 101 in place of the primary battery, as described later, or in the case where primary and secondary batteries are built in, a digital signal is transferred when the player 101 is connected to the terminal device 100. At the same time, the secondary battery is charged rapidly by the power supply 407. Signals transferred between the output section and the player 101 are an operating voltage V, a digital signal D, an address signal A, a control signal C or a status signal S, etc.

Also, in the cassette tape recorders commercially available at the present time, the time of information storage is equal to that of reproduction thereof in principle. This provides a great problem to the user in an information vending system proposed by the present invention. In a digital signal transmitting, receiving system, if the convenience of the user is taken into consideration, it is desirable to increase the speed of transfer of a digital signal between the terminal device 100 and the player 101 as far as possible. This function can be realized when a memory, a memory controller and data transfer means which can operate at least more rapidly than the signal to be reproduced, are provided in the buffer memory 403 of the terminal device output section 104 and the memory circuit 701 of the player 101 in FIG. 4.

Figure 5:
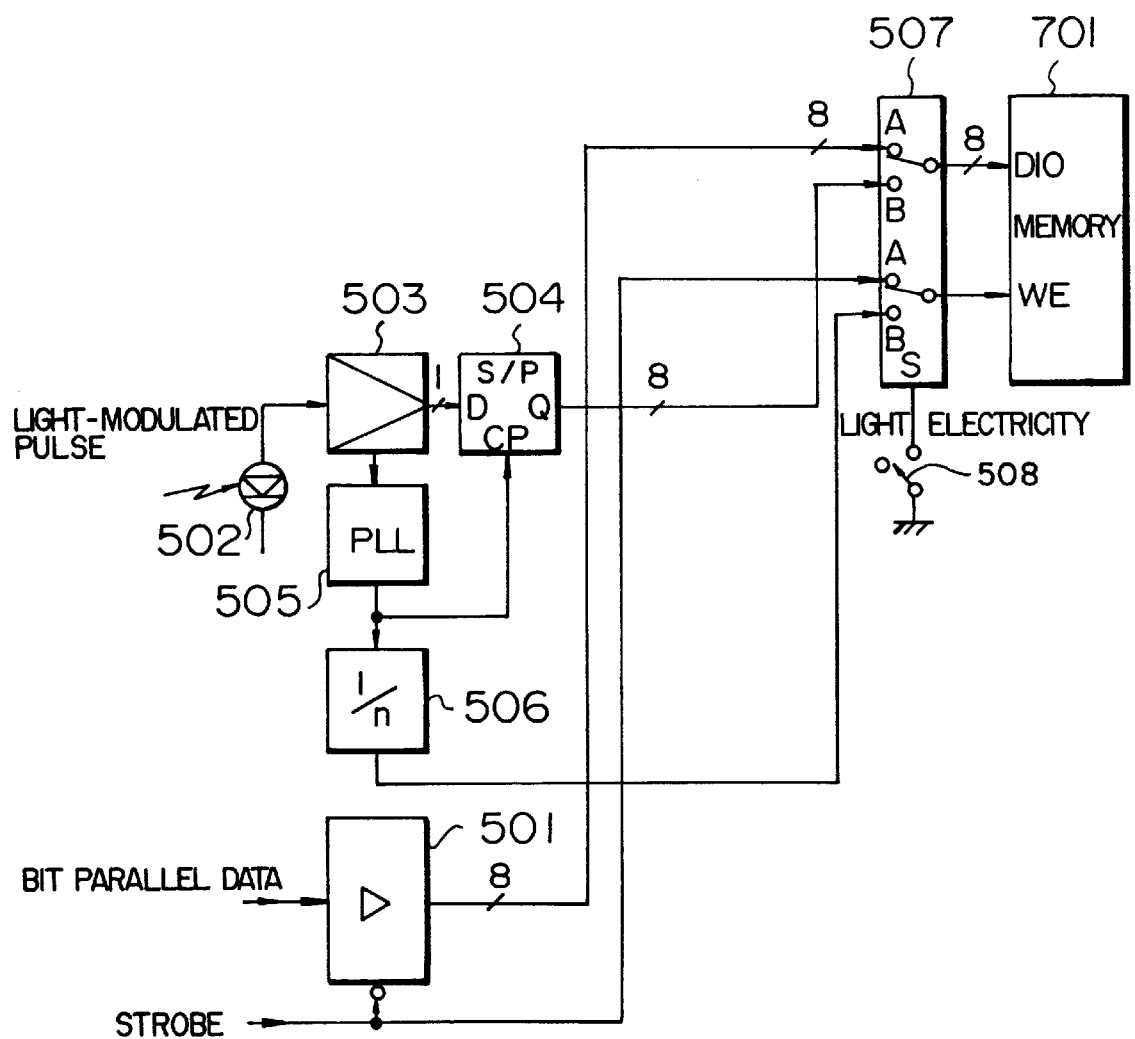
FIG. 5 is a block diagram showing the essential parts of a data input section of a player.

This embodiment will be described with reference to FIGS. 5 and 6. First, a block configuration relating to the high-speed transfer on the player 101 side is shown in FIG. 5. The player 101 includes a photo-sensor 502, an I-V amplifier 503, a serial-to-parallel converter 504, a PLL oscillator 505, a clock divider 506, a multiplexer 507 and a mode switch 508. In the light mode (set when the mode switch 508 is switched to the "light" side), the B inputs of the multiplexer 507 are selected to provide Y outputs, and therefore external write data supplied as a light pulse train (two start bits indicating "1" and "0" states are added to the head of the unit write data train) is written into the memory circuit 701. Specifically, a photo-modulated pulse train signal is converted into a current signal by the photo-sensor 501, and the waveform of the signal is shaped as a voltage signal by the I-V amplifier 503. This signal, after being inputted to the PLL oscillator 505 for extracting the clock components from the pulse train signal thus shaped, is also applied to the serial signal input terminal D of the serial-to-parallel converter 504 at the same time. A signal representing the clock components extracted by the PLL oscillator 505 (8 MHz in frequency according to the present invention) acts as a shift clock signal of the serial-to-parallel converter 504 and a count clock signal of the 1/n (n represents (the number of quantized bits) +2, or 10 according to the present invention) clock divider 506. An output signal (800 kHz according to this embodiment) of the clock divider 506 is a write strobe signal for the memory circuit 701.

In electricity mode (set when the mode switch is switched to "electricity" side), by contrast, the A inputs of the multiplexer 507 are selected to make up Y outputs, so that 8-bit parallel data is written into the memory circuit 701 from the input buffer 501 through the multiplexer 507.

Figure 6:
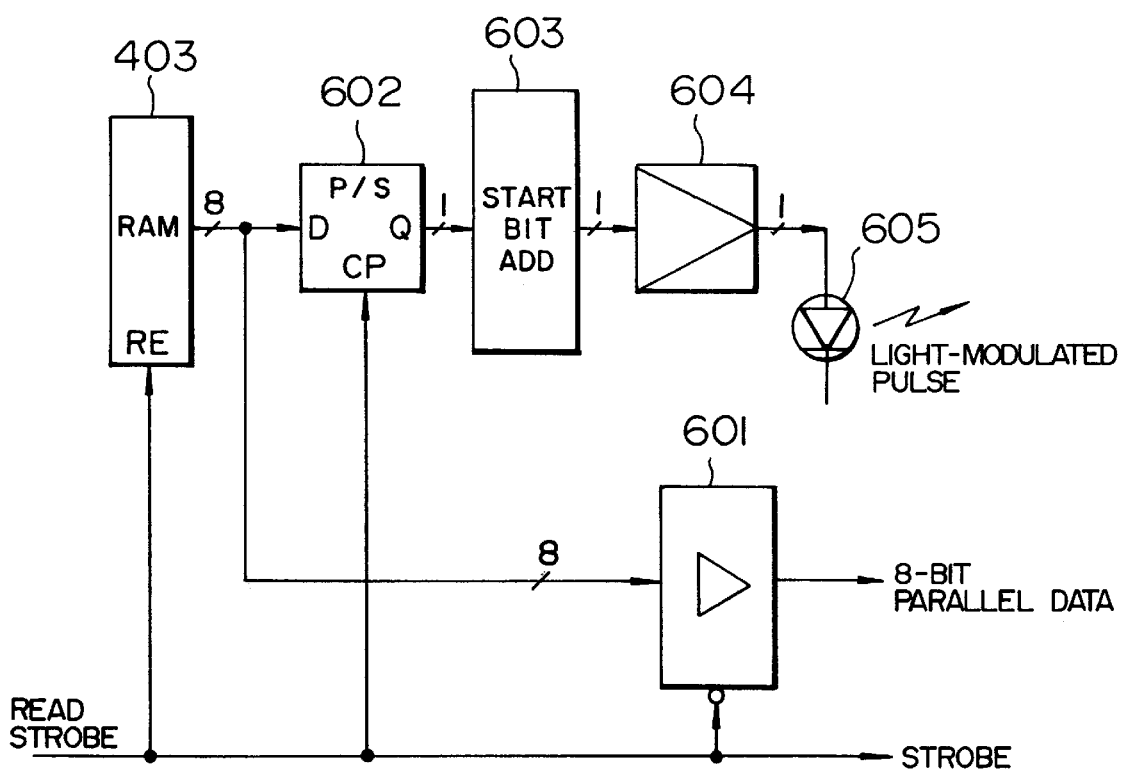
FIG. 6 is a block diagram showing the essential parts of a data output section of the terminal device of FIG. 1.

FIG. 6 shows a block configuration of a data transmitting section of the terminal device 100. The 8-bit parallel data is outputted from the output buffer 601 as data of the buffer memory 403, and the data of the buffer memory 403 is converted into a serial signal by the parallel-to-serial converter 602 to generate a signal representing photo-modulated pulse train, and two start bits indicating the "1" and "0" states are added to the head of the pulse train by a start bit adding circuit 603. Further, a laser diode 605 is energized by the V-I amplifier 604, thereby to output the pulse train signal as a photo pulse train signal.

According to this embodiment, information such as an audio signal can be transferred by photo coupling at a high speed in a wireless fashion. For example, the embodiment under consideration makes it possible to transfer audio information of about six minutes duration (8 bits in resolution, 22.05 kHz in sampling frequency, and monaural) in only ten seconds. Also, in the case where the frequency of the clock signal is set to 800 kHz for reduction of power consumption upon the high-speed transfer, a satisfactory result is obtained a somewhat longer time is required.

The basic concept of the present embodiment lies in that the contents of a digital memory can be directly transferred, taking account for the fact that the operating speed of the digital memory, such as a semiconductor memory, is faster than the transfer speed of an analog signal. Many applications are of course possible within the framework of this concept. Apart from the photo-coupling system, for example, exactly the same result is obtained by connecting directly a data transfer source to a destination by means of a connector, or as an alternative, the effect of application of an electric wave or magnetism may be used. Further, in a system for transferring 8-bit parallel data, although the transmitting or receiving circuits are simplified and the number of the connector pins is increased, the transfer time is decreased further by about one order, thereby making it possible to transfer the above-mentioned data of about six minutes duration only in one second.

Also, although in the present embodiment employs a system for directly managing the memory circuit 701 of the player 101 by the terminal device 100, the transfer may be started from the first address (zero address) of the memory circuit 701 and may be ended at the time point of overflow of an address counter (such as designated by reference numeral 703 in FIG. 7 as described later), or ID information may be added to the head of the transfer data so as to transfer the data train from a given address to another address of the memory circuit 701 at high speed. These methods is lead to a satisfactory result.

Normally, taking user convenience into account, it is necessary that the required information can be selected from among a wealth of information accumulated in the terminal device 100 and transferred to the player 101 to repeatedly reproduce the required information at a given place and time. Therefore, the storage capacity of the terminal device 100 is at least equal to or larger than that of the player 101. Specifically, assuming that the storage capacity of the player 101 is Mp and that of the terminal device 100 is Ms, the relationship Mp≦Ms must be held. This condition, however, is not applied to a specific application.

Figure 7:
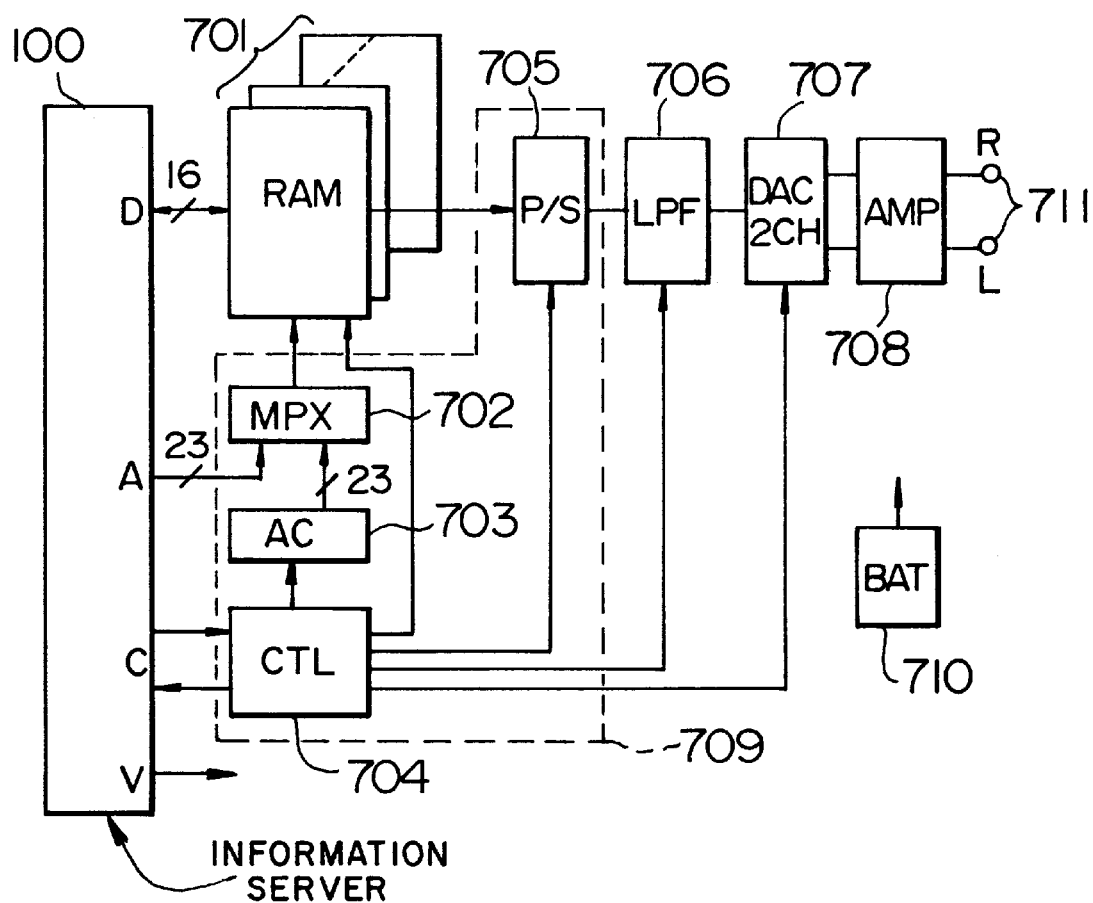
FIG. 7 is a block diagram showing an embodiment of the player used with a digital information system according to the present invention.

A block diagram of an embodiment of the player 101 is shown in FIG. 7.

The player 101 is roughly comprised of a large-scale integrated circuit 709 constituted by a gate array, a memory circuit 701, and a playback circuit. The memory circuit 701, though not specifically limited, includes a pseudo-static RAM (PSRAM) having a storage capacity of about 8 MB. As described later, for example, sixteen pseudo-static RAMs of about 4 megabits are mounted to realize the storage capacity of about 8 MB described above. The large-scale integrated circuit 709 has mounted thereon a controller 704, an address counter 703, a multiplexer 702 and a parallel-to-serial converter 705. The controller 704 forms various control signals for read-and-playback operations of the digital signal stored in the memory circuit 701 and a control signal used for data input to the memory circuit 701.

The address counter 703 generates an address signal for reading the digital signal stored in the memory circuit 701. The multiplexer 702 switches between the address in accessing the memory circuit 701 from the terminal device 100 and the address in accessing the memory circuit 701 inside thereof. More specifically, a digital signal is written into the memory circuit 701 in accordance with the address from the terminal device 100 side, while information is read for playback operation of the particular digital signal in accordance with the address generated from the address counter 703.

Numeral 706 designates a low-pass filter including a digital filter circuit for inputting only the band component required for playback to the digital-to-analog converter 707. According to this embodiment, as described later, a digital signal of a plurality of sampling rates is handled in accordance with the information or program involved. The pass band of the digital filter is switched in accordance with these sampling rates. The digital-to-analog converter has the function of outputting analog signals for the right and left channels so separated in accordance with the stereo signals inputted in time division. In the case where the digital signal is monaural, the same analog signal is outputted from the two channels. The player 101 is adapted to generate an audio output to a headphone in order to reduce the weight thereof. Numeral 711 designates a headphone terminal.

Figure 8:
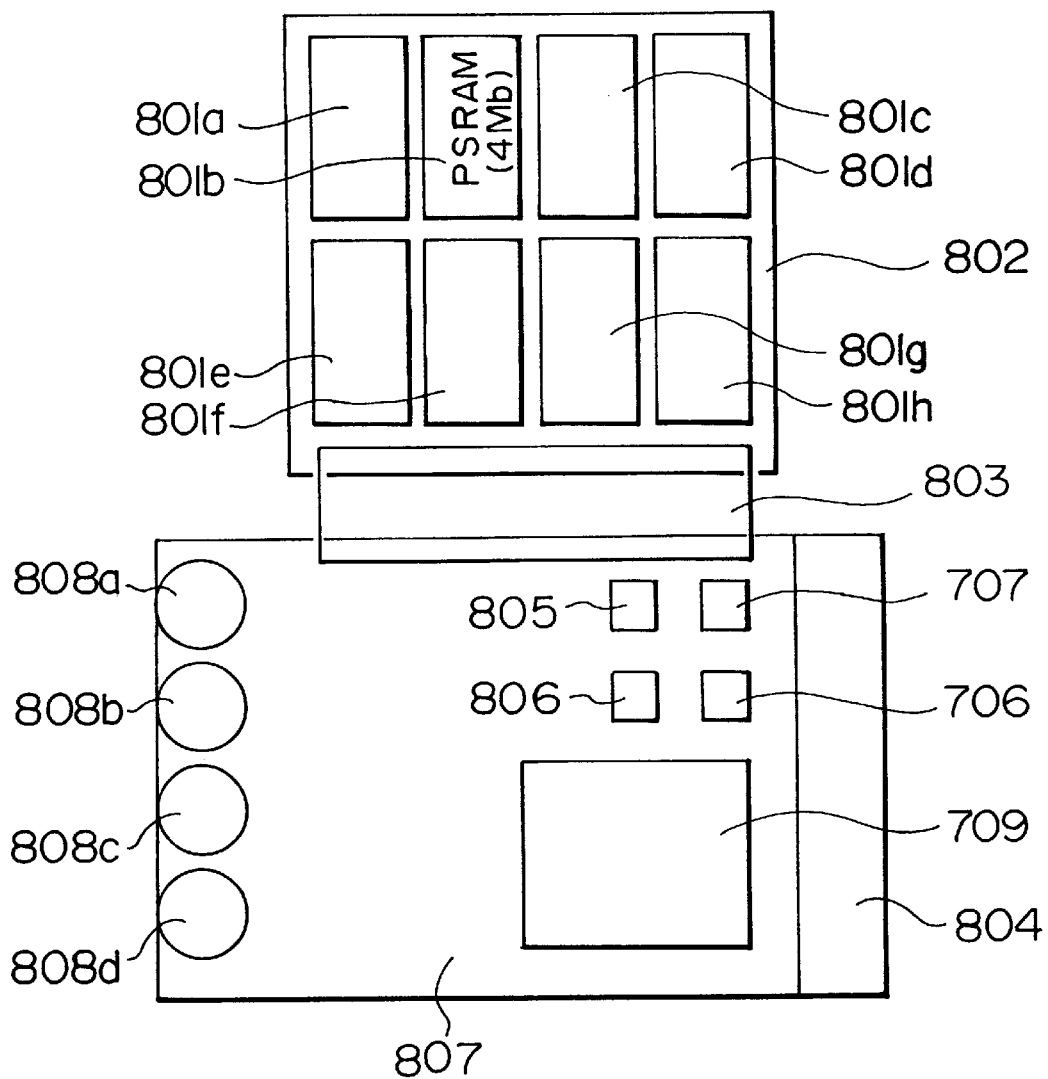
FIG. 8 is a plan view showing an embodiment of a package board configuring the player.

A plan view of an embodiment of the packaging board configuring the player 101 is shown in FIG. 8. The player 101 includes a control board 807 and a memory board 802. The control board 807 has mounted along the longitudinal ends thereof power supply section with button cells 808a to 808d inserted therein and a connector section. The board surface between the power supply section and the connector section has mounted thereon electronic parts such as semiconductor integrated circuit devices or the like making up the large-scale integrated circuit 709, amplifier devices 805, 806, a low-pass filter 706 and a digital-to-analog converter 707. The connector 804 is conforming to the JEIDA (Japan Electronic Industry Development Association) standard (a standard for memory card and the like). The power supply section includes button cell holders and can be packaged with four alkali button cells (LR44). The size of this control board 807, though not specifically limited, is set to 52 mm by 82 mm so as to be accommodatable in the existing IC card case.

The memory board 802 covers an area other than the comparatively thick parts of the connector section and the power supply section of the control board 807, and has mounted eight PSRAMs on each side thereof. The memory board 802 and the control board 807 are connected with each other by a flexible wiring board 803. In other words, the two boards are openable in two directions, right and left, to facilitate inspection and repair.

Figure 9:
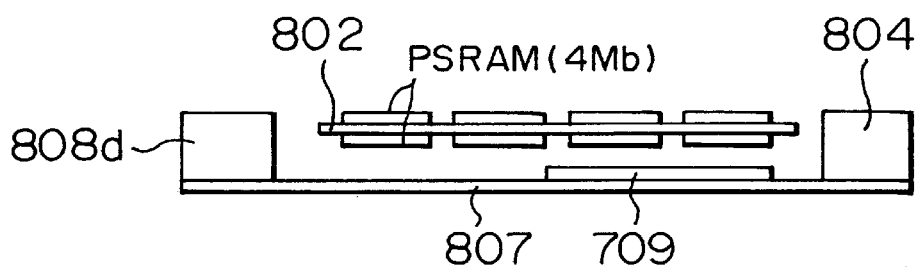
FIG. 9 is a side view showing an embodiment of a package board accommodated in a case.

FIG. 9 shows a side view of the package board as housed in a case. The memory 802 is folded over through the flexible wiring board 803 on the surface area of the control board 807 other than the power supply section and the connector section. As a result, the accommodation in a case equivalent to the existing IC card (RAM card) is made possible, while at the same time realizing a small, thin player 101. Also, since the memory board 802 and the control board 807 can be opened at the time of repair as described above, the electronic parts such as IC and LSI can be easily replaced.

Figure 10:
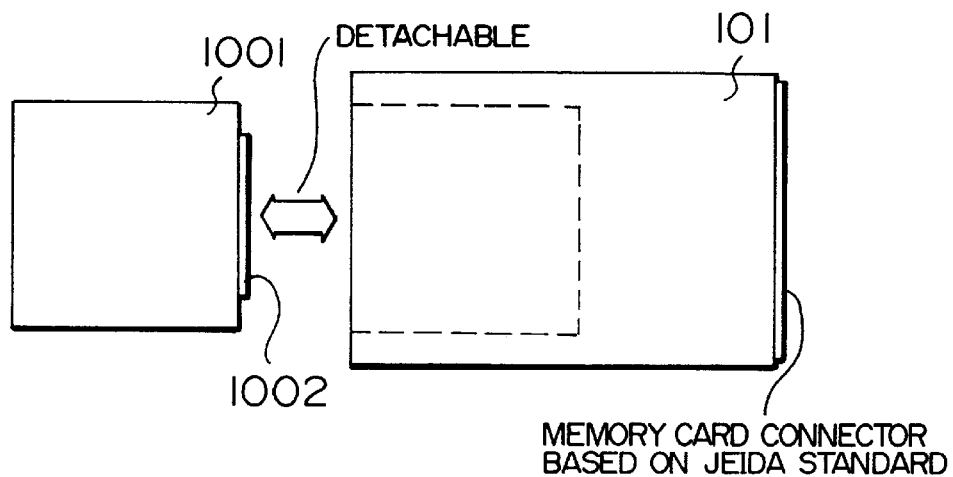
FIG. 10 is a plan view showing another embodiment of the player.

FIG. 10 is a plan view showing another embodiment of the player 101.

In this embodiment, the body of the player 101 and the memory section 1001 are detachable. Specifically, the body of the player 101 includes, as in the case mentioned above, a control board 807 having thereon such ICs as a large-scale integrated circuit 709 for control operation, a digital-to-analog converter 707 and an amplifier 708, a battery case and a memory card connector 804 based on the JEIDA standard. As shown by dotted line in the drawing, there is provided an internal space for insertion of the memory section 1001 (memory card) in the form of thin card and a memory section connector 1103 shown in FIG. 11. The memory section 1001 has a pseudo-static RAM and a backup battery housed in a card-like thin plastic case, for example, as mentioned above. By making the memory section 1001 detachable in this way, a plurality of types of memory card are made available. A variety of RAMs including the static RAM and dynamic RAM or the same type of RAM having a plurality of different storage capacities may be prepared. Also, in addition to these RAMs, a ROM card may be used. Not only the mask-type ROM but also EEPROM may be used for receiving digital signals. In the case where the EEPROM is used, the receiving of a digital signal, that is to say, the write operation thereof takes a little longer time than when the RAM is used. Nevertheless, the use of the backup battery is eliminated, thereby simplifying the production and handling of the memory card.

Figure 63:
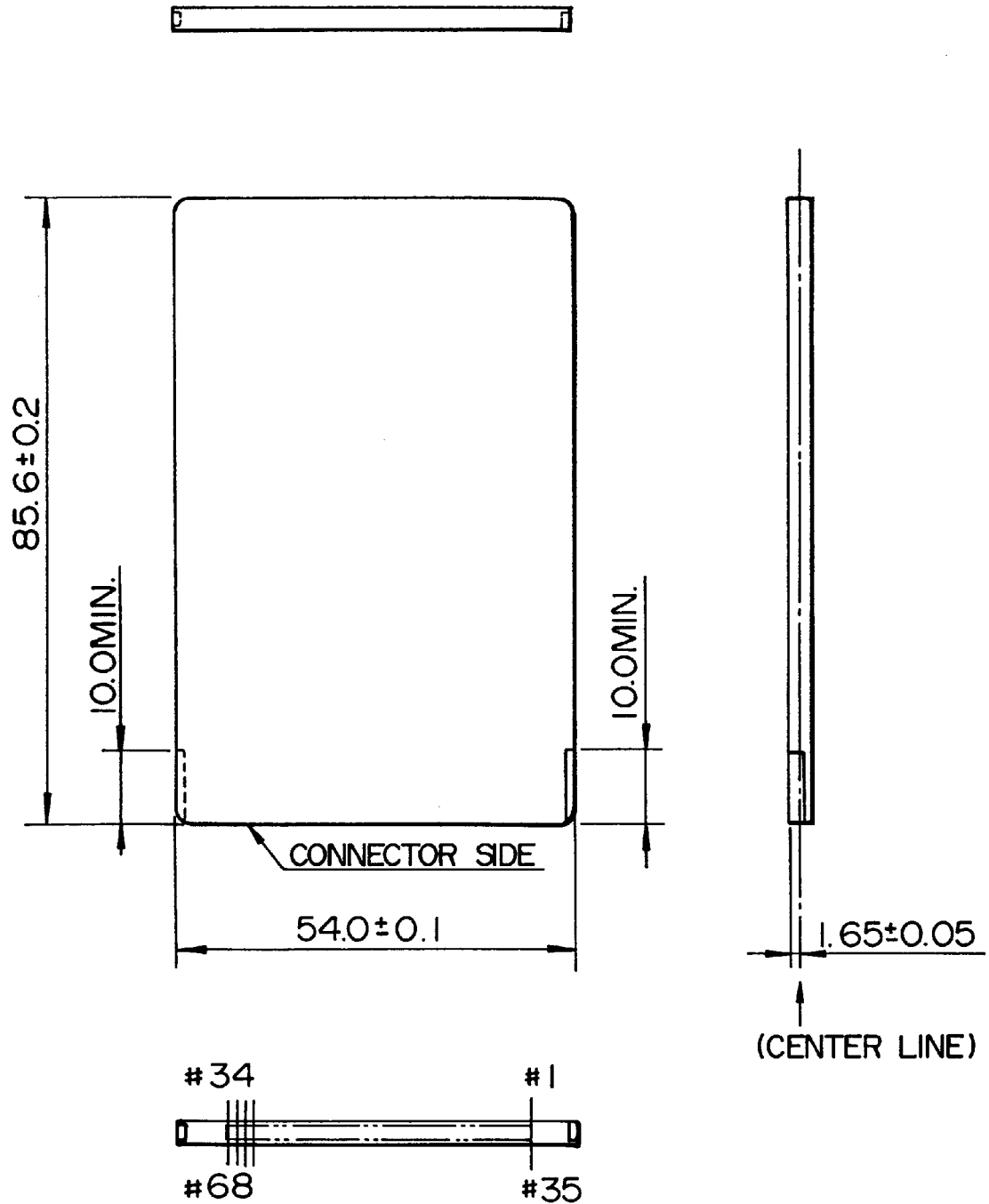
FIG. 63 is a full view of type I of memory card according to the JEIDA standard.
Figure 64:
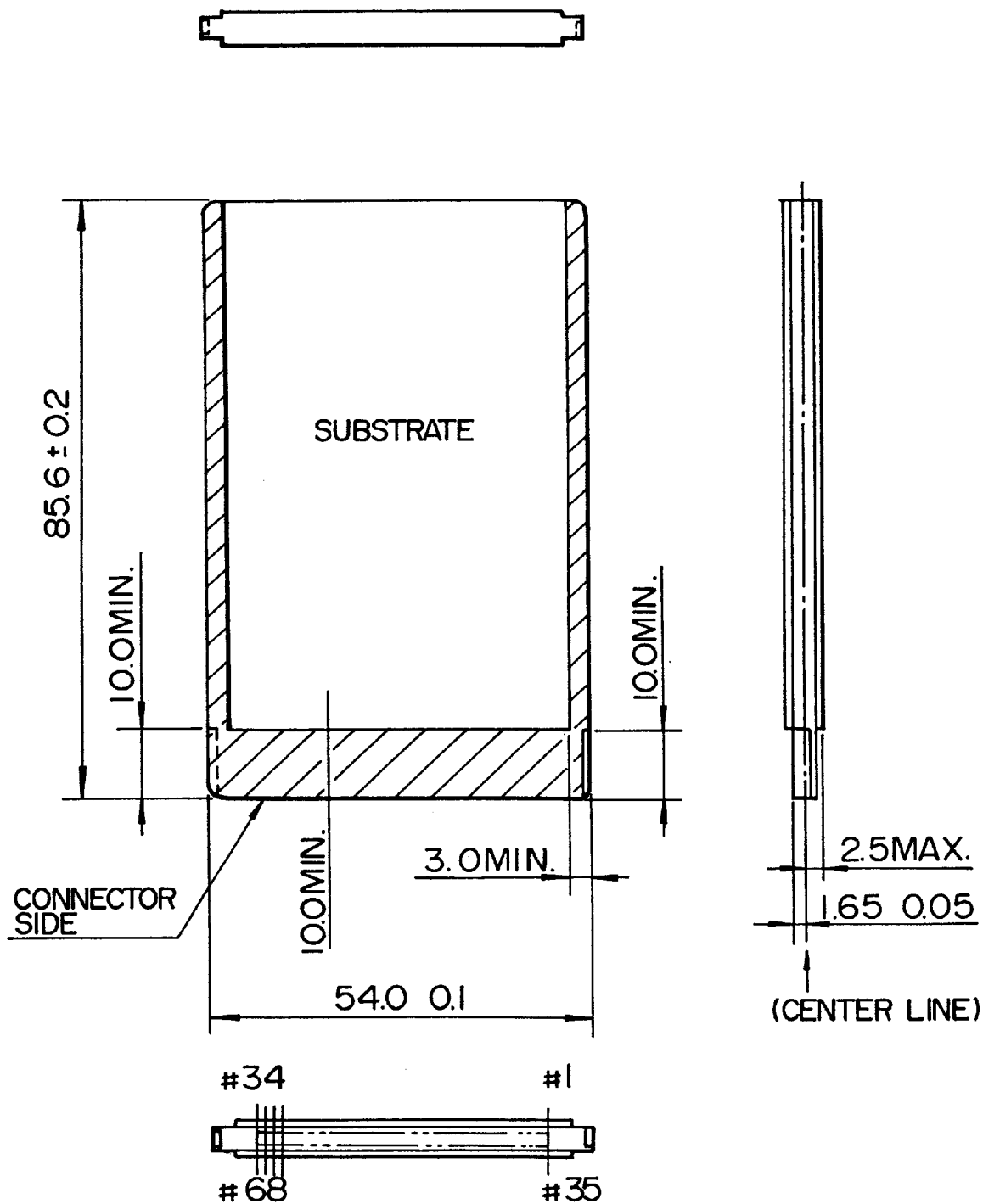
FIG. 64 is a full view of type II of memory card according to the JEIDA standard.

Further, the compatibility with the existing IC memory card is secured by adapting to the outline of the player 101 and the JEIDA standard employed for the general-purpose IC memory card including the physical specifications of the connector, etc., and such electrical specifications as the signal characteristics and timings and the card attribute information (The guide line Ver 4.0 is presently standardized). Although the outside dimensions, connector, pin arrangement, battery voltage, etc. are standardized according to the JEIDA standard, the outside dimensions, signal pin arrangement and signal characteristics are referred to specifically in this patent application. FIG. 63 shows an outline of the type I card according to the JEIDA standard. The outside dimensions of this card are 85.6 mm×54.0 mm×3.3 mm FIG. 64 shows an outline of the type II card according to the JEIDA standard. The outside dimensions of this card are 85.6 mm×54.0 mm×5.5 mm (3.3 mm for the connector section). FIG. 65 shows a signal pin arrangement, in which the number of pins is 68 for the guide line Ver 4.0. A signal characteristic is shown in FIG. 66.

Figure 11:
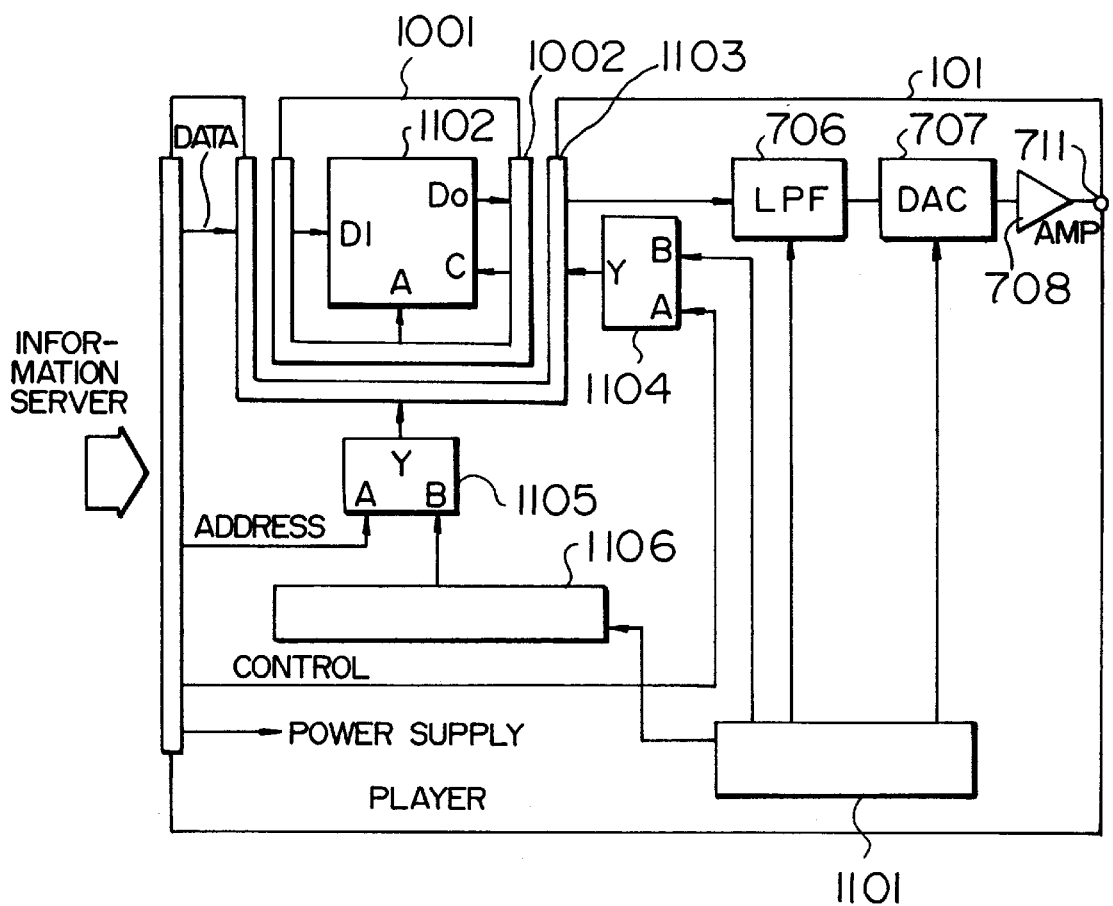
FIG. 11 is a block diagram showing an embodiment of the player body and the memory section of FIG. 10.

FIG. 11 is a block diagram showing an embodiment of the body of the player 101 and the memory section 1001.

A memory card connector 804 based on the JEIDA standard to be connected with the terminal device 100 as described above is arranged on the outside of the body of the player 101. The player 101 has a memory section connector 1103 built therein. The card-like memory section 1001 is detachable through these memory section connectors 102, 1103.

The data inputted from the memory card connector 804 corresponding to the terminal device 100 is supplied to a data input terminal Di of the memory section 1001 through the memory section connectors 1002, 1103. The address inputted from the memory card connector corresponding to the terminal device 100 is supplied to an input A of the multiplexer 1105. The other input B of the multiplexer 1105 is supplied with a playback address as a memory address for playback generated by the address counter 1106 at the inside of the player 101. The address for receiving a digital signal or the playback address is selectively supplied to the address terminal A of the memory section 1001 through the multiplexer 1105. The control signal inputted from the memory card connector 804 corresponding to the terminal device 100 is supplied to the input A of the multiplexer 1104. The other input B of the multiplexer 1104 is supplied with a playback control signal generated by the controller 1101 of the body of the player 101. The control signal for receiving the digital and the playback control signal is selectively supplied to the control terminal C of the memory section 1001 through the multiplexer 1104.

In the manner mentioned above, the multiplexers 1105, 1104 are provided for switching the addresses or the control signals so as to selectively perform one of the receiving of the digital signal in accessing the memory section 1001 from the terminal device 100 side and the playback of the digital signal in accessing through the address counter 1106 or controller 1101 at the inside of the player 101. In this playback operation, the digital signal outputted from the output terminal Do upon the read operation of the memory section 1001 is outputted as an audio signal through the memory section connectors 1002, 1003 and a playback circuit including the low-pass filter 706, the digital-to-analog converter 707 and the amplifier 708 at the inside of the player 101.

The controller 1101 at the inside of the player 101 is adapted to control the digital-to-analog converter 707 and the low-pass filter 706 mentioned above in accordance with the ID code or the like of the reproduced digital signal.

The power supplied from the terminal device 100, on the other hand, is used also as an operating voltage for high-speed writing of the digital signal into the memory section 1001 connected through the memory sections 1002, 1103, or for rapid battery-charging operation in the case where the batteries 808a to 808d and mounted inside of the player 101 as the secondary batteries.

Figure 12:
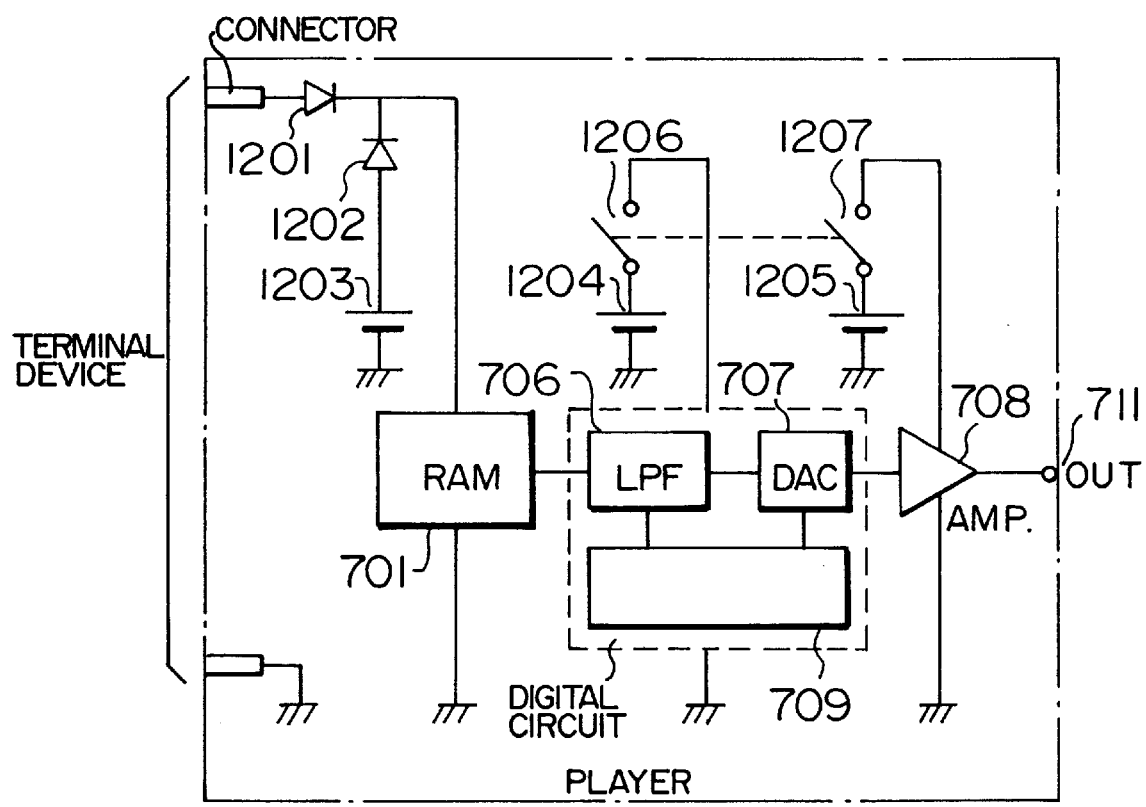
FIG. 12 is a block diagram showing an embodiment of a power supply system of the player.

A block diagram of an embodiment of the power supply system for the player 101 is shown in FIG. 12. The player 101, as described above, is comprised of a memory circuit 701, a controller 704 made up of a digital circuit, a digital filter 706, a digital-to-analog converter 707 and an amplifier 708 for outputting an analog signal. Each of these circuit blocks has a different operating voltage. The memory circuit 701, for instance, requires a comparatively high operating voltage of about 4 V when a pseudo-static RAM is used as mentioned above. In contrast, the use of a CMOS circuit gate array or the like in a digital circuit makes possible an operation at a comparatively low voltage of about 3 V. The amplifier circuit 708 for driving the headphone is operable even at a lower operating voltage of about 1.5 V. As a result, except for the memory circuit 701, which is supplied steadily with a voltage from the battery 1203, for holding information, the voltages of the batteries 1204 and 1205 are supplied to each corresponding circuit through the power switches 1206 and 1207 by use of the batteries 1203, 1204 and 1205 adapted for the operating voltages of the respective circuits.

In this way, the battery life is lengthened by supplying power to the directly associated circuits by use of a plurality of types of batteries having different voltage values. If the internal power supply is set to the highest voltage of 4 V, for instance, a wasteful current flows in the digital or analog circuit, thereby to increase the current consumption. If the voltage of 4 V is supplied through an internal voltage drop circuit, the current consumption in the voltage drop circuit would shorten the battery life. According to the present embodiment, in contrast, power is supplied through a selected battery having the required minimum capacity for each circuit, and therefore the wasteful current consumption is decreased, thereby substantially lengthening the battery life.

If the writing of a digital signal into the memory circuit 701 or the reading of a digital signal therefrom is to be speeded up, the operating current of the memory circuit 701 must be increased. For this purpose, the terminal device 100 is provided with power supplying connectors for supplying an operating voltage of about 5 V higher than the internal voltage. In this case, in order to automatically switch the power between the player 101 and the terminal device 100 sides, the connector 804 and the battery 1203 are used to supply a voltage to the power terminal of the memory circuit 701 through diodes 1201 and 1202, respectively. In this configuration, once the player 101 is connected to the terminal device 100, the diode 1201 is turned on since the operating voltage of the terminal device 100 is about 5 V and higher than the voltage of about 4 V across the battery 1203, and the memory circuit 701 is operated by the operating voltage from the terminal device 100 side. At the same time, the diode 1202 on the battery 1203 side is reversely biased into an off state with the result that no reverse current flows from the connector of the terminal device 100 to the battery 1203. When the player 101 is pulled off from the connector of the terminal device 100, the connector is opened and therefore the diode 1202 is opened, thereby supplying the voltage across the battery 1203 to the memory circuit 701. By employing a power supply system of this type, the data transfer from the terminal device 100 to the memory circuit 701 can be effected at a high speed, while lengthening the battery life of the player 101 at the same time.

Figure 13:
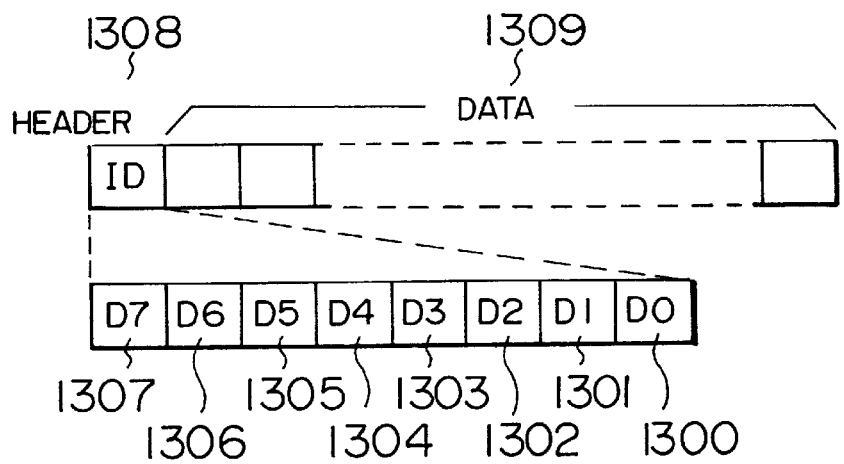
FIG. 13 is a diagram showing the configuration of an embodiment of the digital signal transferred from a terminal device to the player.

FIG. 13 shows a format of a digital signal transferred from the terminal device 100 to the player 101 in the present embodiment.

As some sources of digital signals, a music program requires a broad frequency band and news does not require such a broad frequency band. In other view points, stereo signal reproduction is required or monaural signal reproduction is sufficient. In this way, the limited storage capacity of the memory circuit 701 built in the player 101 needs to be utilized effectively in accordance with the source, so that a sampling rate, bit length and stereo/monaural mode of a digital signal can be selected depending on the source. This requires the setting of the playback conditions corresponding to each source. In this case, if manual selection is attempted, display means used for designating the selection would be added, with the result that the operation by an unaccustomed user would extremely deteriorate the sound quality or make playback impossible because of mismatch of the playback conditions against the source.

In order to solve this problem, an ID code 1308 for designating the playback conditions is inserted in the head of a digital signal as shown in FIG. 13. This ID code is followed by a data including a digital signal to be reproduced. In this way, a digital signal and the ID code for designating the playback conditions are received to the player 101 as an integral signal. As a result, the ID code 1308 and the digital signal are integrally stored in the memory circuit 701 of the player 101. In the case of employing a system for transferring the ID code 1308 separately from the digital signal to the player 101, some idea would be needed to prevent disappearance of the ID code 1308 when the power for the player 101 is interrupted. This problem, however, is not posed when the digital signal is stored integrally in the memory circuit 701 as described according to the present embodiment.

Figure 14:
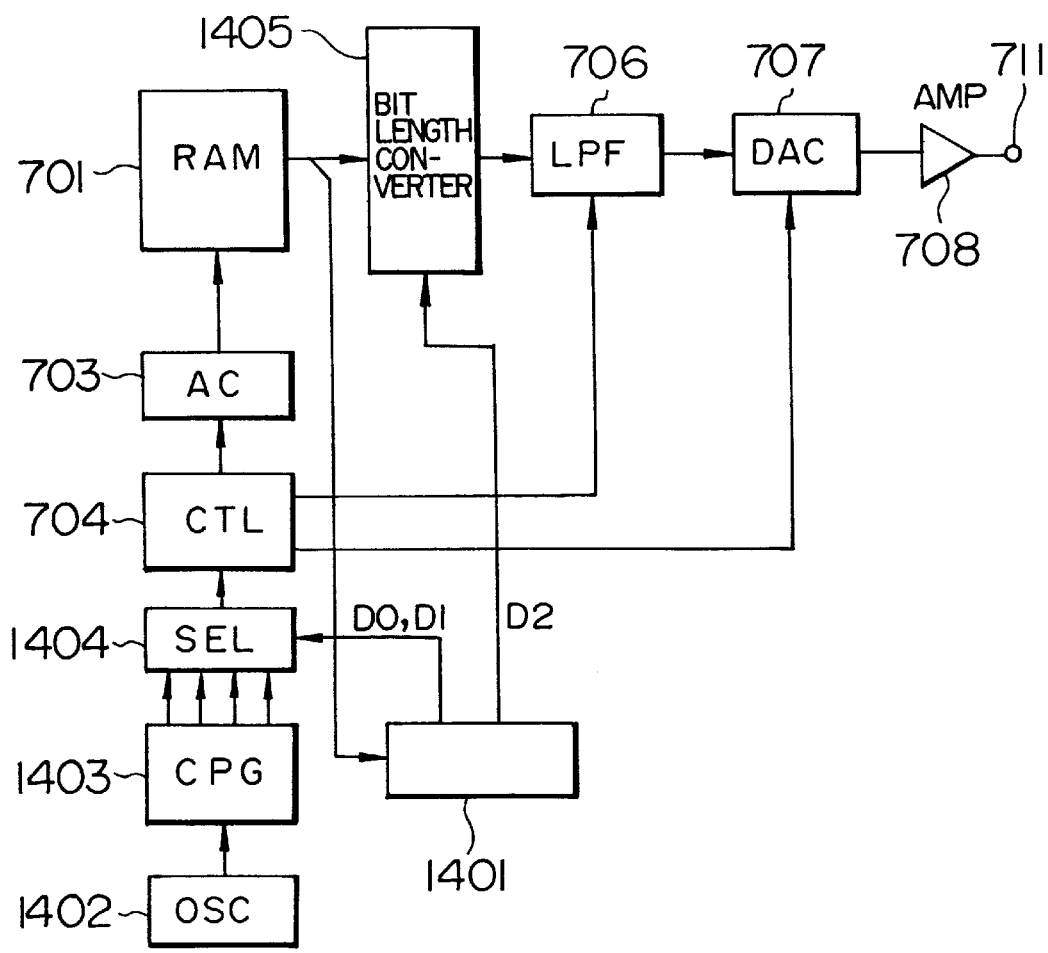
FIG. 14 is a block diagram showing an embodiment of the player corresponding to the digital signal with the ID signal of FIG. 13 inserted therein.

A block diagram of an embodiment of the player 101 corresponding to a digital signal into which the ID code 1308 is inserted is shown in FIG. 14.

The digital signal first read from the memory circuit 701 is taken into a register 1401 by being regarded as the ID code 1308. Of all the ID codes 1308 taken into the register 1401, the codes 1300 (DO), 1301 (D1) are inputted to the multiplexer 1404, so that a clock pulse corresponding to the sampling rate among four clock pulses formed by the clock generator 1403 is selected and transmitted to the controller 704. The clock generator 1403 forms four clock pulses corresponding to the sampling rates in response to a reference frequency signal formed by the oscillator 1402.

Also, the code 1302 (D2) is inputted to a bit length converter 1405. The bit length converter 1405 has the function of parallel-to-serial conversion and inputs to a low-pass filter 706 a digital signal outputted from the memory circuit 701 in maximum units of two bytes in accordance with the bit length designated by 1302 (D2). The low-pass filter 706, including a digital filter, receives a clock pulse corresponding to the sampling rate from the controller 704 and cuts an extraneous frequency band of the input digital signal. Also, the digital-to-analog converter 707 converts an input digital signal into an analog signal in response to a clock pulse corresponding to the sampling rate from the controller 704. The amplifier 708 is for amplifying the analog signal thus converted thereby to form a drive signal such as for headphone. Although not shown in the drawing, the output section of the digital-to-analog converter 707 has a low-pass filter including a resistor and a capacitor.

The ID code 1308, though not specifically limited, includes eight bits of 1300 to 1307 (D0 to D7), of which 1300, 1301 (D0 and D1) are used to designate four sampling frequencies. The frequency 5.5125 kHz is designated when 1300 and 1301 are 00, 11.025 kHz when 1300 and 1301 are 01, 22.05 kHz when 1300 and 1301 are 10, and 44.1 kHz when 1300 and 1301 are 11. 1302 is used for designating the resolution. Eight bits are designated when it is 0, and 16 bits when it is 1. On the other hand, 1303 (D3) is used for mode designation, setting "monaural" when it is 0 and "stereo" when it is 1. The remaining four bits 1304 to 1307 (D4 to D7) are reserved for extension.

The relationship between the memory capacity (total number M of bits) of the memory circuit 701, the bit length N as a resolution, the sampling rate fs, the mode S (assuming that stereo S=2 for stereo mode, and S=1 for monaural mode) and the recording/playback time t is expressed by equation (1) below.

$$t = M/(N \times fs \times S) \quad (1)$$

As the sampling rate mentioned above, though not specifically limited, 44.1 kHz is used for playback of an ultra HiFi music program equivalent to the compact disk player, 22.05 kHz for playback of a HiFi music program, 11.024 kHz for playback of an information program such as news, and 5.5125 kHz for playback of an automatic answering telephone set, or the like. As described above, if the sampling frequency is set in units of double, the player 101 may form one reference frequency corresponding to say, 44.1 kHz, and by dividing it in units of 1/2, can easily form the sampling frequency. As a consequence, the recording/playback time is lengthened in reverse proportion to the four sampling frequencies fs described above. In other words, if a predetermined recording/playback time is to be obtained, the storage capacity is increased in proportion to the sampling rate fs.

In the case where the bit length is increased from 8 to 16 bits, the recording/playback time is doubled as will be seen from equation (1) above. With the increase in bit length, a double storage capacity is required of the memory circuit 701 to meet the increase. If the bit length is reduced to 8 bits, by contrast, the recording/playback time is increased to double for the same storage capacity. In stereo mode, specifically, a double data is required as compared with when the system is in monaural mode. More specifically, in stereo mode when right and left signals are outputted alternately from the memory circuit 701, the required storage capacity doubles from that required in monaural mode.

According to this embodiment, the three playback conditions including sampling rate, bit length and mode are set for a digital signal source as described above, and are combined as desired to permit playback, whereby the limited storage capacity of the memory can be utilized to the maximum efficiency. The playback conditions which can be combined in a great variety can be automatically set in the player 101 by the use of the ID code 1308, and therefore any user can easily reproduce the information received without any operating inconvenience.

The type or frequency of the sampling rate can be set as desired. In such a case, an arrangement should be made to generate a clock pulse in accordance with each sampling rate. Also, the ID code 1308 may have added thereto a bit that can be designated by the operation of a terminal device. By setting the slow or fast playback mode automatically by means of the remaining bits as explained later, for example, a playback mode such as reproduction by program or continuous reproduction for the whole program may be designated automatically.

Figure 15:
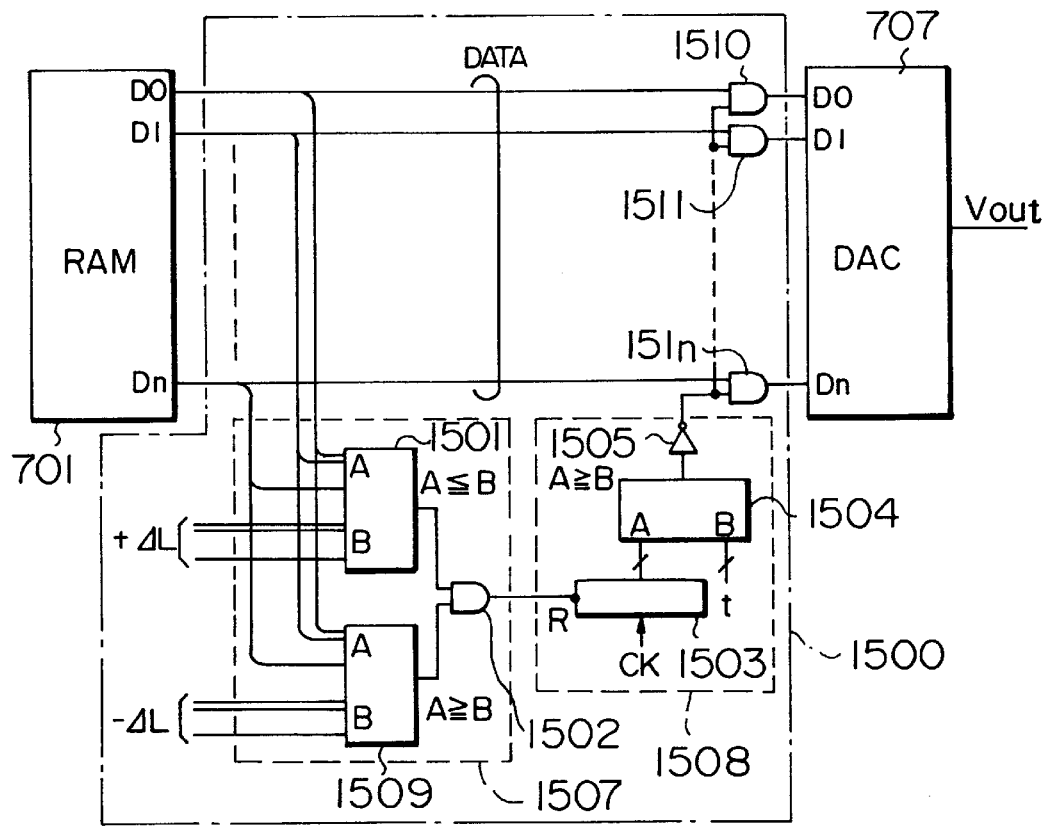
FIG. 15 is a circuit diagram showing an embodiment of a quantizing noise remover according to the present invention.

FIG. 15 is a circuit diagram showing an embodiment of a quantizing noise remover.

When an analog signal is quantized, a quantizing noise (error component) is always generated. This quantizing noise is offensive to the ear especially during a voice interval. According to the present embodiment, a quantizing noise remover as described below is inserted in the input of the digital-to-analog converter 707.

The digital signal read out of the memory circuit 701 is inputted to the digital-to-analog converter 707 and is converted into an analog signal Vout. The quantizing noise remover according to the present embodiment, though not specifically limited, is intended for a case in which a digital signal is comprised of a 2' complement binary code. The digital signal including D0 to Dn read out of the memory circuit 701 is inputted to the corresponding input terminals D0 to Dn of the digital-to-analog converter 707 through the AND gates 1510 to 151n respectively. The digital signal read out of the memory circuit 701 is inputted to a level checker 1507 for checking a level where the signal is considered to represent a voice interval. The output signal which has been considered to represent a voice interval by this level checker 1507 is inputted to a timer 1508 shown by dotted line in the same drawing for time judgement. If the level considered to represent a voice interval by the level checker 1507 and the timer 1508 continues for a predetermined time length, the particular period is decided to be a voice interval, so that the output from an inverter 1505 becomes a logic zero, thereby controlling the system to close the AND gates 1510 to 151n. Specifically, the AND gates 1510 to 151n forcibly set the signals D0 to Dn inputted to the digital-to-analog converter 707 to logic 0 by the logic 0 of the output signal of the inverter 1505 without regard to the digital signal read out of the memory circuit 701.

The digital signals D0 to Dn are comprised of 2' complement binary codes as explained above. More specifically, when D0 to Dn are eight bits, the positive maximum value takes 01111111 and the negative maximum value 10000000, with the "0" level as 00000000. +1 in decimal notation is equivalent to 00000001 in binary notation. Once a time period is considered to be a voice interval as described above, therefore, the output of the AND gates 1510 to 151n is fixed to zero, thereby making it possible to remove the quantizing noise completely during a voice interval.

The level checker 1507 in FIG. 15 is adapted to set a positive maximum value +ΔL and a negative maximum value −ΔL considered to represent a voice interval. When +1 is assumed to be a positive maximum value +ΔL, for example, the input B of the comparator 1501 takes the form of 00000001, while when −1 is assumed to be a negative maximum value −ΔL, the input B of the comparator 1509 is given as 11111111. The input A of the comparators 1501, 1509 is supplied with a digital signal from the memory circuit 701. A "1" output signal is formed by the comparator 1501 when A≦B, and by the comparator 1509 when A≧B. The output signals of these comparators 1501 and 1509 are outputted through the AND gate 1502. As a result, the output of the AND gate 1502 is "1" detecting a voice interval when the digital signal is 00000001, 00000000 or 11111111.

When the digital signal is 00000010 or otherwise larger than +ΔL, the output of the comparator 1501 is "0", while when the digital signal is 11111110 or otherwise smaller than −ΔL, the output of the comparator 1509 is "0". As a consequence, the AND gate 1502 forms a "1" output signal only when the digital signal is included within a range considered to represent a voice interval.

The timer 1508 includes a counter 1503 and a comparator 1504. The reset input R of the counter 1503 is supplied with a detection output of the level checker 1507. When a voice interval is judged to be involved, the reset state of the counter 1503 is cancelled, and therefore the counting operation of the clock pulses CK is started by the counter 1503. The count output of the counter 1503 is supplied to the input A of the comparator 1504. The input B of the comparator 1504 is supplied with a set time t for regarding a given period as a voice interval. As a result, the comparator 1504 outputs a "1" signal (A≧B) when the voice interval level exceeds the set time t. This output signal is inverted at the inverter 1505 and is inputted to the AND gates 1510 to 151n, and therefore regardless of the digital signal read out of the memory circuit 701, the digital signal supplied to the input of the digital-to-analog converter 707 assumes a "0" level of 00000000.

When the level checker 1507 is supplied with a level of a digital signal exceeding +ΔL, the comparator 1501 or 1509 detects the fact, and reduces the output to "0", thereby resetting the counter 1503 of the timer 1508. As a result, the output signal of the comparator 1504 of the timer 1508 becomes "0", so that the control input of the AND gates 1510 to 151n is set to "1" through the inverter 1505. The input of the digital-to-analog converter 707 is thus supplied with a digital signal read out of the memory circuit 701. In this manner, immediately after the end of a voice interval, the digital signal read out of the memory circuit 701 is converted into an analog signal.

The result of an experiment conducted by the inventor shows that the set time t of the timer 1508 is generally desirably in the range from 0.5 ms to 20 ms depending on the contents of the music or news program involved. This range may of course be exceeded to some degree in setting a time without any problem. Also, the level considered to be a voice interval may be switchable in accordance with the input source or the related resolution. In the case of a 16-bit digital signal, for example, it is generally desirable to set a wider range than in the case of a 8-bit digital signal. Also, the digital signal of 2' complement binary code need not be used, so that in the case of 8-bit digital signal, 01111111 or 10000000 may be set at an AC-like neutral level. In the case of such a digital signal, the digital signal from the memory circuit 701 may be replaced by a selection of 01111111 or 10000000 if a voice interval is detected by a combination of a multiplexer and a gate circuit.

Figure 16:
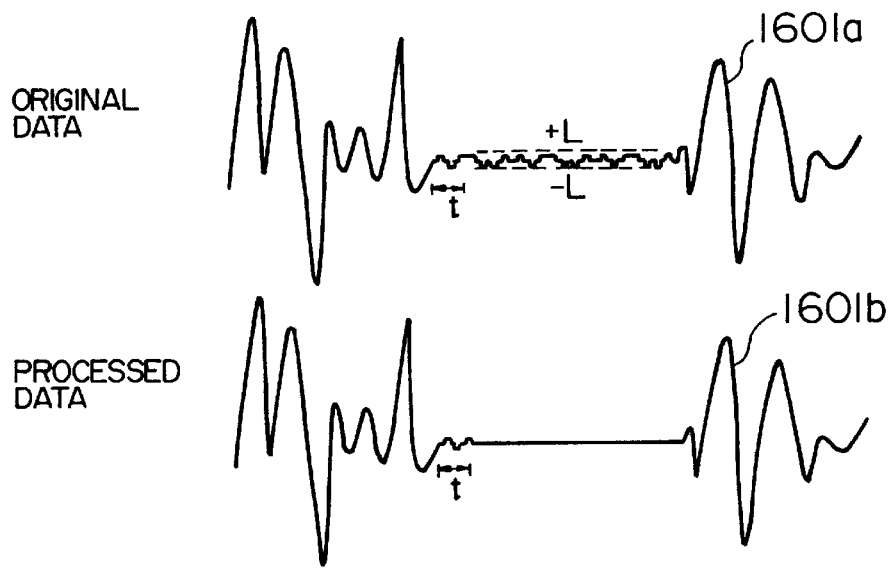
FIG. 16 is a diagram showing waveforms for explaining an example of the operation of the quantizing noise remover of FIG. 15.

Waveforms for explaining the operation mentioned above are shown in FIG. 16. The waveform 160a in the drawing represents a case in which the digital signal from the memory circuit 701 is directly inputted to the digital-to-analog converter to form an analog signal. As shown in FIG. 16, the signal undergoes a change in accordance with the quantizing error during a voice interval, thus generating a noise cacophonous to the ear. In the quantizing noise remover according to the present embodiment, in contrast, as shown by 1600b in FIG. 16, upon the lapse of a predetermined time t considered to be a voice interval, a digital signal corresponding to "0" level is forcibly subjected to digital-to-analog conversion by the AND gates 1510 to 151n, and therefore the above-mentioned noise continues to be outputted until the arrival of the next "0"-level audio signal free of the noise. The predetermined time length t is very short and ranges from about 0.5 ms to 20 ms, and therefore the quantizing noise generated during this period is not offensive to the ear.

The quantizing noise remover 1500 according to the present embodiment is not only used with the player 101 as described above but also finds wide applications as various digital audio processors such as a digital audio tape recorder processing a digital audio signal.

Figure 17:
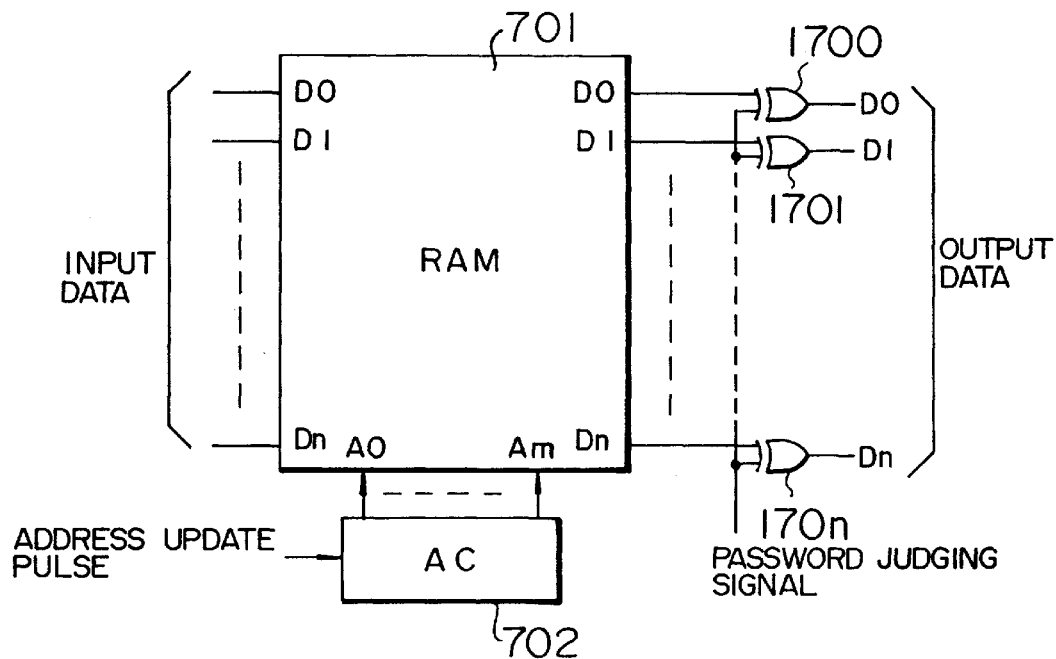
FIG. 17 is a circuit diagram showing an embodiment of a security circuit used in a digital signal selling system according to the present invention.

FIG. 17 is a circuit diagram showing an embodiment of a security circuit used with a digital signal selling system according to the present invention.

In selling an audio signal, etc. in digital form as a commodity, it is important to prevent it from being easily duplicated in order to improve the commercial value thereof. For this purpose, a first method is to add the function of permitting only a specified person to perform the substantial playback operation of the digital signal. In a second method, upon transfer to the player 101 of a digital signal sold in the digital signal selling system according to the above-mentioned embodiment, the signal conversion described below is effected within the player 101 as a function to prevent read duplication.

In order to permit only a specified person to perform the playback operation or to duplicate, the read output section of the memory circuit 701 is provided with EOR gates 1700 to 170n controlled by a password check signal. These EOR gates 1700 to 170n may be either provided as parts corresponding to all bits of the read signals D0 to Dn or only for one or a plurality of bits including at least the most significant bit with equal effect.

The input data terminal of the memory circuit 701 is supplied directly with a digital signal transferred from the terminal device 100 (information server). In the case of using a semiconductor memory with the input and output of the memory circuit 701 shared with each other, the EOR gates 1700 to 170n are inserted in the read signal route of the signal bus connecting the data terminal of the memory. The digital signal is read out of the memory circuit 701 by an address signal generated by the address counter 702 receiving an address update pulse.

The password described above is set in advance in the player 101 by a switch, ROM, etc. This password is notified to the purchaser at the time of purchase of the player 101 by him. As a result, the password is set at the time of reproducing the digital signal by the player 101. When the password registered by a comparator or the like not shown coincides with the password inputted, a password judging signal is reduced to "0". The EOR gates thus output a "0" coincidence signal when "0" coinciding with "0" is inputted thereto. When "1" signal not coincidental with "0" is inputted, on the other hand, a "1" noncoincidence signal is outputted. In this way, when the password judging signal is "0", the EOR gates 1700 to 170n output an input digital signal in its direct form.

When it is judged by a comparator, etc. not shown that a registered password fails to coincide with the input password, by contrast, the password judging signal of "1" is outputted. As a result, the EOR gates output a "0" coincidence signal when a "1" signal coinciding with "1" is inputted thereto, and a "1" noncoincidence signal when "0" not coinciding with "1" is inputted thereto. In this fashion, when the password judging signal is "1", the EOR gates 1700 to 170n output an input digital signal in an inverted form. When the EOR gates 1700 to 170n are inserted for the digital signals of all the bits as explained above, all the bits are inverted when the passwords fail to coincide with each other, so that the resulting audio signal with inverted bits, which is meaningless if converted into an analog signal, assures the confidentiality of information. Also, a password is required even when taking a copy, or, in other words, even when the data is out-putted outside from the memory circuit 701, thus preventing an easy duplication.

Some information such as news or traffic data are too small in importance to protect. In such a case, the password may be made null and void by use of the ID code 1308 mentioned above. In other words, the system may be arranged to perform the above-mentioned security operation on condition of coincidence of the password, only when information protection is required by the ID code 1308. By doing so, the seller may designate an item requiring security. Also, a call received by the automatic answering telephone set may be of such a nature that one wants to keep it private. In such a case, an arrangement may be made to designate security mode by the ID code 1308 to assure protection by the terminal device 100. In any way, the operating trouble is minimized by making such as arrangement as to require a password input only when true information protection is assured by the ID code 1308.

Figure 18:
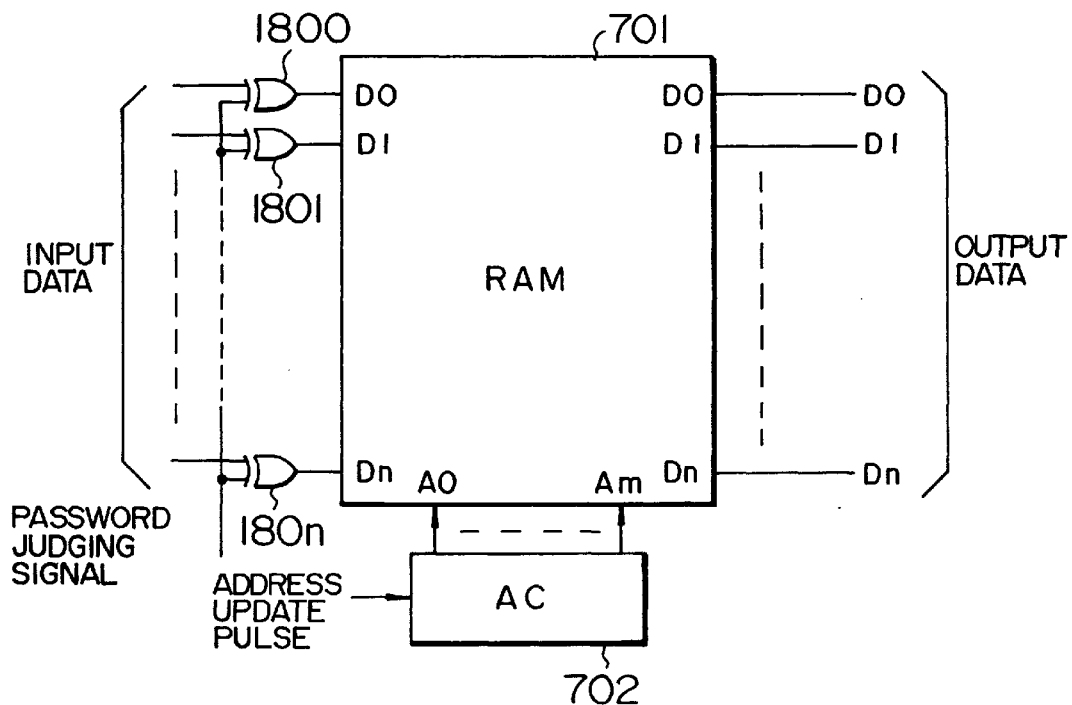
FIG. 18 is a circuit diagram showing another embodiment of the security circuit used in a digital signal selling system according to the present invention.

FIG. 18 is a circuit diagram showing another embodiment of the security circuit used with the digital signal selling system according to this embodiment. According to this embodiment, a security circuit using a password coincidence signal and EOR gates 1800 to 180n is inserted in the data input terminal side of the memory circuit 701. Also in this case, when the passwords are not coincident, each bit or one or a given number of bits of the digital signal written in the memory circuit 701 are inverted and converted into a meaningless audio signal, thus assuring the confidentiality as in the aforementioned case. In this case, at the time of transfer of the digital signal requiring security from the terminal device 100, a data is transferred substantially effectively only when a password is inputted and is coincidental by the operation of touch keys or the terminal device 100, while if the password is incoincident, the bits are inverted as mentioned above, thereby transferring a substantially meaningless digital signal. As an alternative, the transfer operation itself may be suspended.

Figure 19:
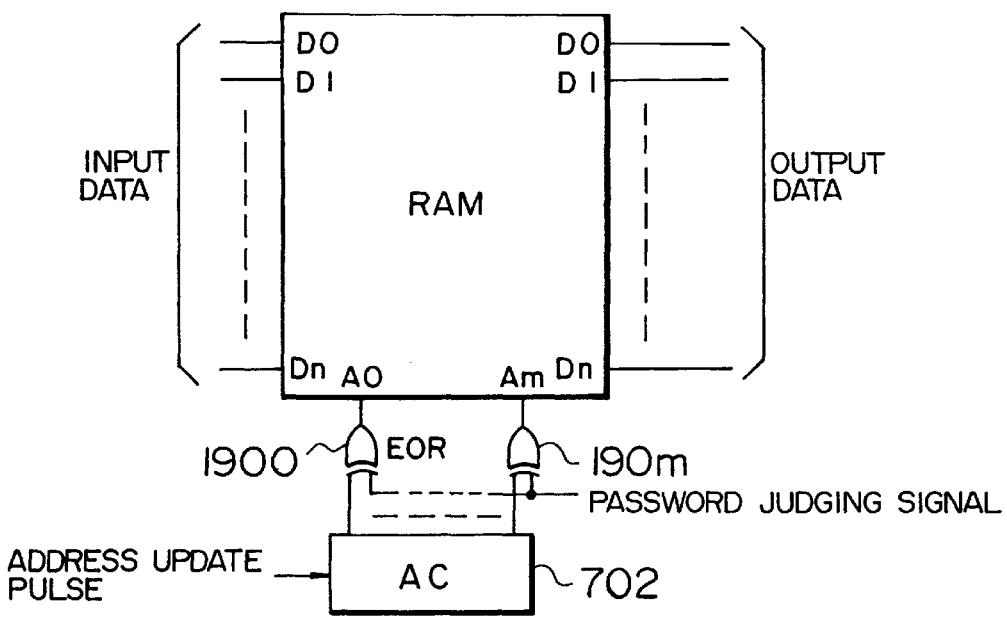
FIG. 19 is a circuit diagram showing still another embodiment of the security circuit used with a digital signal selling system according to the present invention.

FIG. 19 is a circuit diagram showing another embodiment of the security circuit used with a digital signal selling system according to the present invention. In this embodiment, a security circuit using a password coincidence signal and EOR gates 1900 to 190m is inserted in the address input side of the memory circuit 701. In this case, when the password is incoincident, unlike in the case of inputting an address selection of the memory circuit 701, one or a plurality of bits are inverted, whereby the addresses are discontinuous but not continuous unlike for input. As a result, the digital signal read by such discontinuous addresses is meaningless as audio information any longer, thereby making information protection possible in this case as in the previous case.

The embodiment of FIG. 17 or FIG. 18 may be combined with that of FIG. 19 to configure a security circuit including one or a plurality of EOR gates for data and address respectively. In this way, the combination of data and the related address makes tighter information protection possible.

Figure 20:
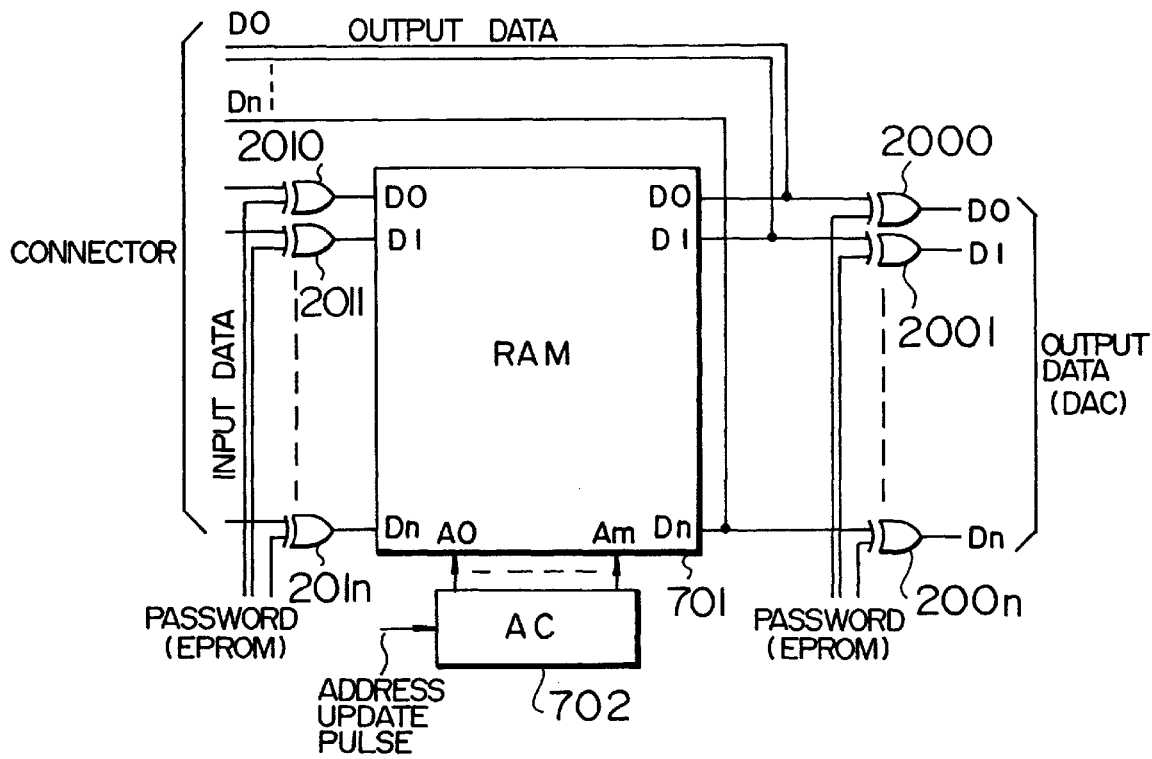
FIG. 20 is a circuit diagram showing a further embodiment of the security circuit used in a digital signal selling system according to the present invention.

FIG. 20 is a circuit diagram showing a further embodiment of the security circuit used with a digital signal selling system according to the present invention. This embodiment is mainly aimed at preventing duplication of a digital signal. The player 101 has passwords registered therein by EPROM or the like. These passwords are codes not notified even to the purchaser of the player 101.

Each bit of these codes is supplied to one of the inputs of the EOR gates 2000 to 200n, 2010 to 201n inserted in the input and output of the memory circuit 701. In FIG. 20, an EOR gate is provided for all the bits of the data input and output of the memory circuit 701. Instead, the EOR gates 2000 to 200n, 2010 to 201n may be inserted for only a given one or a plurality of bits. Each corresponding input and output, however, are provided as a pair with EOR gates 2000 to 200n, 2010 to 201n respectively.

The data input bit for which the input of the ROR gates 2000 to 200n, 2010 to 201n have been reduced to "0" by the above-mentioned password is written directly, while the data input bit for which the input of the EOR gates 2000 to 200n, 2010 to 201n has been made "1" by the above-mentioned password is written in inverted form.

The digital signal read out of the memory circuit 701 is applied through the EOR gates 2000 to 200n, 2010 to 201n controlled by the above-mentioned same password, whereby the through bits remain through bits, while inverted bits are inverted again into the original form. As a result, the same digital signal as an input digital signal is transmitted to the digital-to-analog converter 707, thereby posing no problem in audio playback.

In contrast, the reading itself of the memory circuit 701 is outputted to the connector side. In other words, a digital signal bit-converted by the password is outputted on the write circuit side. As a result, a copied digital signal, unlike the original digital signal, becomes a meaningless one, and therefore the duplication is substantially prevented. By the way, the password may be comparatively easily decoded by any person having the knowledge of digital circuits. In view of the selling price of the news, stock market news or the music program mentioned above, however, the labor required for destroying the security would be higher and more meaningless. Specifically, the security in the digital signal selling system according to this invention is sufficient if an easy duplication or eavesdropping can be prevented.

Figure 21:
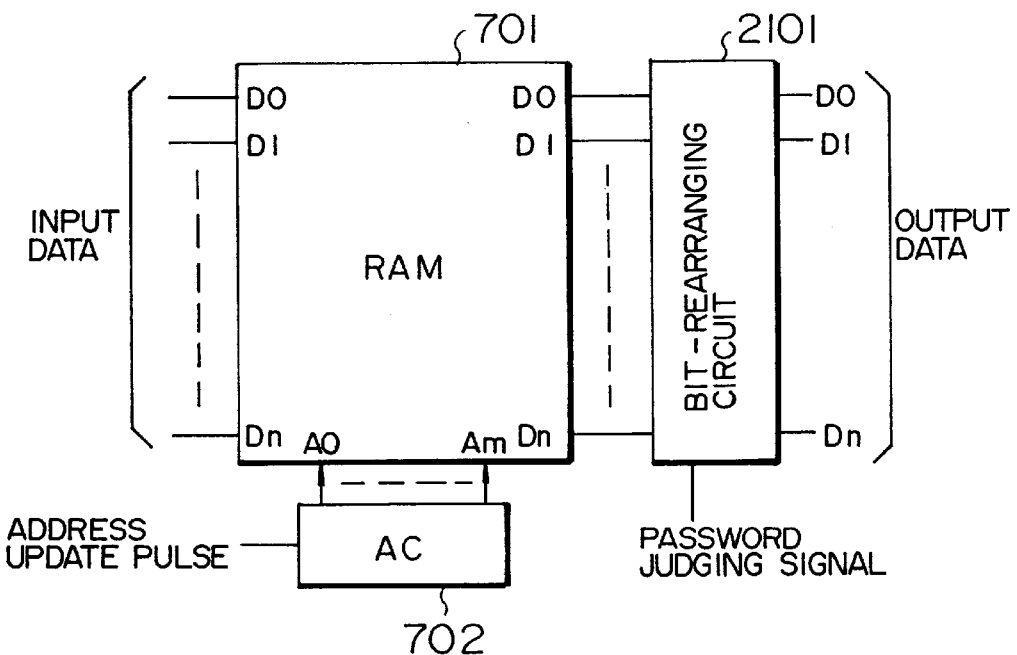
FIG. 21 is a circuit diagram showing a still further embodiment of the security circuit used in a digital signal selling system according to the present invention.

FIG. 21 is a circuit diagram showing still another embodiment of the security circuit used with the digital signal selling system according to the present invention. In this embodiment, instead of the EOR gates for passing a signal in direct or inverted form, a bit-rearranging circuit 2101 is used. The bit-rearranging circuit 2101 has two signal routes, one for outputting an input signal in its direct form, and the other for spatially exchanging the output-side bits D0 to Dn for the input-side bits D0 to Dn. Specifically, the least significant bit D0 is outputted as the most significant bit Dn, or D1 is outputted as D2. If the password judging signal is incoincident, this bit-rearranging circuit enables a digital signal to be outputted with meaningless ones destroyed. This bit-rearranging circuit 2101 may be inserted on the input-side data in place of the EOR gates shown in FIG. 18, or on the address input side in place of the EOR gates shown in FIG. 19.

Figure 22:
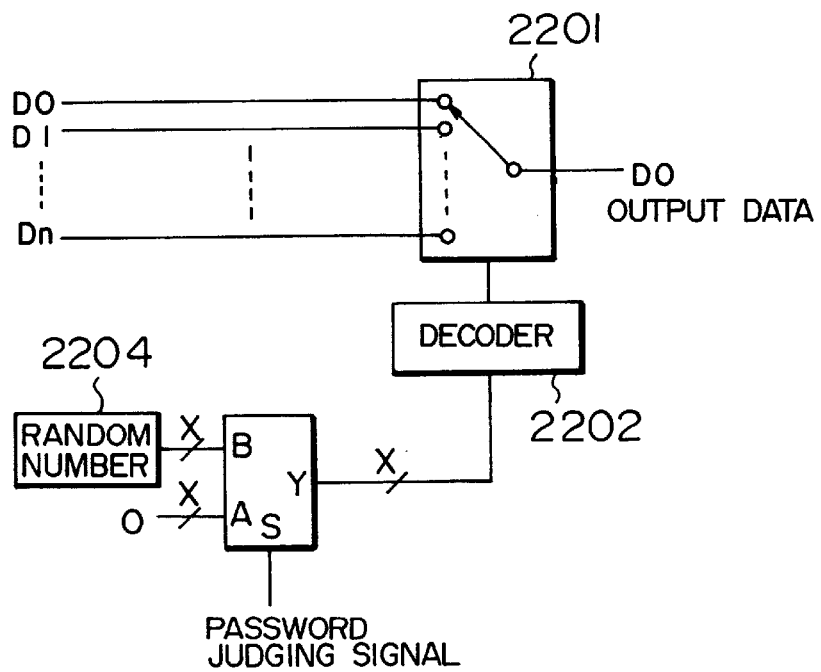
FIG. 22 is a specific circuit diagram showing an embodiment of a bit exchanger used in the security circuit of FIG. 21.

FIG. 22 is a specific circuit diagram showing an embodiment of the bit-rearranging circuit 2101 used with the above-mentioned security circuit.

In FIG. 22, a bit-rearranging circuit for one bit is illustratively shown for a digital signal including a plurality of bits.

One of input digital signals of a plurality of bits including D0 to Dn is selected by a selector 2201 and outputted as the least significant bit D0 from the output terminal. The selector 2201 selects and outputs one of the signals D0 to Dn by a selection signal formed by a decoder 2202.

In the case where the digital signals D0 to Dn are eight bits, a random number generator 2204 generates a 3-bit random number (0 to 7 in decimal notation), which is supplied to the input terminal B of the multiplexer 2203. The other input terminal A of the multiplexer 2203 is supplied with a 3-bit binary signal (000) designating the decimal zero corresponding to the output bit D0. The selection terminal S of the multiplexer 2203 is supplied with a password judging signal. The password judging signal becomes a logic zero when the password is coincidental, so that the signal of the input A of the multiplexer 2203 is sent from the output Y.

As described above, when the password is coincidental, the decimal zero corresponding to the output bit D0 is inputted to the decoder 2202 through the multiplexer 2203, and therefore a selection signal of the input bit D0 is formed and supplied to the selector 2201 by the decoder 2202. When the password is incoincident, on the other hand, the 3-bit signal generated by the random number generator 2204 is selected and inputted to the decoder 2202. As a result, the decoder 2202 decodes a 3-bit signal and forms one selection signal from the 8-bit input signals D0 to Dn. The probability of the input signal D0 being selected is 1/8. since a similar circuit is provided also for the remaining 7-bit output signals, the probability of the input signals D0 to Dn being outputted in their direct form even when the password is incoincidental is as small as 1/(8×8×8×8×8×8×8×8)=1/16777216, thus making information protection possible. The feature of this circuit lies in that since the random number generator 2204 makes the combination of bit exchange different in each case, it is substantially impossible to decode true data from the bit train outputted.

Now, explanation will be made about an embodiment of the function of preventing the digital signal stored in the memory circuit 701 of the player 101 from being read rightly from outside. Normally, the data terminal (D in FIG. 4) of the player 101 has the input and output thereof shared with each other. And an output enable signal is supplied for keeping the data terminal in output state. In other words, although the logic level is not specifically limited, the player 101 has the data terminal thereof kept in output state only when the output enable signal is valid (logic "1" according to the present invention). As a result, the duplication preventing circuit is inserted, though not specifically limited, in the part related to the data read route.

Figure 23:
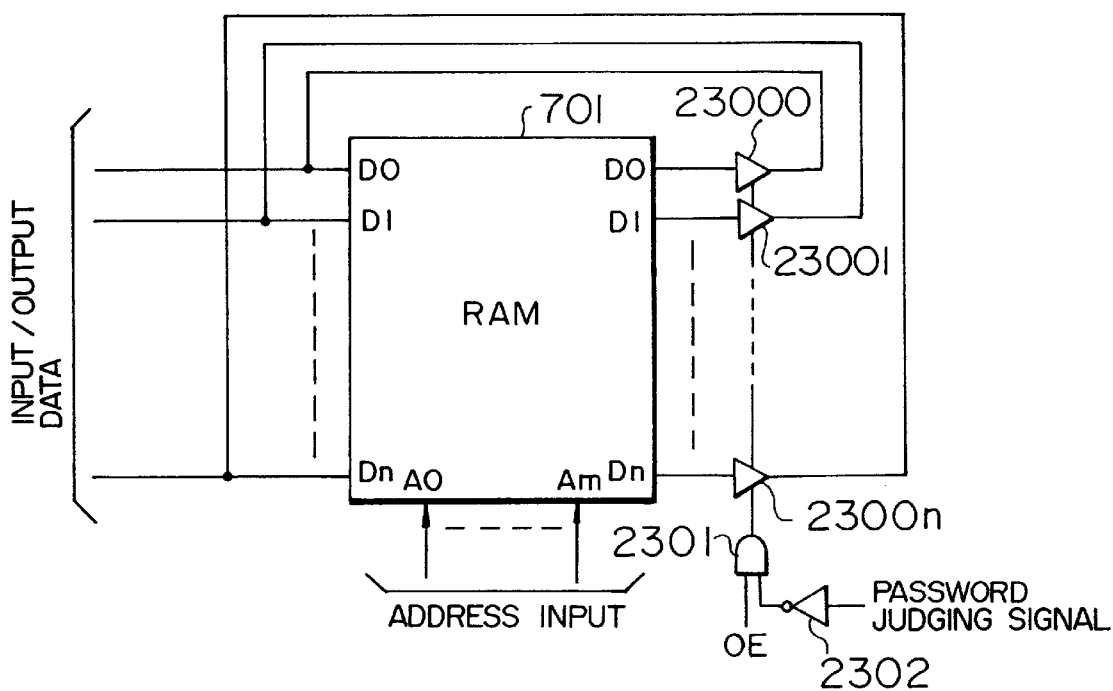
FIG. 23 is a circuit diagram showing an embodiment of the security circuit suitable for copy prevention used in a digital signal selling system according to the present invention.

FIG. 23 is a circuit diagram showing an embodiment of the security circuit suitable for duplication prevention used with a digital signal selling system according to the present invention. In order to allow a specified person to duplicate, the read output section of the memory circuit 701 has an AND gate 2301 for controlling an output enable signal OE by a password judging signal and buffers 23000 to 2300n with the outputs thereof controlled by the output enable signal OE. These buffers 23000 to 2300n are adapted to maintain the outputs thereof in high impedance state as long as the control input is not logic "1". Normally, these buffers 23000 to 2300n are provided as parts corresponding to all the bits of the read signals D0 to Dn.

The input data terminal of the memory circuit 701 is supplied directly with a digital signal transferred from the terminal device 100. In the case of using a semiconductor memory with the input and output of the memory circuit 701 shared with each other, the buffers 23000 to 2300n are inserted on the read signal route of the signal bus connected with the data terminal of the memory circuit. A digital signal is read from the memory circuit 701 by an address signal generated by the address counter 703 not shown. Also, the output enable signal OE is inputted to the AND gate 2301 together with a password judging signal, which is controlled by the password judging signal inverted by the inverter 2302.

This password is set in advance in the player 101 by switch, ROM, etc., and is notified to the purchaser at the time of purchase of the player 101. As a result, when a stored digital signal is read out by the player 101, the above-mentioned password is set. When a password registered by a comparator, etc. not shown coincides with an inputted password, the password judging signal is reduced to logic "0", and after being inverted in the inverter 2302, is inputted to the AND gate 2301. Thus the AND gate 2301 outputs a logic "0" signal when the output enable signal OE is logic "0", and a logic "1" signal when the output enable signal OE is logic "0". In this way, when the password judging signal is logic "0", the buffers 23000 to 2300n are controllable by the output enable signal OE.

In contrast, when the password registered by a comparator, etc. not shown is judged to coincide with the inputted one, the password judging signal is made logic "1", and after being inverted in the inverter 2302, is inputted to the AND gate 2301. As a result, the AND gate 2301 outputs a logic "0" signal regardless of whether the output enable signal OE is logic "0" or "1". In this way, when the password judging signal is logic "1", the outputs of the buffers 23000 to 2300n are maintained at high impedance state regardless of the output enable signal OE. As a result, an easy duplication is prevented by requiring a password when the data of the memory circuit 701 is outputted outside.

Figure 24:
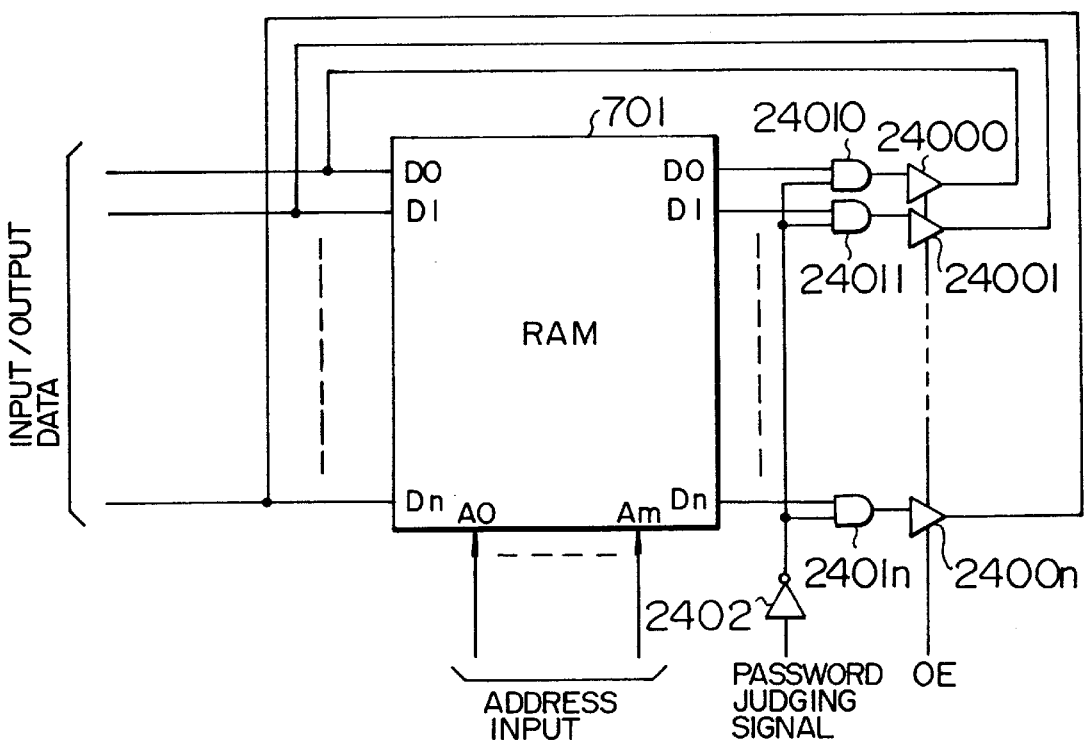
FIG. 24 is a circuit diagram showing another embodiment of the security circuit suitable for copy prevention used in a digital signal selling system according to the present invention.

FIG. 24 is a circuit diagram showing another embodiment of the security circuit suitable for duplication prevention used with a digital signal selling system according to the present invention. In this embodiment, the read output section of the memory circuit 701 has AND gates 24010 to 2401n for controlling the output of the memory circuit 701 by a password judging signal and buffers 24000 to 2400n with the output thereof controlled by the output enable signal OE. Also in this case, duplication is prevented as in the previous case by a password no-concidence signal. From this embodiment involving one or a given number of bits of data, it is easily understandable that the AND gates may be replaced with equal effect by OR gates or EOR gates.

Figure 25:
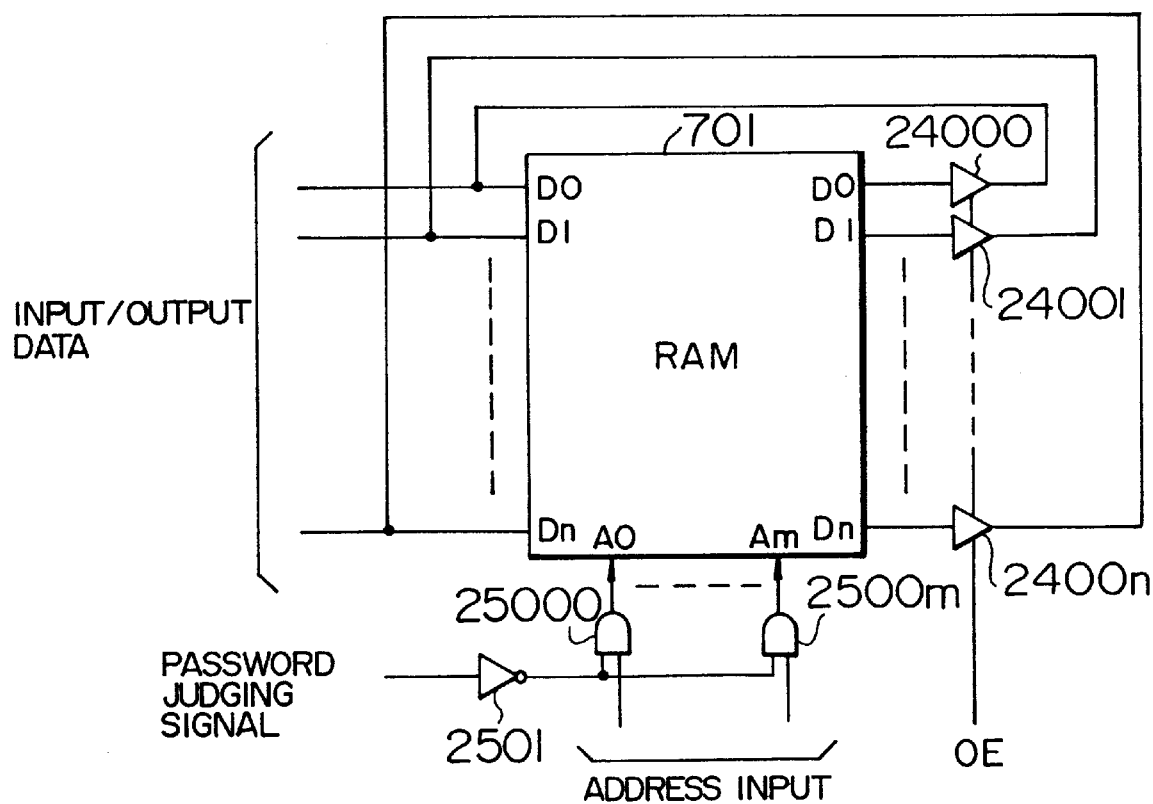
FIG. 25 is a circuit diagram showing still another embodiment of the security system suitable for copy prevention used in a digital signal selling system according to the present invention.

FIG. 25 is a circuit diagram showing still another embodiment of the security circuit suitable for duplication prevention used with a digital signal selling system according to the present invention. This embodiment has a security circuit using a password coincidence signal and AND gates 25000 to 2500m on the address input terminal side of the memory circuit 701. When the password is not coincident, unlike in the case where the address selection of the memory circuit 701 makes up an input, one or a plurality of bits are fixed to logic "0", and therefore a continuous address at the input is changed to a discontinuous one at the output. The digital signal read by this discontinuous address is meaningless and not right information any longer, thus making it possible to protect information as in the previous case. According to this embodiment, as in the embodiment shown in FIG. 24, one or a given number of bits of the address input are involved, and therefore it is easily understood that the AND gates may be replaced by OR or EOR gates with equal effect.

Figure 26:
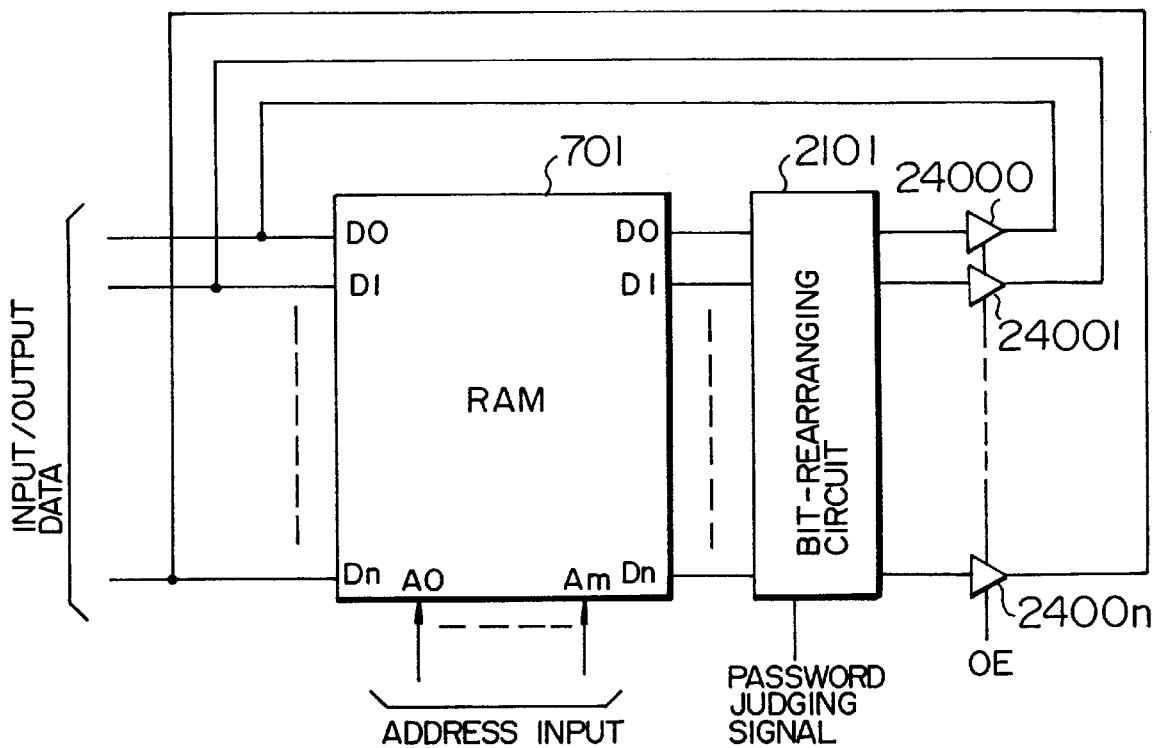
FIG. 26 is a circuit diagram showing a further embodiment of the security circuit suitable for copy prevention used in a digital signal selling system according to the present invention.

FIG. 26 is a circuit diagram showing a still further embodiment of the security circuit suitable for duplication prevention used with a digital signal selling system according to the present invention. In this embodiment, a bit-rearranging circuit 2101 is used as in the embodiment of FIG. 21 in place of the means for controlling bits by an AND gate mentioned above. A typical bit-rearranging circuit has two signal routes, one for outputting an input signal in its own form, and the other for spatially replacing the input bits D0 to Dn with the output side bits D0 to Dn, or more specifically, for outputting the least significant bit D0 as the most significant bit Dn, or D1 as D2. If the password judging signal indicates no-coincidence, this bit-rearranging circuit enables a digital signal to be destroyed and outputted in meaningless form.

Figure 27:
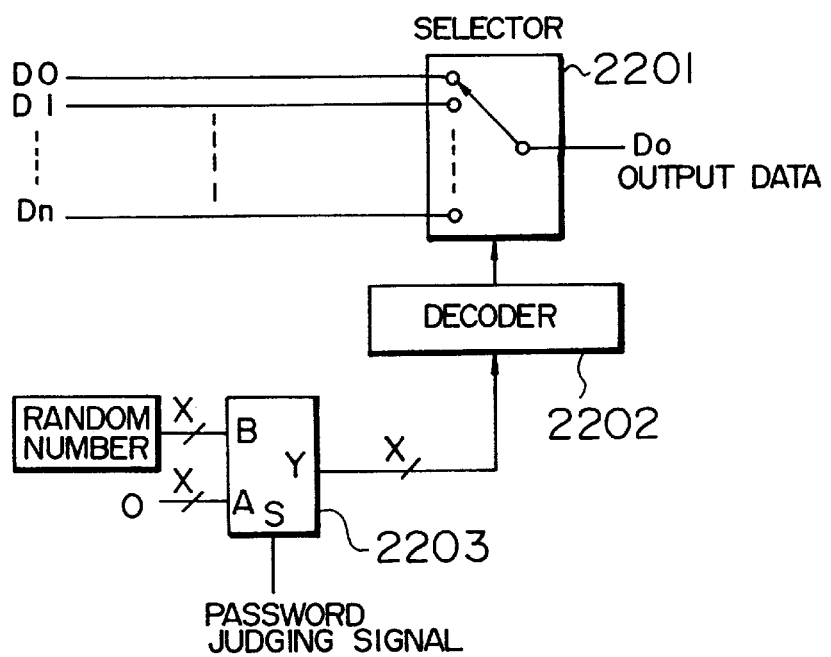
FIG. 27 is a specific circuit diagram showing an embodiment of the bit exchanger used with the security circuit of FIG. 26.

FIG. 27 is a specific circuit diagram showing an embodiment of the bit-rearranging circuit 2101 similar to the one shown in FIG. 22 used with the security circuit described above.

A one-bit-rearranging circuit for a digital signal having a plurality of bits is shown as a typical example in FIG. 27.

A digital signal of a plurality of bits including D0 to Dn is inputted to a selector 2201 where one of them is selected and outputted as the least significant bit D0 from the output terminal. The selector 2201 selects and outputs one of the bits D0 to Dn by a selection signal formed by the decoder 2202.

In the case where the digital signals D0 to Dn are eight bits, the random number generator 2204 generates a 3-bit random number (0 to 7 in decimal notation), and supplies it to the input terminal B of the multiplexer 2203. The other input terminal A of the multiplexer 2204 is supplied with a 3-bit binary signal (000) for designating a decimal 0 corresponding to the output bit D0. The selection terminal S of the multiplexer 2203, on the other hand, is supplied with a password judging signal. The password judging signal is reduced to logic "0" and causes the signal of the input A of the multiplexer 2203 to be transmitted from the output Y when the password is coincident.

When the password is coincident as mentioned above, the decimal 0 corresponding to the output bit D0 is inputted to the decoder 2202 through the multiplexer 2203, and therefore the decoder 2202 forms and supplies a selection signal of the input bit D0 to the selector 2201. As a result, the selector 2201 outputs an output signal D0 in the same form as the input signal D0. When the password is not coincident, by contrast, a 3-bit signal generated by the random number generator 2204 is selected and inputted to the decoder 2202. The decoder 2202 thus decodes the 3-bit signal and forms one selection signal out of the 8-bit input signals D0 to Dn. The probability of the input signal D0 being selected is 1/8. A similar circuit is provided also for the remaining 7-bit output signals, so that the probability of the input signals D0 to Dn being outputted in their own form even when the password is not coincident is 1/(8×8×8× 8×8×8×8×8)=1/16777216, which is sufficiently low to protect confidential information. The feature of this circuit lies in that since bit exchange combinations are differentiated by the random number generator 2204, it is substantially impossible to decode the true data from a bit train output.

Figure 28:
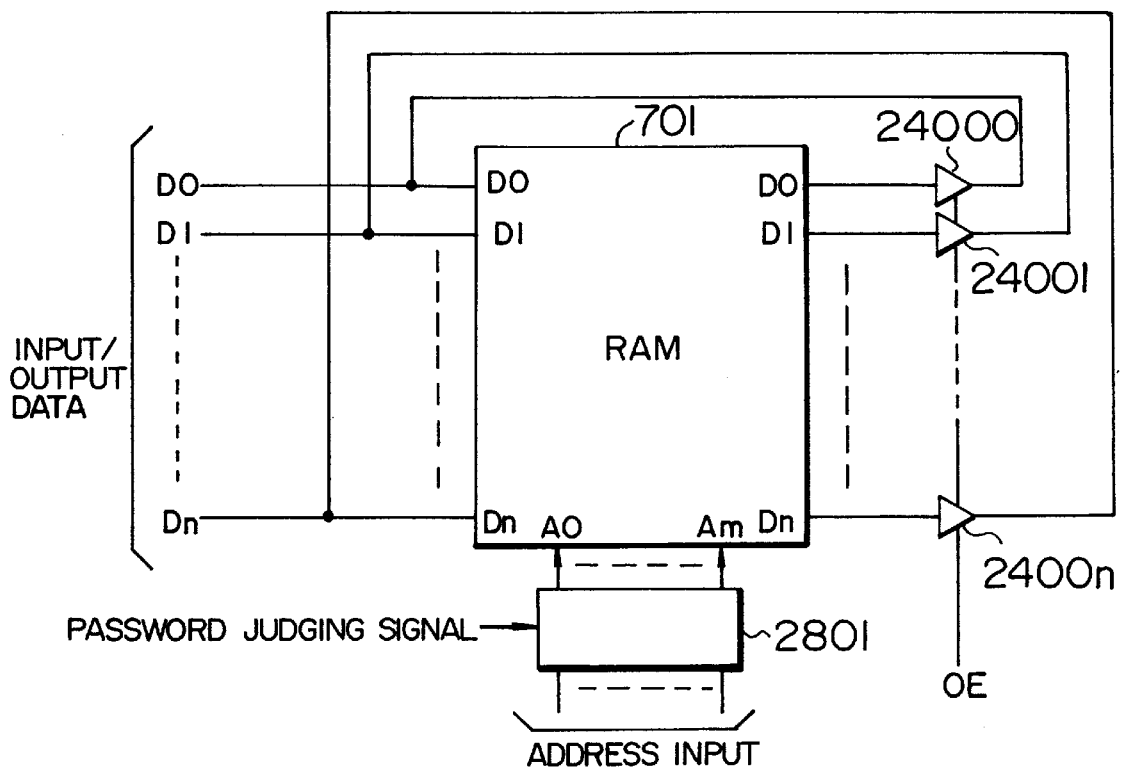
FIG. 28 is a circuit diagram showing a still further embodiment of the security circuit suitable for copy prevention used in a digital signal selling system according to the present invention.
Figure 29:
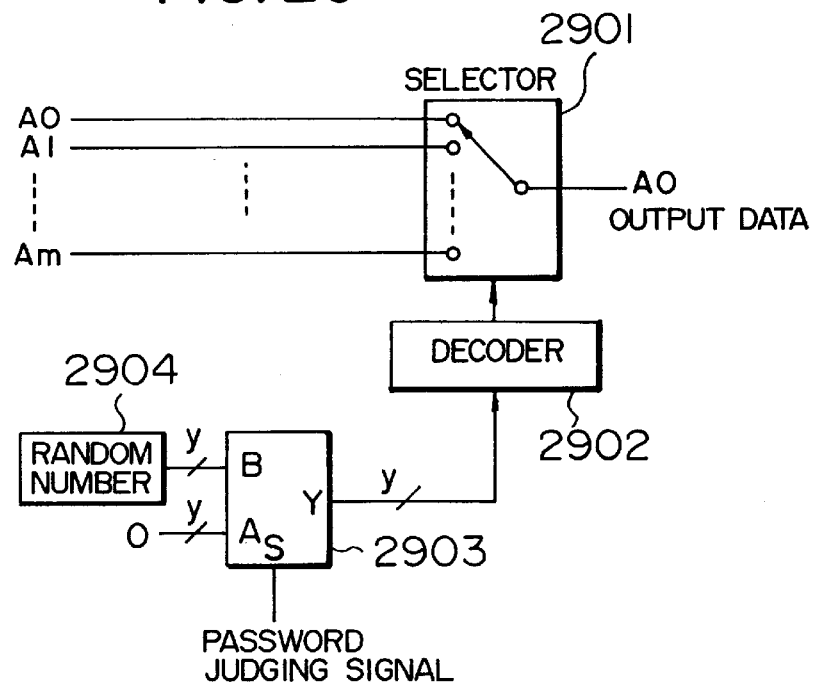
FIG. 29 is a specific circuit diagram showing an embodiment of the bit exchanger used with the security circuit of FIG. 28.

FIG. 28 is a circuit diagram showing 9 still another embodiment of the security circuit suitable for duplication prevention used with a digital signal selling system according to the present invention. In this embodiment, as in the embodiment shown in FIG. 26, the bit-rearranging circuit 2801 is used for address input. FIG. 29, on the other hand, is a specific circuit diagram showing an embodiment of the bit-rearranging circuit 2801 similar to the one shown in FIG. 27 used with the security circuit. The concept of this embodiment is identical to that of the embodiments shown in FIGS. 26 and 27 except that the data and address have different bit lengths.

Figure 30:
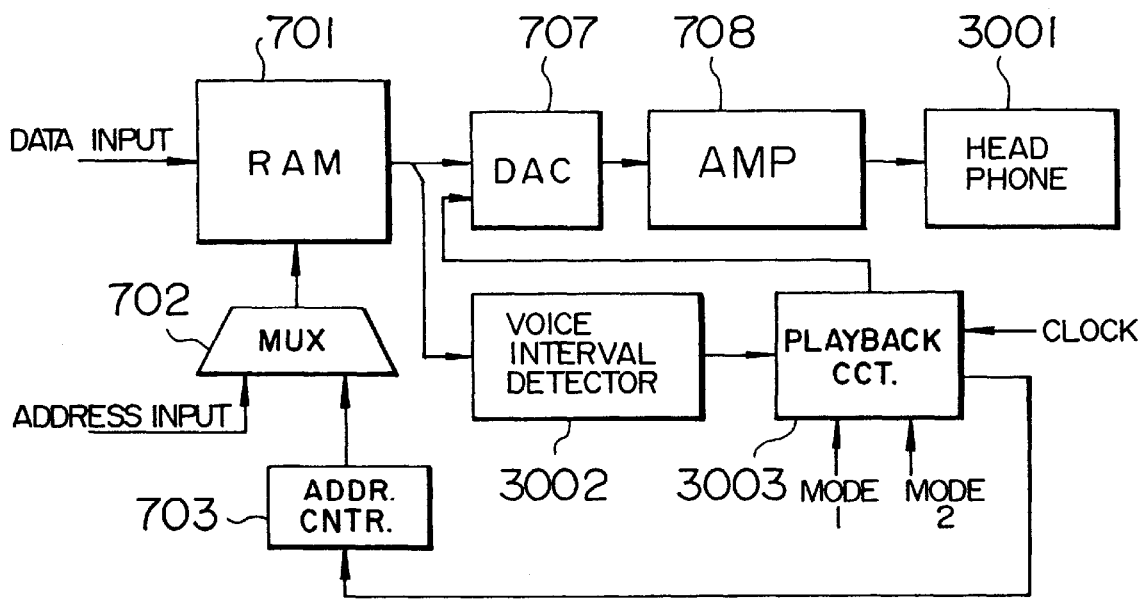
FIG. 30 is a block diagram showing an embodiment of a digital audio signal processor for realizing the fast and slow playback according to the present invention.

FIG. 30 is a block diagram showing an embodiment of a digital audio signal processor for realizing fast and slow playback with high sound quality.

According to the digital signal selling system mentioned above, fast playback is considered effective for listening to such information as news and various market situations in short time. In the case where the player user is an aged person or the like, on the other hand, it is considered effective to add the slow playback function in view of the fact that it takes some time before the language is understood.

In an analog-type recording system such as the conventional cassette tape recorder, the tape speed may be changed to assure slow or fast playback by changing the playback time as compared with the recording time. When the tape speed is changed this way, however, the pitch (frequency) is also undesirably changed, resulting in the loss of fidelity to the original sound, thereby making it very hard to listen to.

On the other hand, the playback speed may be changed without changing the pitch by the use of the signal processing technique using a digital signal processor or the like. In such a system, however, the configuration is complicated with an increased power consumption, with the result that it cannot be mounted on the portable player and at the same time the cost is very high. Further, such a system is effective only for voice and the reproduction of a music program is difficult.

According to the present embodiment, the voice interval contained in the audio information is utilized in such a manner that the voice interval is shortened or substantially deleted for fast playback and enlarged or extended for slow playback. By employing this system, a high sound quality is maintained since the pitch of the original sound remains unchanged in both fast and slow playbacks. In addition, this configuration, as described later, is realizable with a comparatively simple combination of logic circuits without using any expensive, complicated devices like the digital signal processor, thus making possible a system low in price and small in size.

The embodiment of FIG. 30 concerns a case in which the system is mounted on the player 101 of the digital signal selling system.

The digital audio signal read from the memory circuit 701 is inputted to a digital-to-analog converter 707 on the one hand and to a voice interval detector 3002 on the other hand. The voice interval detector 3002 may be made up of a circuit similar to the one used in the quantizing noise neglector 1500 in the embodiment of FIG. 15. In the case where the quantizing noise remover 1500 is also incorporated, the voice interval detector 3002 may be shared therewith in operation. The output signal of the voice interval detector 3002 is inputted to a fast/slow playback circuit 3003. The fast or slow playback is designated for the fast/slow playback circuit 3003 under the control signals of modes 1 and 2. This fast/slow playback circuit 3003 controls the operation of the address counter 703 for forming a read address signal of the memory circuit 701 in response to a mode signal. When the fast playback is designated by mode 1, for example, the clock frequency is increased beyond normal level to increase the speed of reading the memory circuit 701 during a voice interval which may be detected, thus substantially shortening the voice interval to achieve fast playback.

Assume that the slow playback is designated by mode 2. When a voice interval is detected, the clock frequency is decreased below normal level or suspended for a predetermined length of time thereby to enlarge or extend the read time for the memory circuit 701 during the voice interval, thus achieving the slow playback. The output signal of the address counter 703 is inputted to the memory circuit 701 through the multiplexer 702. When a digital signal is written into the memory circuit 701, the multiplexer 702 causes an external address signal to be inputted to the memory circuit 701, while when a digital signal stored in the memory circuit is read, i.e., at the time of playback of the digital signal, the address signal generated by the address counter 703 is inputted to the memory circuit 701.

Figure 31:
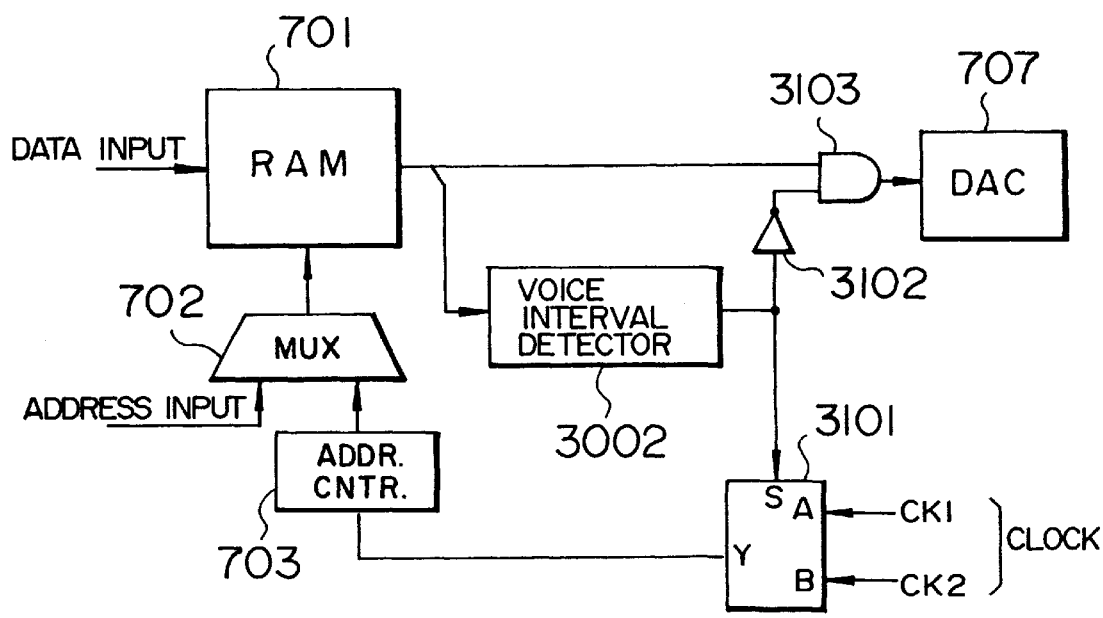
FIG. 31 is a block diagram showing a specific example of a fast playback circuit according to the present invention.

FIG. 31 is a block diagram showing a specific embodiment of the fast playback circuit.

According to this embodiment, the output signal of the voice interval detector 3002 is supplied through an inverter 3102 to an AND gate 3103. This AND gate 3103 is for inputting the digital signal from the memory circuit 701 to a digital-to-analog converter 707, and is configured the same way as the quantizing noise remover 1500. Specifically, this embodiment is intended to achieve the fast playback while at the same time eliminating the quantizing noises during the same interval.

The output signal of the voice interval detector 3002 is inputted to the control terminal S of the multiplexer 3101. The mutiplexer 3101 is adapted to input two clock pulses CK1 and CK2 selectively to the address counter 703 in accordance with the output signal of the voice interval detector 300 inputted to the control terminal S. The clock pulse CK1, for example, is one corresponding normally to playback, and is adapted to have a frequency corresponding to the sampling rate of the digital signal. The clock pulse CK2, by contrast, is used for fast playback and has a frequency about ten times higher than the clock pulse CK1.

As long as the fast playback is designated, upon judgement of a voice interval by the voice interval detector 3002, the output signal is raised to high level (logic "1"). In response to this, the output signal of the inverter 3103 is reduced to low level (logic "0"), and the AND gate 3103 is closed. In the case of a digital signal of 2' complement binary code as mentioned above, therefore, the digital signal inputted to the digital-to-analog converter 707 during a voice interval is forcibly made to correspond to the "0" level. Also, with the rise of the output signal of the voice interval detector 3002 to high level, the multiplexer 3101 inputs the clock CK2 instead of the clock CK1 to the address counter 703. As a result, the address counter 703 updates the address at the rate ten times higher than in normal playback operation. The voice interval is thus shortened to about one tenth, thus assuring fast playback equivalently.

An experiment conducted by the inventor shows that the voice interval accounts for a comparatively long time or 30% to 50% of every type of conversation or lecture as well as the news program in which a text is read. By eliminating this voice interval virtually, the playback time can be shortened to about ⅔ to ½.

At the end of a voice interval, the normal playback is immediately restored, and therefore the sound quality remains the same as the original sound, thereby making it very easy to listen to. In the case where the fast playback is to be stopped in the circuit according to the present embodiment, the only thing required is to input the output signal of the voice interval detector 3002 to the control terminal S of the multiplexer 3101 through the AND gate and the like newly added. When no fast playback is desired, on the other hand, the input to the AND gate is reduced to "0". Then, the control terminal S of the multiplexer 3101 is always kept at low level, so that the clock CK1 is inputted to the address counter 703 even during a voice interval and a voice interval level is outputted for a time length corresponding to the voice interval. In the process, the AND gate 3103 functions as a quantizing noise remover to prevent a quantizing noise from being generated during the particular period.

Figure 32:
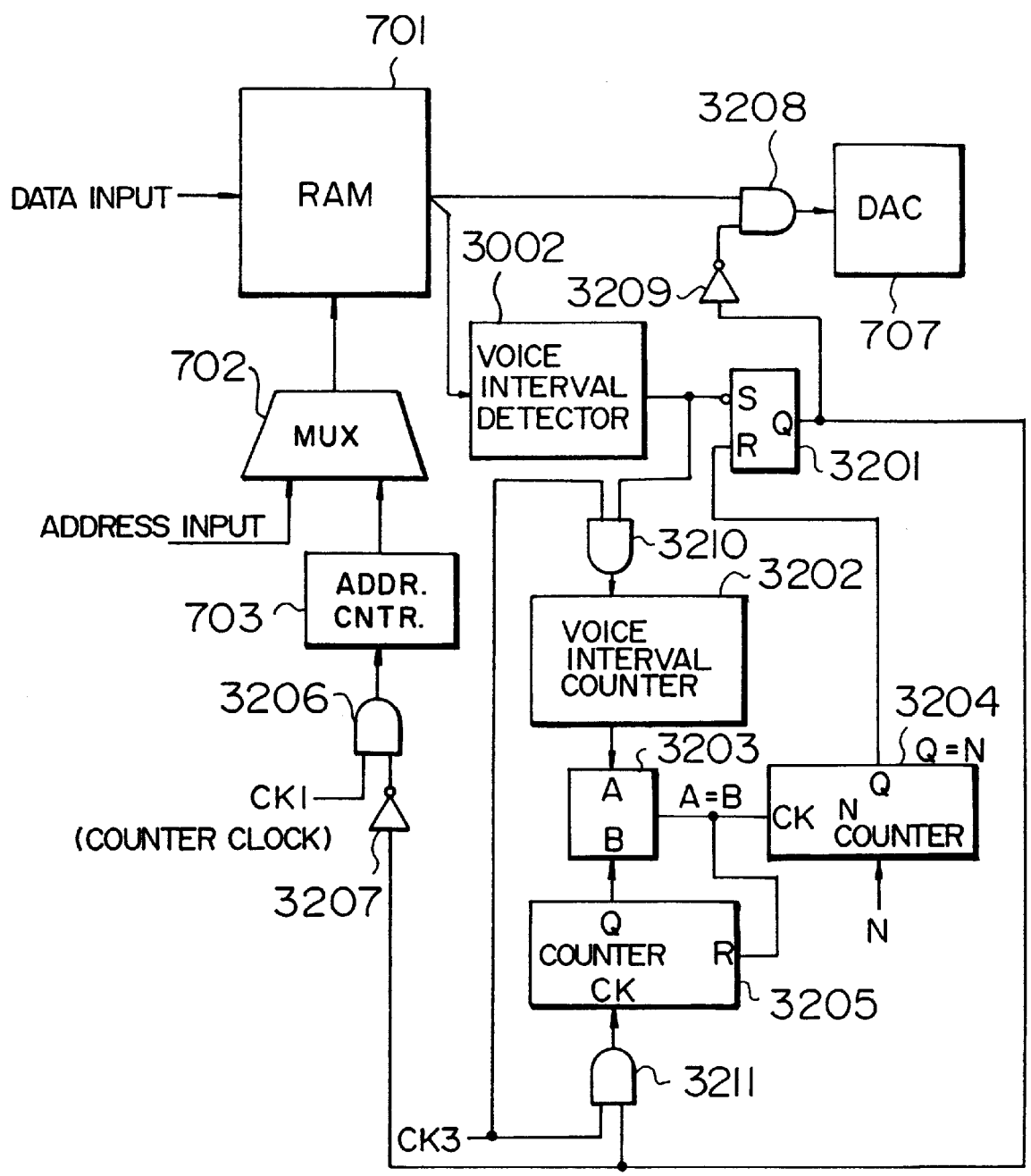
FIG. 32 is a block diagram showing a specific example of the slow playback circuit according to the present invention.

FIG. 32 is a block diagram showing a specific embodiment of the slow playback circuit.

This embodiment is intended to generate a voice interval enlarged in proportion to the true voice interval for slow playback. The output signal of the voice interval detector 3002 described above is supplied to the set input S of a flip-flop 3201 on the one hand, and to one of the inputs of the AND gate 3210 on the other hand. The other input terminal of the AND gate 3210 is supplied with a clock pulse CK3 for measuring the voice interval. The output signal of the AND gate 3210 is inputted to a voice interval counter 3202. During the period when the presence of a voice interval is judged by the voice interval detector 3002, the voice interval counter 3202 counts the clock pulses CK3 thereby to conduct a counting operation corresponding to the particular voice interval. The counter 3205 counts the clock pulses CK3 supplied thereto through the AND gate 3211. The voice interval counter 3202 is for holding information as well as for measuring the time of the voice interval. The counter 3205 for counting the same clock pulses CK3 as this voice interval information performs the operation of reproducing the particular voice interval. Specifically, the outputs of the voice interval counter 3202 and the counter 3205 are inputted to a comparator 3203 and the resulting coincidence output A=B is counted by an N counter 3204.

The N counter 3204 is for designating the voice interval at N times as longer, and though not specifically limited, has an N value variable. The N counter 3204 is of programmable type, and when the count Q comes to coincide with N, outputs a coincidence signal Q (=N) and resets the flip-flop 3201. This N counter 3204 may also be realized by using a down counter. Also, an arrangement may be made to conduct the down counting from the initial value N, and reset the flip-flop 3201 by a borrow output when the count reaches zero.

The output signal Q of the flip-flop 3201 is inverted by the inverter 3209 and is used as a control signal for the AND gate 3208 having the function of neglecting quantizing noises. The output signal Q is also used for controlling the AND gate 3211 for supplying the clock pulse CK3 to the counter 3205 and the AND gate 3206 through the inverter 3207 at the same time. This AND gate 3206 functions as a gate for supplying the clock pulse CK1 selectively to the address counter 703.

The circuit operation of this embodiment will be described. Upon detection of a voice interval at the voice interval detector 3002, the AND gate 3210 opens to supply the clock pulse CK3 to the voice interval counter 3202. As a result, the voice interval counter 3202 counts the clock pulses CK3 as long as a voice interval is judged by the voice interval detector 3002. When the voice interval detector 3002 judges that an audio digital signal has been inputted, the flip-flop 3201 is set in synchronism with the change of the detection signal from high to low level, so that the output signal Q becomes high in level, and a digital signal associated with the voice internal level is supplied to the digital-to-analog converter 707 in place of the digital signal from the memory circuit 701.

In accordance with the change of the output signal Q of the flip-flop 3201 to logic "1", the output signal of the inverter 3207 becomes logic "0", thereby closing the AND gate 3206. As a consequence, the address counter 703 is not supplied with any clock pulse CK1, and therefore is left to hold the previous address. In other words, the reading operation of the memory circuit 701 is stopped.

With the change of the output signal Q of the flip-flop 3201 to logic "1", the AND gate 3211 opens, and the counter 3205 starts to count the clock pulses CK3. When the count becomes equal to that of the voice interval counter 3202, the comparator 3203 outputs a coincidence signal A=B, thereby energizing the N counter 3204 while at the same time resetting the counter 3205. When the N counter counts the value N as a result of repeating these processes of operation the flip-flop 3201 is reset. Specifically, when the voice interval measured by the voice interval counter 3202 increases N times as large, the flip-flop 3201 is reset. With the resetting of the flip-flop 3201, the AND gate 3206 opens again, and inputs the clock pulse CK1 to the address counter 703. As a result, the reading of the digital signal from the memory circuit 701 is substantially restarted. At the same time, the AND gate 3208 is opened, and the digital signal thus read is supplied to the digital-to-analog converter 707. Thus the audio signal is outputted again. In this configuration, the extension of the voice interval is proportional to the voice interval of the original sound. Therefore, a conversation or lecture is accordingly increased in the length of interval and is made less offensive to the ear.

When a voice interval is counted, the quantizing noise is outputted as described above. For removing this quantizing noise generated during the counting of a voice interval, a method is by inverting the output signal of the voice interval detector 3002 through an inverter to control the AND gate 3208. In such a case, a three-input AND gate is used as the AND gate 3208. When a voice interval is counted, the quantizing noise is eliminated by the output signal of the voice interval detector 3002 added as above, and by the output signal Q of the flip-flop 3201 while the voice interval is enlarged subsequently, as described above.

Figure 33:
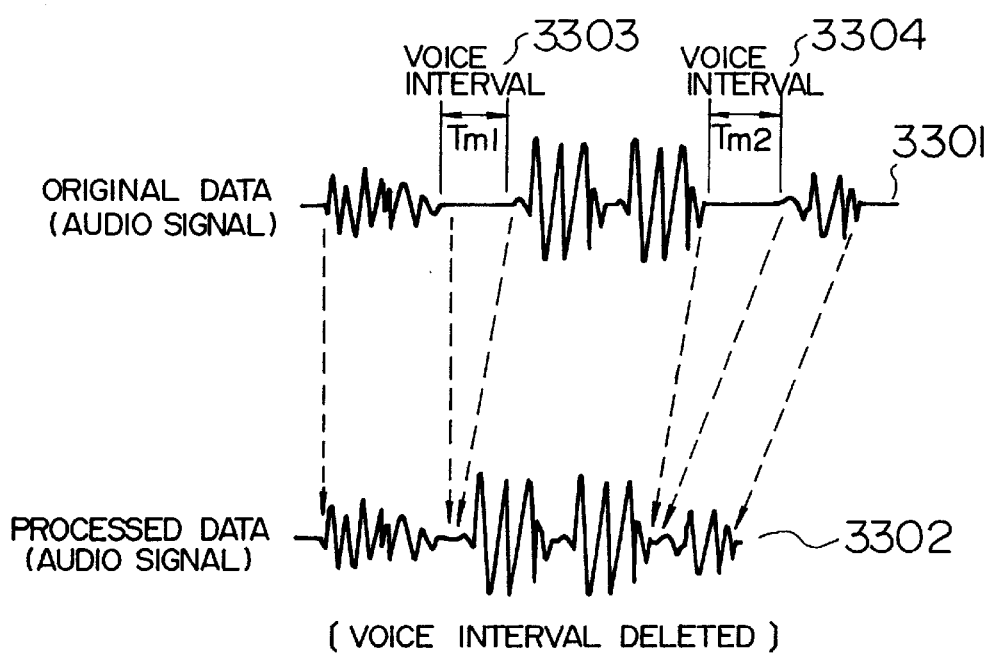
FIG. 33 is a diagram showing waveforms for operation corresponding to the fast playback circuit of FIG. 31.

FIG. 33 shows waveforms of operation associated with the fast playback circuit of FIG. 31. The voice intervals 3303 (Tm1) and 3304 (Tm2) of the original signal 3301 can be removed substantially by switching the clock pulses supplied to the address counter 703 during such intervals, and therefore the fast playback is made possible without changing the pitch (frequency) of the audio signal, i.e., without deteriorating the sound quality of the audio signal.

Figure 34:
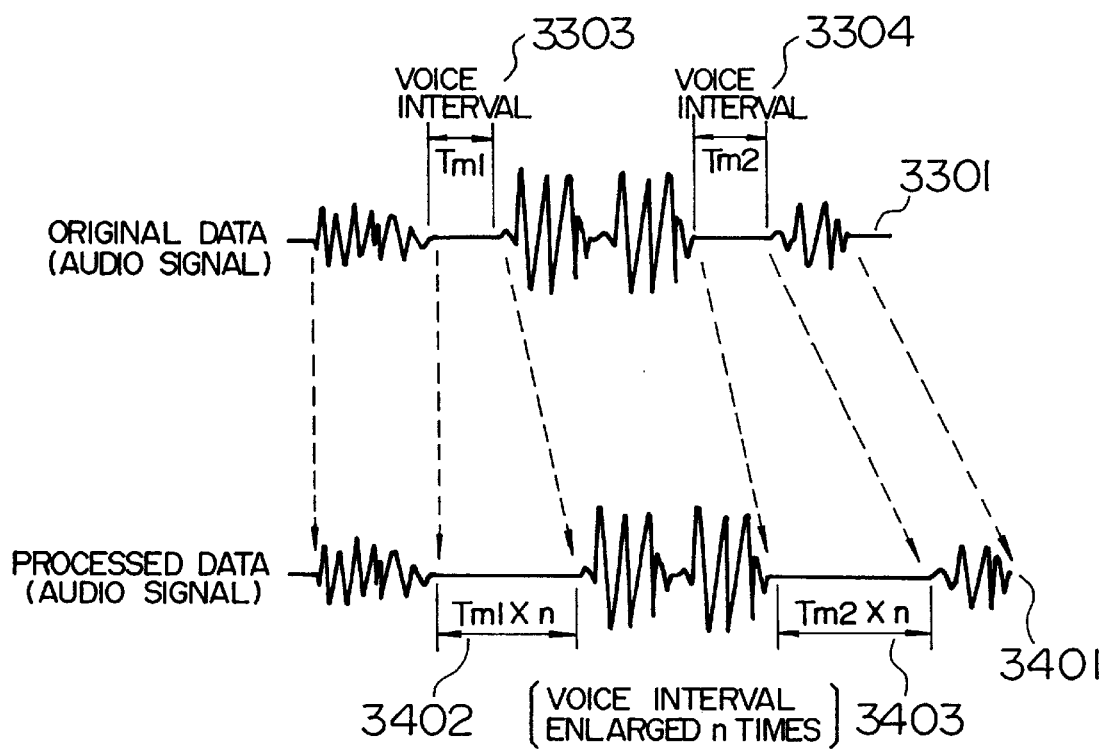
FIG. 34 is a diagram showing waveforms for operation corresponding to the slow playback circuit of FIG. 32.

FIG. 34 shows waveforms of operation associated with the slow playback circuit of FIG. 32. Since the voice intervals 3303 (Tm1) and 3304 (Tm2) of the original signal are enlarged to n times as large by suspending the operation of the address counter 703 during the same intervals, the slow playback is realized without changing the pitch (frequency) of the audio signal, i.e., without deteriorating the sound quality of the audio signal.

Figure 35:
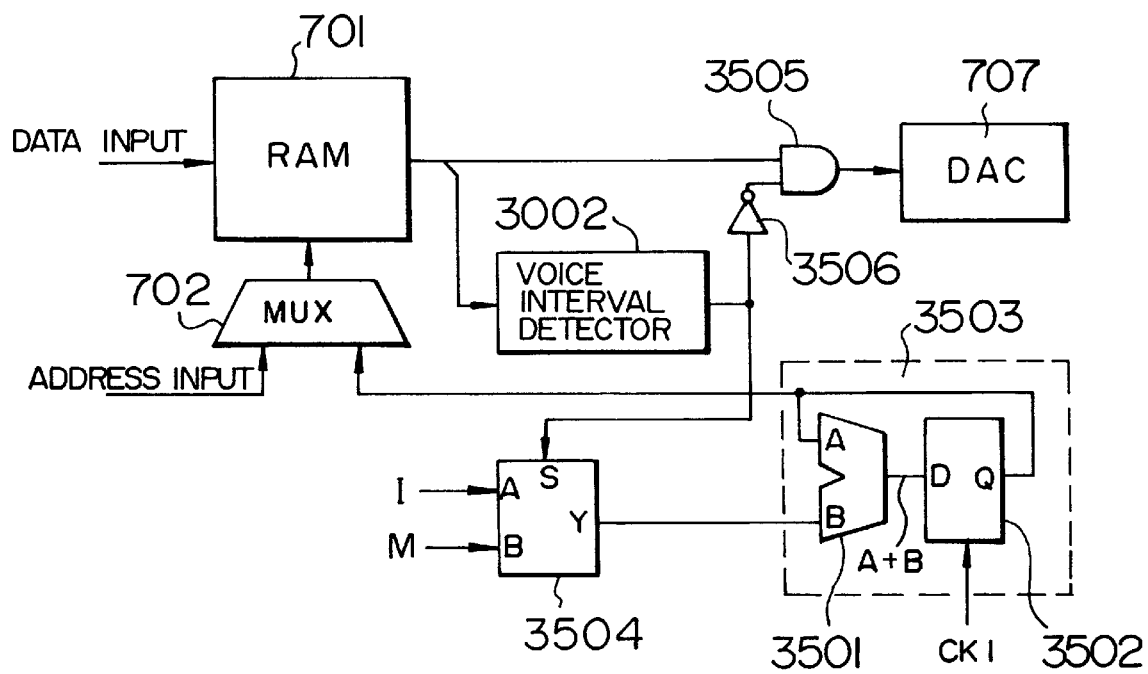
FIG. 35 is a block diagram showing another embodiment of the fast playback circuit according to the present invention.

FIG. 35 is a block diagram showing another embodiment of the fast playback circuit according to the present invention.

In this embodiment, the address-generating operation is directly switched by using an adder 3501 with the address counter 3503 in order to achieve fast playback. Specifically, the address counter 3503 includes the adder 3501 and a register 3503 for receiving a sum output A+B thereof. The output signal Q of the register 3503 is fed back to the sum input A on the one hand, and is inputted to multiplexer 702 as a read address of the memory circuit 701 on the other hand.

The other input B of the adder 3501 is supplied selectively with 1 and a positive integer M through the multiplexer 3504. The control terminal S of the multiplexer 3504 is supplied with an output signal of the voice interval detector 3002. The output signal of the voice interval detector 3002 is supplied also to the AND gate 3505 for eliminating the quantizing noise through the inverter 3209 as in the aforementioned embodiment.

When a voice interval is detected by the voice interval detector 3002, the multiplexer 3504 selects M in place of 1, and transmits it to the adder 3501. As a result, before entering a voice interval, the adder 3501 performs the counting operation by adding +1 to the address signal formed by the register 3502 and generating the next address signal. When a voice interval is entered as mentioned above, the multiplexer 3504 inputs M to the adder 3501. As a result, the adder 3501 adds +M to the address signal formed by the register 3502 to generate an address signal skipped by M addresses. Thus the address-updating operation during a voice interval is equivalently increased in speed, thereby substantially eliminating the voice interval as in the aforementioned embodiments.

Figure 36:
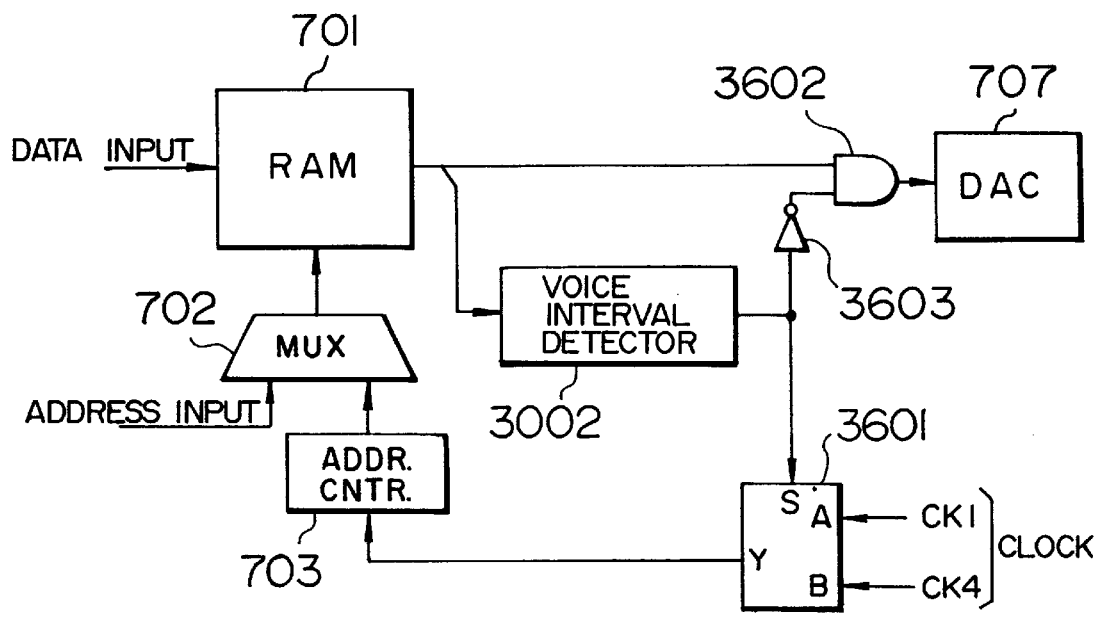
FIG. 36 is a block diagram showing another embodiment of a slow playback circuit according to the present invention.

FIG. 36 is a block diagram showing another specific embodiment of the slow playback circuit according to the present invention.

In this embodiment, a clock pulse CK4 is prepared for slow playback. Specifically, in contrast to the fast playback circuit shown in FIG. 31, a slow clock pulse CK4 is prepared for slow playback, so that when a voice interval is started, the multiplexer 3601 is switched to select the slow playback clock pulse CK4 in place of normal clock pulse CK1. When the frequency of the clock pulse CK4 is reduced to 1/N in comparison with that of the clock pulse CK1, the operation of the address counter 703 is decreased by a factor of N, thereby enlarging the voice interval equivalently by a factor of N.

In this embodiment, which can be configured with a circuit similar to FIG. 31, the input B of a multiplexer 3601 may be selectively supplied with the clock pulse CK2 in fast playback mode and the clock pulse CK4 in slow playback mode respectively through a similar multiplexer or an appropriate switching circuit. In this way, both the fast and slow playback are made possible.

Figure 37:
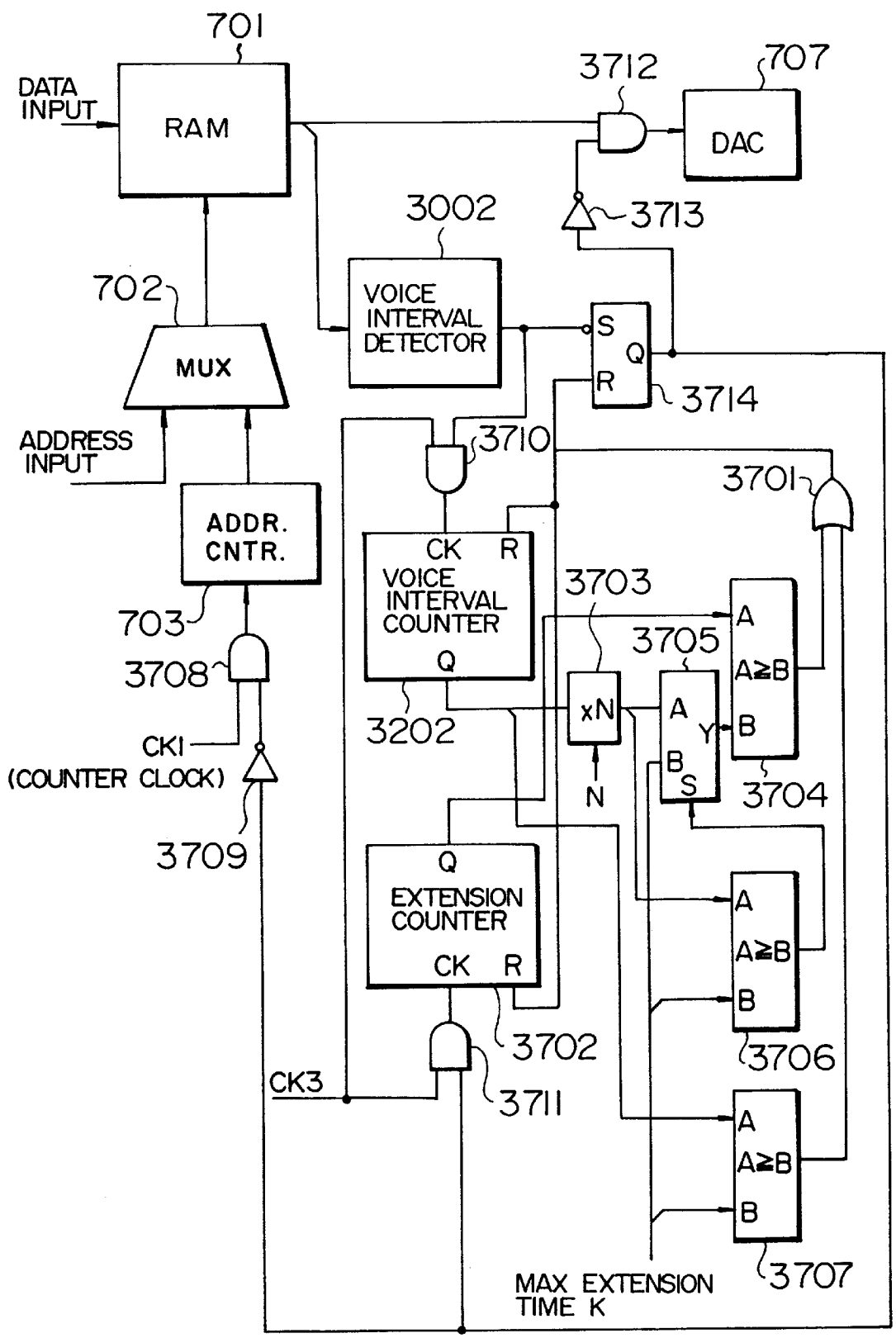
FIG. 37 is a diagram specifically showing another embodiment of the slow playback circuit according to the present invention.

FIG. 37 is a block diagram showing another specific embodiment of a slow playback circuit according to the present invention.

In slow playback mode, the user like an aged person feels more convenient to hear as described above. If a comparatively long voice interval is enlarged or extended, however, the sound becomes difficult to hear. In view of this fact, the embodiment under consideration has added thereto the function of imposing a certain limitation on the enlargement or extension of a voice interval in slow playback mode.

According to this embodiment, a circuit described below is added as a basis of the slow playback circuit shown in FIG. 32. The output signal Q of the voice interval counter 3202 is increased N times as large by a multiplier 3703. The N-fold multiplier output is supplied to an input A of a multiplexer 3705 and an input A of a comparator 3706. The output signal Q of the voice interval counter 3202 is supplied to an input A of a comparator 3707. The other inputs of the multiplexer 3705 and the two comparators 3706, 3707 are supplied with a maximum extension time K of the voice interval. The value N for increasing the voice interval by N times or the maximum extension time K, though not specifically limited, can be set within a predetermined range by the player user. The maximum extension time K, though not specifically limited, is adjustable within the range from 1 to 5 seconds. The result of a test hearing in slow playback mode by the inventor shows a proper time length of about three seconds.

An input A of the comparator 3704 is supplied with the output signal Q of an extension counter 3702, and the other input B thereof with the output signal Y of the multiplexer 3705. The control terminal S of the multiplexer 3705 is supplied with the output signal of the comparator 3706. And the output signals of the comparators 3704 and 3707 are supplied through an OR gate 3701 to the reset terminal R of the flip-flop 3714, the reset terminal R of the voice interval counter 3202, and the reset terminal R of the extension counter 3702. The flip-flop 3714 is set at the trailing edge of the output signal of the voice interval detector 3002, i.e., at the finish timing of the voice interval of the original signal 3301, as in the previous case. The output signal Q of the flip-flop 3714 is used to control the AND gate 3712 through the inverter 3713, supplied to the AND gate 3711 for controlling the counting operation of the extension counter 3702, and also supplied to an AND gate 3708 for controlling the counting operation of the address counter 703 through the inverter 3709.

FIG. 38 is a schematic diagram for explaining an example of operation of the circuit shown in FIG. 37. The original data 3801 has a maximum extension time Tmax corresponding to K. Assume that the voice interval Td of the original data 3801 is larger than the maximum extension time K. When the output signal Q of the voice interval counter 3202 supplied to the input A of the comparator 3707 increases beyond the maximum extension time K supplied to the input B of the comparator 3707, the comparator output A≧B of the comparator 3701 becomes logic "1". As a result, the flip-flop 3714, the voice interval counter 3202 and the extension counter 3702 are reset through the OR gate 3701, thereby nullifying the slow playback mode equivalently. The state after the slow playback operation thus remains the same as that before the slow playback operation. In this way, in the case where the voice interval of the original signal 3801 is so long as to fail the object of slow playback as mentioned above, the operation of extending the voice interval is substantially nullified.

FIG. 39 is a schematic diagram for explaining another example of operation of the circuit shown in FIG. 37. In FIG. 39, as in the previous case, the original data 3901 has a maximum extension time Tmax corresponding to K. In the case where the voice interval Td of the original data which is shorter than the maximum extension time K becomes longer than the maximum extension time K as a result of being increased N times as long, the comparator 3706 detects the fact that the voice interval Td×N determined by the multiplier 3703 increases beyond the maximum extension time K and sets the comparator output A≧B to logic "1". In response to the logic "1" state of the comparator output signal, the multiplexer 3705 transmits the maximum extension time K of the input B in place of the multiplier output Td×N of the input A to the comparator 3704. As a result, when the output signal Q of the extension counter 3702 exceeds the maximum extension time mentioned above, the output A≧B of the comparator 3704 becomes logic "1", so that the flip-flop 3714, the voice interval counter 3202 and the extension counter 3702 are reset through the AND gate 3701. In this way, the processed data 3902 is used to limit the extension time of a given voice interval to less than the maximum extension time.

FIG. 40 is a schematic diagram for explaining still another example of operation of the circuit shown in FIG. 37. In FIG. 40, as in the previous cases, the original data 4001 has a maximum extension time Tmax corresponding to K. In the case where the voice interval Td of the original data 4001 is shorter than the maximum extension time K and the time length N times the voice interval Td is still shorter than the maximum extension time K in this way, the comparator 3706 detects the fact that the voice interval Td×N determined by the multiplier 3703 is shorter than the maximum extension time K, and sets the comparator output A≧B to logic "0". In response to this logic "0" of the comparator output, the multiplexer 3705 transmits the multiplier output Td×N of the input A to the comparator 3705. As a result, when the output signal Q of the extension counter 3702 exceeds the enlarged voice interval Td×N, the comparator output A≧B of the comparator 3704 becomes logic "1", so that the flip-flop 3714, the voice interval counter 3202 and the extension counter 3702 are reset by way of the AND gate 3701. In this way, the voice interval is enlarged N times as long in the processed data 4002.

Figure 41:
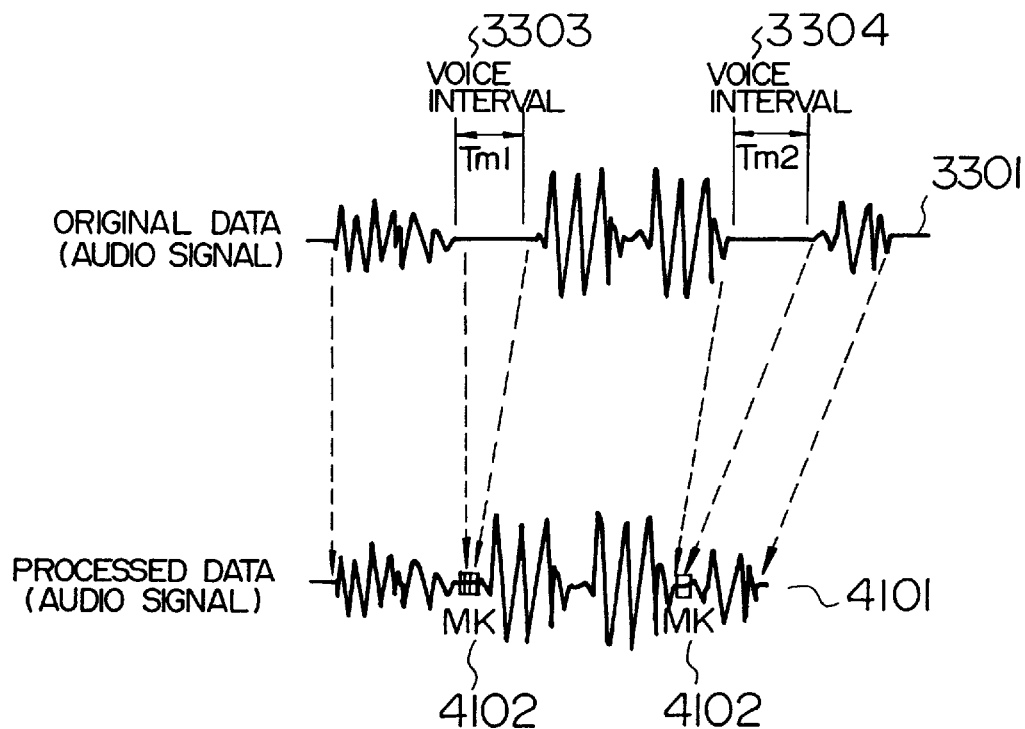
FIG. 41 shows waveforms for explaining another embodiment of the fast and slow playback operations according to the present invention.

FIG. 41 shows waveforms for explaining another embodiment of the fast and slow playback operations.

According to the present embodiment, the data compression function is included in addition to the fast and slow playback. In other words, the voice intervals 3303, 3304 of the original data 3301 are replaced by the voice interval data 4102 (MK) as shown in the processed signal 4101. In FIG. 41, the voice interval data 4102 (MK) represents a point of insertion thereof, and at the time of actual analog conversion, the part where the voice interval data 4102 (MK) is inserted is rendered voiceless. By inserting this voice interval data 4102 (MK), the voice intervals 3303, 3304 are replaced by information of several bytes, and therefore the voice intervals 3303, 3304 contained in the digital signal before analog conversion are substantially removed. As a consequence, the memory capacity required for storing digital signals can be reduced to about ½ to ⅔ or by the proportion which the voice interval represents of the whole time length. In the case where a data is compressed in this way, utilization of the voice interval data 4102 (MK) makes slow or fast playback possible by enlarging or compressing the same signal selectively. This data compression may basically use a fast playback controller as described above. Although the fast playback controller outputs a "0" level signal in order to remove the quantizing noise during a voice interval, the voice interval data 4102 (MK) may alternatively be inserted with equal effect.

Figure 42:
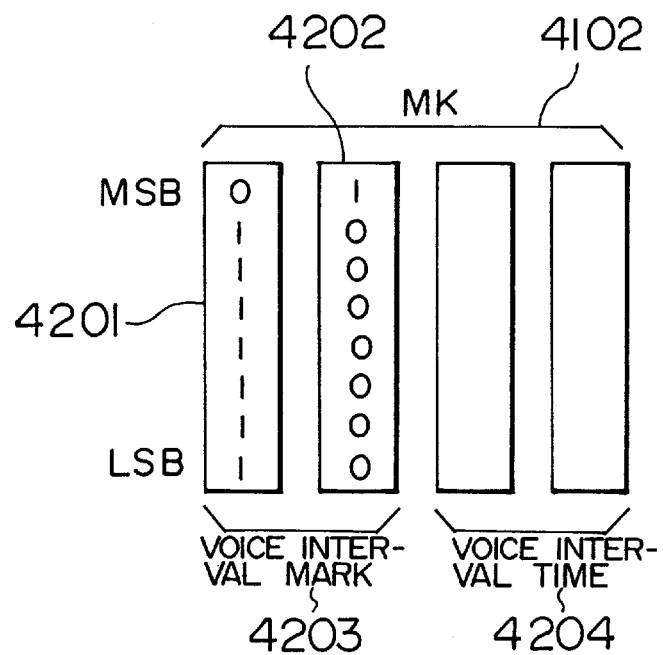
FIG. 42 is a bit pattern diagram showing an embodiment of a voice interval signal MK in FIG. 41.

FIG. 42 is a pattern diagram showing an embodiment of the voice interval data 4102 (MK).

The voice interval data 4102 (MK) includes a voice interval mark 4203 and a voice interval time data 4204. A combination of bit patterns unavailable for a normal digital signal is selected as the voice interval mark 4203. According to this embodiment, when the digital signal is a 2' complement binary code, a combination of a positive maximum value 4201 (01111111) and a negative maximum value 4202 (1000000) is used. A normal audio signal does not change from a positive to a negative maximum value, and therefore this combination is used as a voice interval mark. The voice interval mark 4203 may alternatively be a combination of two, three or four bytes, unlike in the above-mentioned combination.

The voice interval time data 4204, though not specifically limited, may have two bytes. In order to meet the requirement of a longer voice interval, however, three or four bytes may be used for the voice interval time data 4204.

Figure 43:
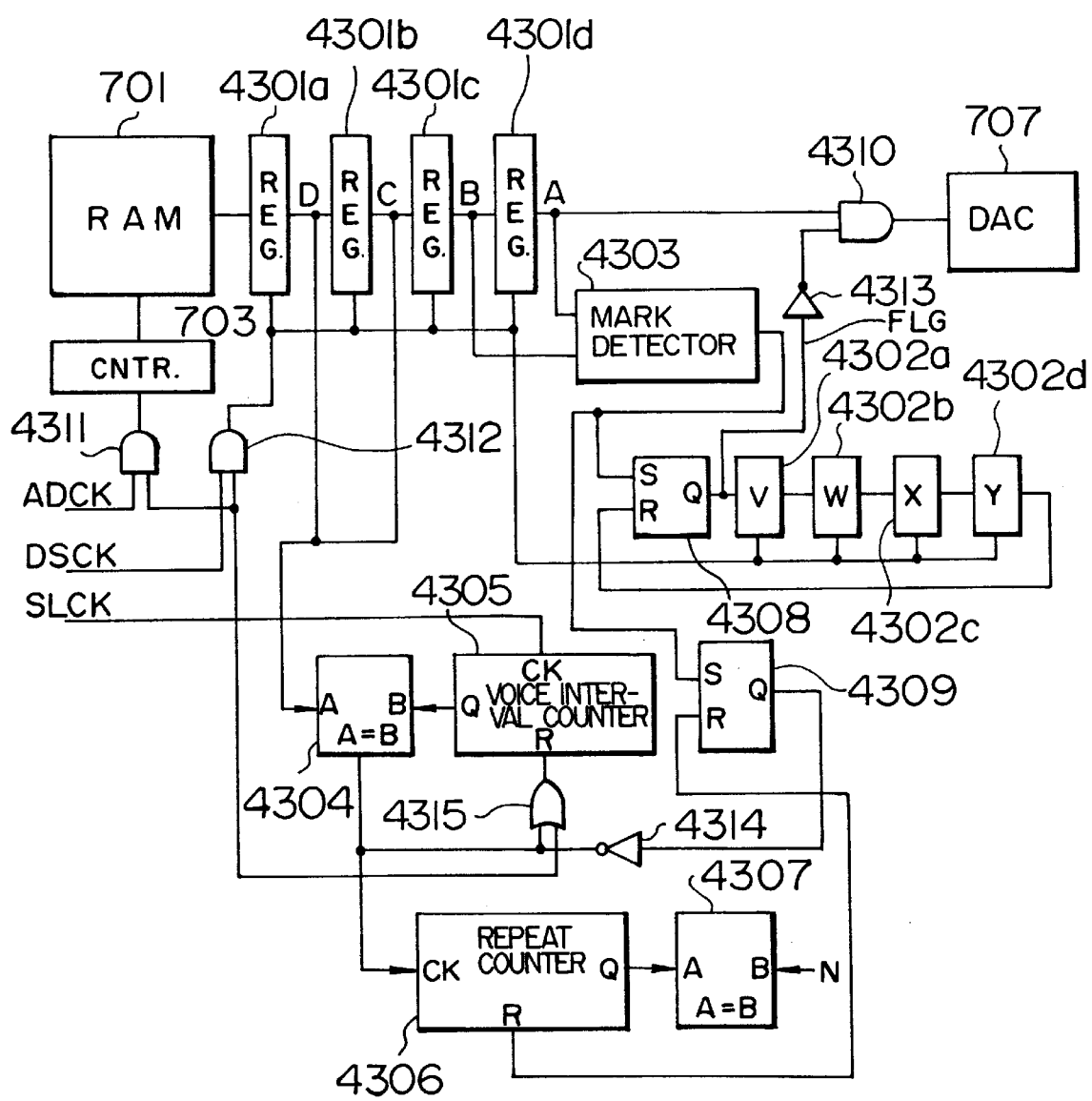
FIG. 43 is a block diagram showing an embodiment of a digital signal playback circuit including the fast/slow playback mode for a digital signal representing a compressed data.

FIG. 43 is a block diagram showing an embodiment of a digital signal playback controller including the function of fast and slow playback modes against the digital signal compressed in the manner described above.

The address counter 703 is supplied with an address counter clock ADCK through an AND gate 4311. When the voice interval data 4102 (MK) includes a two-byte voice interval mark 4203 and a two-byte voice interval time data as mentioned above, the read signal for the memory circuit 701 is outputted through four-stage shift registers 4301a to 4301d correspondingly thereto. These shift registers 4301a to 4301d are supplied with a data shift clock DSCK through an AND gate 4312.

The outputs A and B of the shift registers 4301d, 4301c are inputted to a voice interval mark detector 4303. The mark detector 4303 compares the bit patterns of the signals A and B to determine whether they coincide with the positive maximum value 4201 (01111111) and the negative maximum value 4202 (10000000) respectively. The detection signal from the voice interval mark detector 4303 is used for setting the flip-flops 4308 and 4309.

The outputs C and D of the shift registers 4301b and 4301a are supplied to an input A of the comparator 4304. The other input B of the comparator 4304 is supplied with the output signal of the voice interval counter 4305. The output signal of the comparator 4304 is supplied through the AND gate 4315 to the reset terminal R of the voice interval counter 4305 and the input CK of the repeat counter 4306 used for extending a voice interval. The output Q of the repeat counter 4306 is compared with an extension factor N at the comparator 4307.

The output Q of the flip-flop 4309 is supplied through the inverter 4314 to the OR gate 4315 and the AND gates 4311, 4312. Upon detection of the voice interval mark 4203, therefore, the operation of the address counter 703 and the shifting operation of the shift register 4301a to 4302d are stopped, thereby holding the voice interval data 4102 (MK) in the shift registers 4301a to 4301d. With the stoppage of operation of the address counter 703, the memory circuit 701 has the reading operation thereof suspended. The output signal of the comparator 4307 is supplied to the reset terminal R of the flip-flop 4309 and the repeat counter 4306.

The output Q of the flip-flop 4308 is set as a voice interval flag FLG and makes up a control signal for the AND gate 4310 through the inverter 4313. Upon detection of a voice interval mark this way, the AND gate 4310 is immediately closed, thereby preventing the positive maximum value 4201, the negative maximum value 4202 and the following time data 4204 from being outputted erroneously as an audio signal. Especially when the positive and negative maximum values are used as a voice interval mark 4203, a large pulse-like noise would be caused if such values are outputted directly in their own forms.

The voice interval flag of the flip-flop 4308 is fed back through four-stage D-type flip-flops 4302a to 4302d as a reset signal for the flip-flop 4308. These flip-flops 4302a to 4302d, as explained below, are used to transmit the voice interval by the same data shift clock as the shift registers 4301a to 4301d, thereby detecting a time period, at the and of the voice interval, in which the voice interval data 4102 (MK) including the voice interval mark 4203 and the time data 4204 thus far held in the shift-registers 4301a to 4301d is swept out. When it is judged by the flip-flops 4302a to 4302d that the voice interval has been ended, the flip-flop 4308 is reset.

After the flip-flop 4309 is set upon detection of the voice interval mark 4203, the reset state of the voice counter 4305 is cancelled through the inverter 4314. The voice interval counter 4305 starts the counting operation of the voice interval clock SCLK in response to the cancellation of the reset state.

In normal playback mode, the N value supplied to the comparator 4307 is set to 1. As a result, when the count of the voice interval counter 4305 coincides with the voice interval time 4204 contained in the voice interval data 4102 (MK), the coincidence signal outputted from the comparator 4304 is incremented by +1 by the repeat counter 4306, thereby rendering the count as 1. Since the comparator 4307 forms a coincidence output signal at the same time, the repeat counter 4306 and the flip-flop 4309 are reset. With the resetting of the flip-flop 4309, the AND gates 4311, 4312 are opened, and the memory circuit 701 is read through the address counter 703 while at the same time restarting the shifting operation on the shift registers 4301a to 4301d. In synchronism with the shifting operation of the shift registers 4301a to 4301d, the voice interval flag FLG is sequentially transmitted by the flip-flops 4302a to 4302d. Specifically, until the voice interval data 4102 (MK) thus far held in the shift registers 4301a to 4301d is swept out, the flip-flop 4308 is kept in set state, and the resulting signal is prohibited from being outputted as an audio noise by being transmitted from the digital-to-analog converter 707. In synchronism with the voice interval data 4102 (MK) being swept out, the flip-flop 4308 is reset. As a result, a substantial voice interval is ended, and the digital audio signal outputted from the final-stage shift register 4301d is inputted to the digital-to-analog converter 707 through the AND gate 4310, thereby assuring playback of an audio signal.

In slow playback mode, the N value supplied to the comparator 4307 is set to an appropriate integer of 1 or more. Assume that the N value is set to 2, for instance. When the count of the voice interval counter 4305 and the voice interval contained in the voice interval data 4102 (MK) make two rounds, the comparator 4307 forms a coincidence signal, thereby ending a voice interval of double length. If N is set to 3, on the other hand, the voice interval can be extended by a factor of three.

In fast playback mode, the operation of the flip-flop 4309 is nullified. Specifically, the output signal of the voice interval mark detector 4303 is prohibited from being supplied through an AND gate or the like to the set input S of the flip-flop 4309. In such a case, the address counter 703 and the registers 4301a to 4301d continue to be supplied with a clock, and therefore the reading operation of the memory circuit 701 is continued. Since the flip-flop 4308 is set by the detection output of the voice interval mark detector 4303, however, the inverter 4313 and the AND gate 4310 prohibit the voice interval data 4102 (MK) from being inputted to the digital-to-analog converter 707 as an audio signal. Specifically, the voice interval makes up only a very short period of time during which the audio data is outputted, thereby substantially eliminating the voice interval, with the result that the fast playback is made possible as in the embodiments described above.

A digital signal processor for realizing the fast and/or slow playback mode mentioned above is not only used with a player of a digital information system mentioned above but also is applicable to various reproduction systems including a digital signal processor for reproducing a digital audio signal as an analog audio signal such as the digital audio tape (DAT).

In a digital audio system or the like, the code is compressed in order to lengthen the recording time. A well-known compression system employable in the digital signal receiving/deliver system proposed by this invention includes an adaptive PCM, an adaptive differential PCM and an adaptive ΔM. Among these systems, the adaptive differential PCM is standardized and employed as an audio compression system such as CD-1 and CD-ROM. For the purpose of data compression, a method may be used which meets the object and configuration requirements of various compression systems including the above-mentioned three systems and the data compression or expansion system according to the present invention.

The amplitude and the frequency distribution of an acoustic signal are subjected to a comparatively gentle but great change with the lapse of time. A method of coding with the quantizing step width changed in accordance with the characteristics of the neighboring signals is an adaptive PCM (APCM). This adaptive PCM is for changing the quantizing step width in accordance with the amplitude of an immediately preceding sample quantization value. The adaptive differential PCM, on the other hand, is for introducing the adaptive step width into the difference PCM not to quantize the signal directly but to quantize it indirectly from the differential with a prediction value. And ΔM is a coding method for quantizing a signal by one bit. This method is accompanied by a large strain under an abrupt signal change. The adaptive ΔM, in contrast, is such that the quantizing step width is increased when the same code is continued, and reduced when a code is inverted.

The adaptive PCM, the adaptive differential PCM and the adaptive ΔM require a multiplier circuit for changing the step width, and a complicated circuit becomes necessary such as a microcomputer or a digital signal processor, thus leading to the disadvantage of a large circuit scale. On the other hand, ΔM, which has a large quantization strain, lacks the fidelity.

Figure 44:
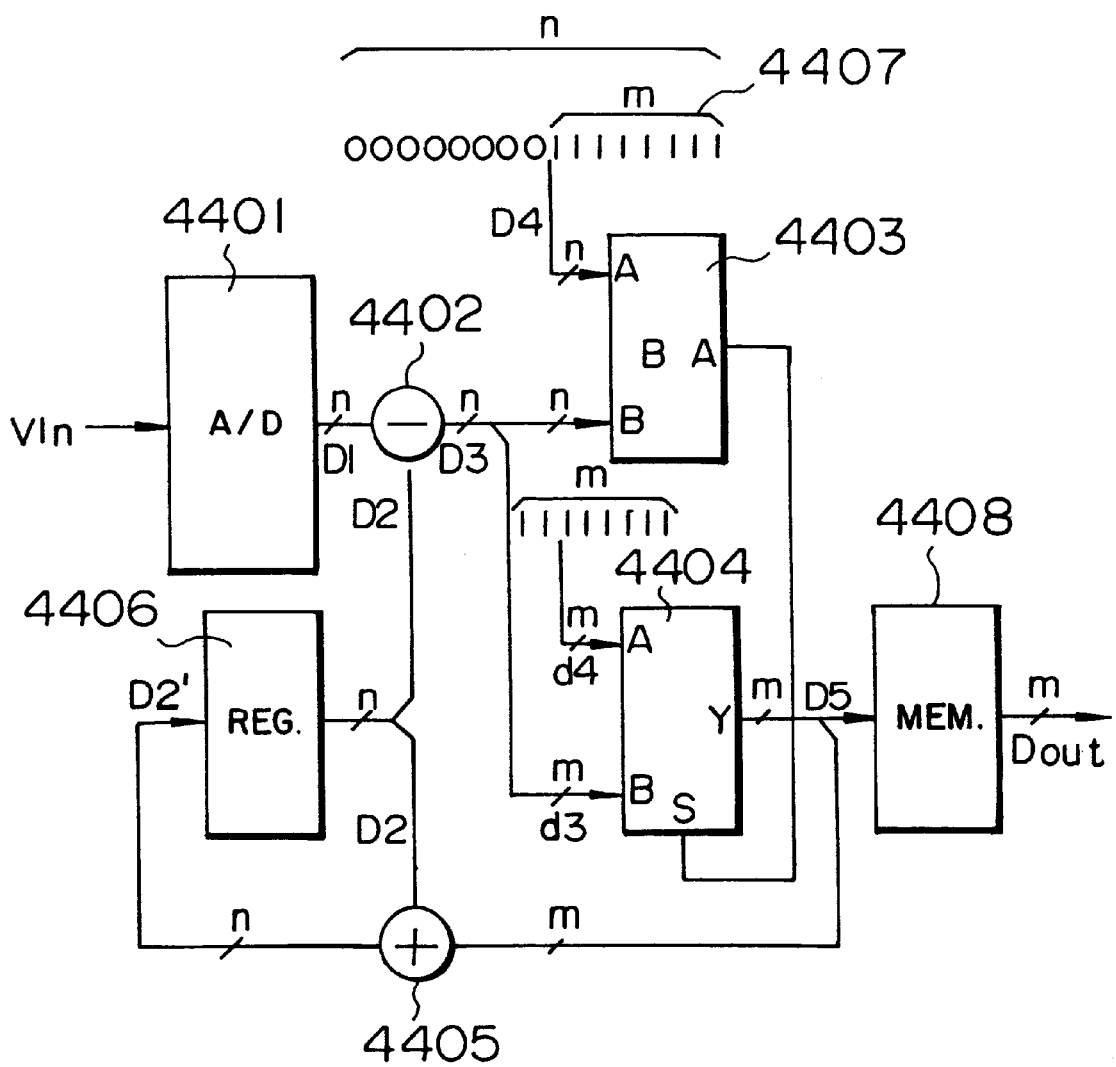
FIG. 44 is a block diagram showing an embodiment of a data converter configured of a data conversion system according to the present invention.
Figure 45:
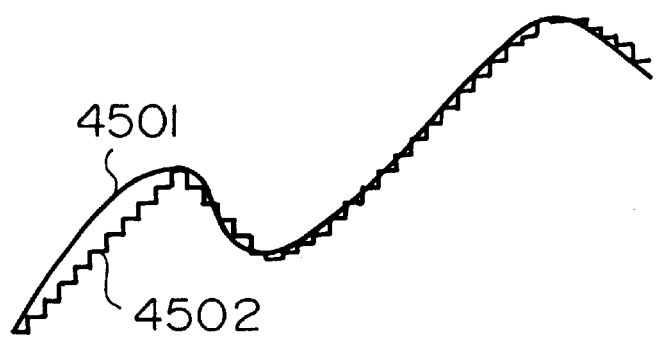
FIG. 45 shows waveforms for explaining an example of the analog-to-digital conversion involving the data compression of FIG. 44.
Figure 46:
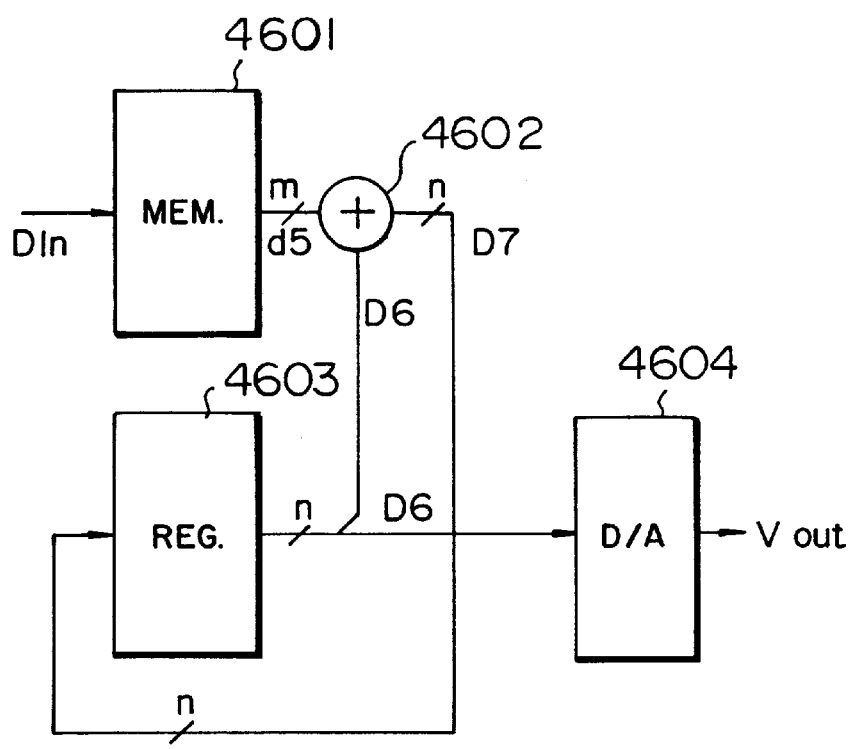
FIG. 46 is a block diagram showing another embodiment of a data converter configured of a data conversion system according to the present invention.

FIGS. 44, 45 and 46 are block diagrams showing an embodiment relating to a data compression and expansion system advantageous in terms of power consumption and suited for reducing the size with a simple configuration.

The object of this embodiment is to provide a data conversion system and a data converter circuit high in fidelity by a simple configuration in relation to the data compression and expansion.

FIG. 44 is a block diagram showing an embodiment of a data converter configured by a data conversion system according to the present invention.

The data converter according to this embodiment, though not specifically limited, is for converting an analog signal into a 16-bit digital signal and is intended for a circuit for compressing and outputting the digital data as an 8-bit digital data.

The analog signal Vin is inputted to the analog-to-digital converter 4401 and is converted into a digital data of n bits (16 bits, for example, as mentioned above). This embodiment uses a circuit described below for compressing the digitally-converted 16-bit data into a data of m bits (8 bits, for example).

One of the inputs of the subtractor 4402 is supplied with the 16-bit data D1 digitally converted as above. The other input of the subtractor 4402 is supplied with a 16-bit data D2 stored in the register 4406. The 16-bit data D2 stored in the register 4406 is assumed to be an immediately preceding sampling data as described later. The subtractor 4402 subtracts the immediately preceding sampling data D2 stored in the register 4406 from the input data D1 digitally converted, and outputs the difference (D1−D2) therebetween. The difference data D3 is supplied to an input B of the comparator 4403. The other input A of the comparator 4403 is supplied with a data D4 corresponding to the maximum value of an 8-bit data to be compressed. This data D4 is comprised of 16 bits of 0000000011111111 (255 in decimal notation) as shown with all the least significant eight bits (m) as 1.

The comparator 4403 compares the data D3 and D4 supplied to the input terminals A and B, and when B is larger than A (D3>D4), forms a high-level output signal, while when A is larger than B generates a low-level output signal. The output signal of the comparator 4403 is used as a selection signal.

An input A of the selector 4404 is supplied with an 8-bit maximum value data d4 to be compressed (11111111), and the input B with a data d3 representing the least significant eight bits of the difference data D3. The selector 4404 selects and outputs the maximum value data d4 of the input A when the output signal of the comparator 4403 is at high level, i.e., when the substraction data D3 is larger than D4, and the data d3 of the least significant eight bits of the substraction output supplied to the input B when the output signal of the comparator 4403 is at low level, i.e, when the subtraction data D3 is smaller than D4.

The output signal d5 of the selector 4404, though not specifically limited, is stored in the memory 4408, and read and outputted as a compressed 8-bit digital data Dout. The output signal d5 of the selector 4404 is supplied to one of the inputs of the adder 4405. The other input of the adder 4405 is supplied with the output data D2 of the register 4406. As a result, the adder 4405 adds the compressed data d5 outputted from the selector to the immediately preceding sampling data D2 stored in the register 4406, so that the sampling data D2' updated and assumed to be immediately preceding to the next input data D1 is formed and stored in the register 4406. In this way, the accumulation error is prevented by generating the next sampling data by the register 4406 and the adder 4405.

Subsequently, the 16-bit (n-bit) input data D1 is converted into an 8-bit (m-bit) compressed data d5 by repeating similar processes.

FIG. 45 shows waveforms for explaining the operation of analog-to-digital conversion accompanied by the data compression described above.

At the time of data compression, the register 4406 is cleared of data (0000000000000000). As a result, when an analog signal rises sharply as shown, the progressive adding operation of the least significant 8-bit maximum value would fail to follow an input digital signal. Once the difference between the input digital signal and the immediately preceding sampling data is reduced below the maximum value of the compressed data, however, it is possible to obtain a compressed data faithfully corresponding to the input signal change. As for an acoustic signal which has an amplitude and a frequency distribution changing comparatively gently with time, data compression is possible with a fidelity posing no practical problem.

FIG. 46 is a block diagram showing another embodiment of a data converter in a data conversion system according to the present invention. This embodiment is intended for a circuit in which a data compressed into m bits (eight bits, for example) as in the aforementioned embodiment is extended into an n-bit (16-bit) data and at the same time is outputted by being converted into an analog signal.

The data Din compressed by a data compressor as shown in FIG. 44, though not specifically limited, in transferred and stored in a memory 4601 of FIG. 46 from the memory 4408 in FIG. 44. In some cases, the memory 4408 in FIG. 44 and the memory 4601 in FIG. 46 are used in common with each other. The data d5 read out of the memory 4601 is supplied to an input of the adder 4602. The other input of the adder 4602 is supplied with an n-bit data D6 stored in the register 4603. The adder 4602 forms a data D7 by adding the data d5 to D6. This data D7, though not specifically limited, is inputted to the register 4603. The data D6 outputted from the register 4603 and extended is inputted to the digital-to-analog converter 4604 to form a demodulated analog signal Vout.

The operation of the data extender will be explained. At the time of starting the data extending operation, the register 4603 is cleared as in the aforementioned case. The compressed data d5 read out of the memory 4601 is added to an immediately preceding n-bit data D6 of the register 4603 each time of reading, and is stored in the register 4603 as expanded data. As a result, the expanded data is restored which changes in steps in accordance with the change components due to the compressed data d5 as shown in FIG. 45.

The effects obtained from the above-mentioned embodiment are as follows:

(1) The difference between the immediately preceding sampling data and an input data is determined, and when the difference is larger than the maximum value of a compressed code, the particular maximum value is outputted, while when the difference is smaller than the same maximum value, the result of subtraction is outputted to output compressed data, thus compressing data. In this method, the data such as an acoustic signal having an amplitude or a frequency distribution changing comparatively gently with time can be compressed with high fidelity with a simple configuration of subtraction and addition.

(2) According to the effect (1) above, a data compressor or expander can be realized with a simple circuit including a subtractor, an adder, a register and a comparator. Also, the power consumption is minimized.

(3) By using a data converter system and circuit mentioned above, the player for reproducing an acoustic signal stored in a memory can be reduced in size and weight.

Although the present invention has been described specifically above with reference to embodiments, the invention is not limited to these embodiments but various modifications thereof are of course possible without departing from the spirit of the invention. In FIG. 44, for instance, in place of the configuration for comparing the subtractor output data D3 with the maximum value D4 of a compressed data by a comparator, an OR gate or the like may be used to form a comparator output larger or smaller than the maximum value equivalently on the basis of the fact that at least any one of the most significant bits of the subtractor output data D3 is "1". Also, the data D2 of the register less the input data D1 may be used as the difference data.

The input data compressed, instead of the output signal of the analog-to-digital converter as shown in the embodiment of FIG. 44, may be such as a digitally-converted data stored in a memory, a magnetic tape or a compact disk with equal effect. The compressed data may be converted into a serial data and outputted through a communication channel or the like.

The data converter system and the analog-to-digital converter according to the present invention are widely applicable with circuits and systems handling a digital data changing with time.

Figure 47:
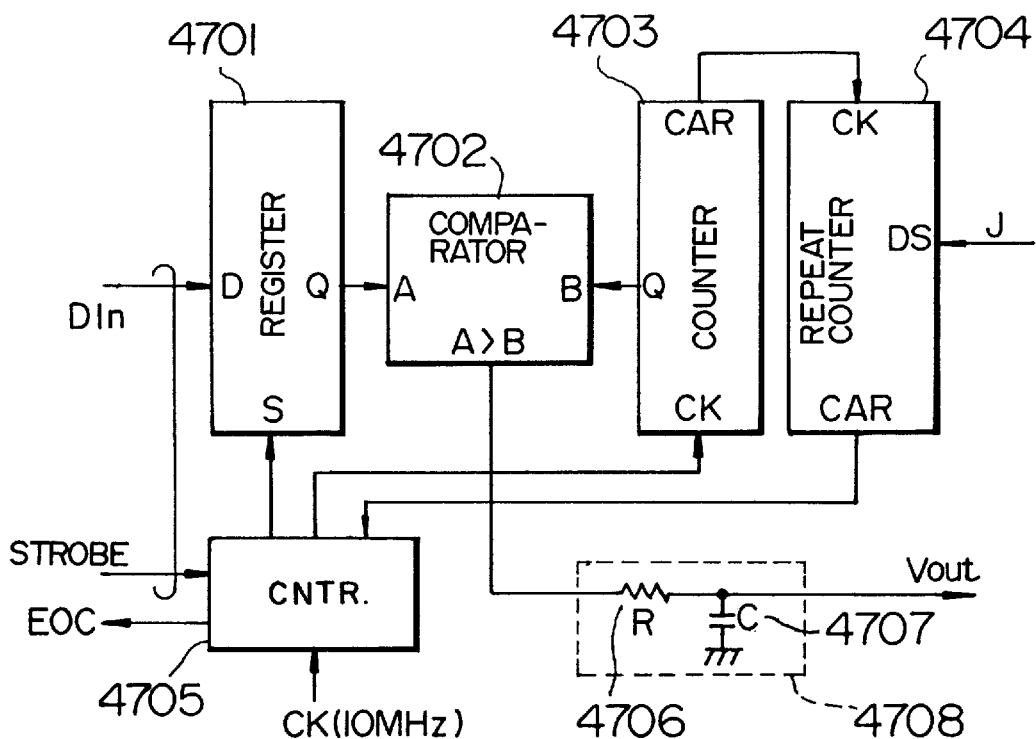
FIG. 47 is a block diagram showing an embodiment of a digital-to-analog converter according to the present invention.

FIG. 47 is a block diagram showing an embodiment of a digital-to-analog converter according to the present invention. This digital-to-analog converter, though not specifically limited, is mounted on the player 101 used with the digital information system described above.

A well-known technique of a digital-to-analog converter is disclosed in the above-described patent publication (JP-A-61-236222). In this digital-to-analog converter, pulses of a predetermined frequency are counted repeatedly by a counter, and the output of this counter is compared with an input digital signal to be converted, so that a pulse having a width corresponding to the value of the input digital signal is outputted, and the high-frequency components are removed from the pulse output by a filter, thereby forming an analog signal.

This digital-to-analog converter, which forms an output signal converted into one pulse width from an input digital signal, poses the problem that as a result of smoothing the input digital signal through a filter, a ripple component is generated making it impossible to produce an analog signal of high sound quality. Specifically, if the responsiveness (high-frequency characteristics) of an analog signal is to be improved, it is necessary to reduce the time constant of the low-pass filter. If the time constant of the low-pass filter is thus reduced, however, the ripple component is undesirably increased. If the time constant of the filter is increased to reduce the ripple component, on the other hand, the response characteristic against the input signal change is deteriorated, thereby deteriorating the high-frequency characteristics. Also, the necessity of both a counter and a comparator complicates the circuit configuration.

The digital-to-analog converter shown in FIG. 47 is aimed at improving such output characteristics.

The digital-to-analog converter according to the present embodiment includes circuits described below in order to remove the ripple component contained in the output signal. The input digital signal Din is supplied to the register 4701. The input digital signal thus supplied to the register 4701 is supplied to an input A of the comparator 4702. The counter 4703 is for counting pulses as a reference time signal repeatedly. The carry output signal CAR of this counter 4703 is supplied to the repeat counter 4704. The repeat counter 4704 outputs the carry output CAR upon counting a designated repeat count J. This carry output CAR is inputted to the controller 4705 for outputting a conversion-over signal EOC.

The controller 4705, upon receiving a strobe synchronous with the input digital signal Din, supplies a set signal S to the register 4701 thus giving an instruction on retrieval of the digital signal Din. Though not specifically limited, the controller 4705, upon retrieval of the input signal Din by the register 4701 in response to the reference time pulse CK of 10 MHz, supplies the same signal to the counter 4703 to start the counting operation.

The comparator 4702 forms a high-level output signal when the input digital signal Din supplied to the register 4701 is larger than the count Q of the counter 4703 (A>B). This comparator 4702 forms a low-level signal when the count output Q of the counter 4703 increases beyond the data line input digital signal Din (A<B). This embodiment including a repeat counter 4704 is such that an output pulse corresponding to the next input digital signal is not immediately formed as in the conventional systems but a pulse having a pulse width corresponding to the one input digital signal Din is subjected to repeated conversions in the number of J as designated by the repeat counter 4704.

Figure 48:
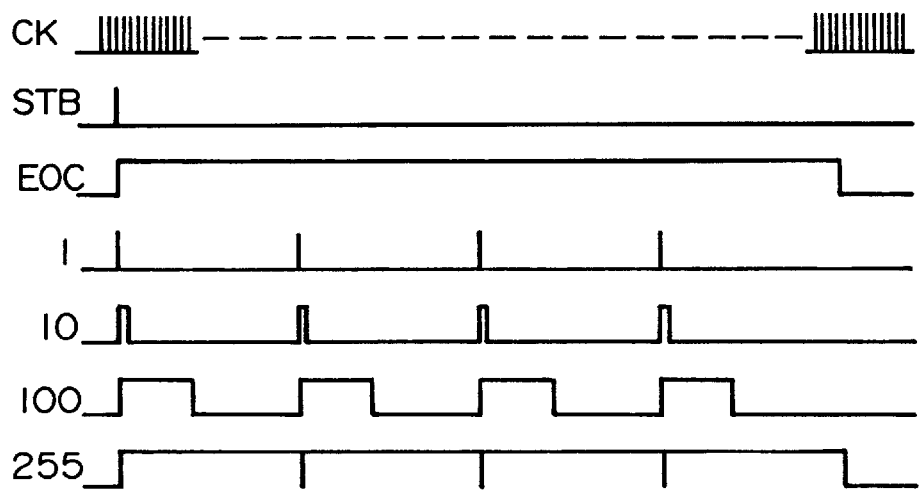
FIG. 48 shows waveforms for explaining an example of operation of the digital-to-analog converter of FIG. 47.

FIG. 48 shows waveforms for explaining an example of operation of the digital-to-analog converter described above.

In the case where the digital input signal Din has eight bits, for instance, the period of the 10-MHz clock pulse CK is 0.1 μs, and therefore when an 8-bit counter is used, one period is 25.6 μs. As a result, when the input digital signal is a decimal 1, a high-level pulse is outputted during the first 0.1 μs and a low-level pulse during the remaining 25.5 μs. When the input digital signal is decimal 10, on the other hand, a high-level signal is outputted only during the first 1 μs, and a low-level pulse during the remaining 24.6 μs. In similar fashion, when the input digital signal is 100 in decimal notation, a high-level signal is outputted only during the first 10 μs, and a low-level pulse during the remaining 15.6 μs. When the input digital signal assumes 255 which is the maximum decimal value, a high-level pulse is outputted during the first 25.5 μs and a low-level pulse during the remaining 0.1 μs.

FIG. 48 shows a case in which the number of repetitions J is 4. When an output signal converted into a pulse width is outputted four times repeatedly as mentioned above, a conversion output signal EOC corresponding to an input digital signal Din is outputted. In this way, in the case of four repetitions, the conversion time for forming four pulse width modulated outputs within the period of fetching the data read from the memory circuit 701 in the player 101 is 25.6×4=102.4 μs, thus making possible a conversion frequency of about 10 kHz. This is most suitable for reproduction of a news program, a conversation, a lecture or speech. In reproducing a music program of high sound quality, high frequencies up to about 20 kHz can be reproduced in the process of four repetitions if the frequency of the clock pulse CK is 20 MHz. If the number of repetitions is reduced by two while keeping the clock pulse CK at 10 MHz, on the other hand, high frequencies up to 20 kHz can be reproduced in similar fashion. In this way, a combination of the frequency of the clock pulse CK and the number of repetitions is matched with the sampling period of the input digital signal.

Incidentally, when a digital signal is inputted again in synchronism with a strobe STB in response to the conversion output signal EOC, a corresponding analolg-to-digital conversion is effected in similar manner.

The pulse width modulated signal outputted from the comparator 4702 is smoothed by a low-pass filter 4708 including a resistor 4706 and a capacitor 4707, and is outputted as an analog signal Dout. According to the present embodiment, such pulse width modulated signals are outputted in a plurality of numbers. As a result, even when the response is increased by setting the time constant due to the resistor 4706 and the capacitor 4707 to small value for improving the sound quality of the output signal, the ripple component is kept to minimum.

In the circuit according to the present embodiment which has the whole circuit capable of being configured of digital circuits, as compared with a case in which a digital circuit may be mixed with an analog circuit, the processes are simplified and the system may be configured of a CMOS integrated circuit or the like which is simple in the process and low in consumption.

Figure 49:
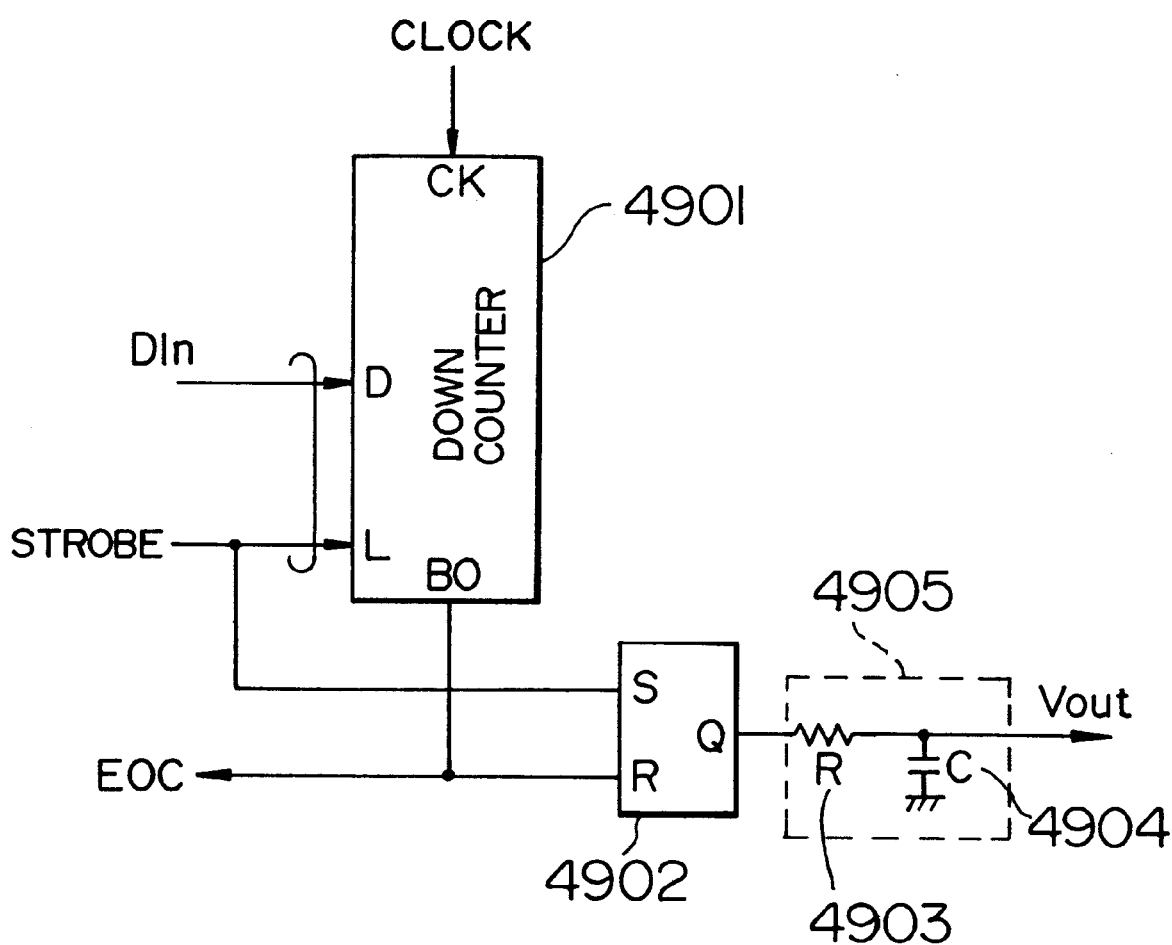
FIG. 49 is a block diagram showing another embodiment of a digital-to-analog converter according to the present invention.

FIG. 49 is a block diagram showing another embodiment of the digital-to-analog converter according to the present invention. The digital-to-analog converter according to the present embodiment is intended for simplifying the circuits.

According to the present embodiment, the comparator 4702 shown in FIG. 47 is done without and a pulse width modulated signal is formed corresponding to the digital signal by a down counter 4901 and flip-flop 4902. Specifically, the down counter 4901 has set therein an input digital signal Din in synchronism with a strobe. As a result, the output signal Q of the flip-flop 4902 changes to high level, and the down counter 4901 starts counting the clock by the strobe mentioned above. The down counter 4901 outputs a borrow signal BO and resets the flip-flop 4902 when the count thereof becomes zero. This borrow signal BO is sent to the input side as an end-of-conversion signal.

The flip-flop 4902 is set simultaneously with the starting of counting the digital signal, and is reset when the clock corresponding to the digital signal is counted. As a result, the output signal Q of the flip-flop 4902 is converted into a pulse width modulated signal corresponding to the input digital signal.

A signal source inserted in the input side of the digital-to-analog converter according to this embodiment outputs a digital signal and a strobe corresponding to a predetermined sampling period like the memory circuit 701. As a result, the next digital signal is sent from the signal source not immediately after the conversion-over signal EOC is sent out, but on condition that a digital signal and a strobe are sent out in synchronism with the sampling period. Thus it is possible to produce a pulse width modulated signal corresponding to an input digital signal of a predetermined period by the setting operation synchronous with the strobe of the flip-flop 4902 and the resetting operation synchronous with the borrow output BO of the down-counter 4901.

Assume that the digital input signal Din has eight bits, for example. If a clock pulse CK of 10 MHz is used as mentioned above, the period thereof is 0.1 μs, so that the maximum count is 25.5 μs when counted by an 8-bit down counter 4901. As a result, when the input digital signal is a decimal 1, the down-counter 4901 counts only one, and therefore a high-level pulse is outputted only during the first 0.1 μs and a low-level pulse is outputted only during the first 0.1 μs and a low-level pulse during the remaining 25.5 μs until the next strobe is inputted. Also, when the input digital signal is a decimal 10, a high-level signal is outputted only during the first 1 μs when ten is counted, and a low-level signal during the remaining period of 24.6 μs until a strobe is inputted. In similar fashion, when the input digital signal is decimal 100, a high-level pulse is outputted only during the period of 10 μs when 100 is counted, and a low-level pulse during the remaining period of 15.6 μs before the next strobe is inputted. When the input digital signal is 255 which is a maximum decimal value, on the other hand, a high-level is kept only during the period of 25.5 µs corresponding to the maximum count, and a low-level pulse during the remaining 0.1 µs.

This pulse width modulated signal is smoothed by a low-pass filter 4905 including a resistor 4903 and a capacitor 4904 as mentioned above thereby to form an analog signal Vout.

In the case where a plurality of pulse width modulated signals are formed for a single input signal Din as in the embodiment of FIG. 47, an arrangement is made to generate a plurality of strobes having the above-mentioned period for a single input signal Din on the input side.

Figure 50:
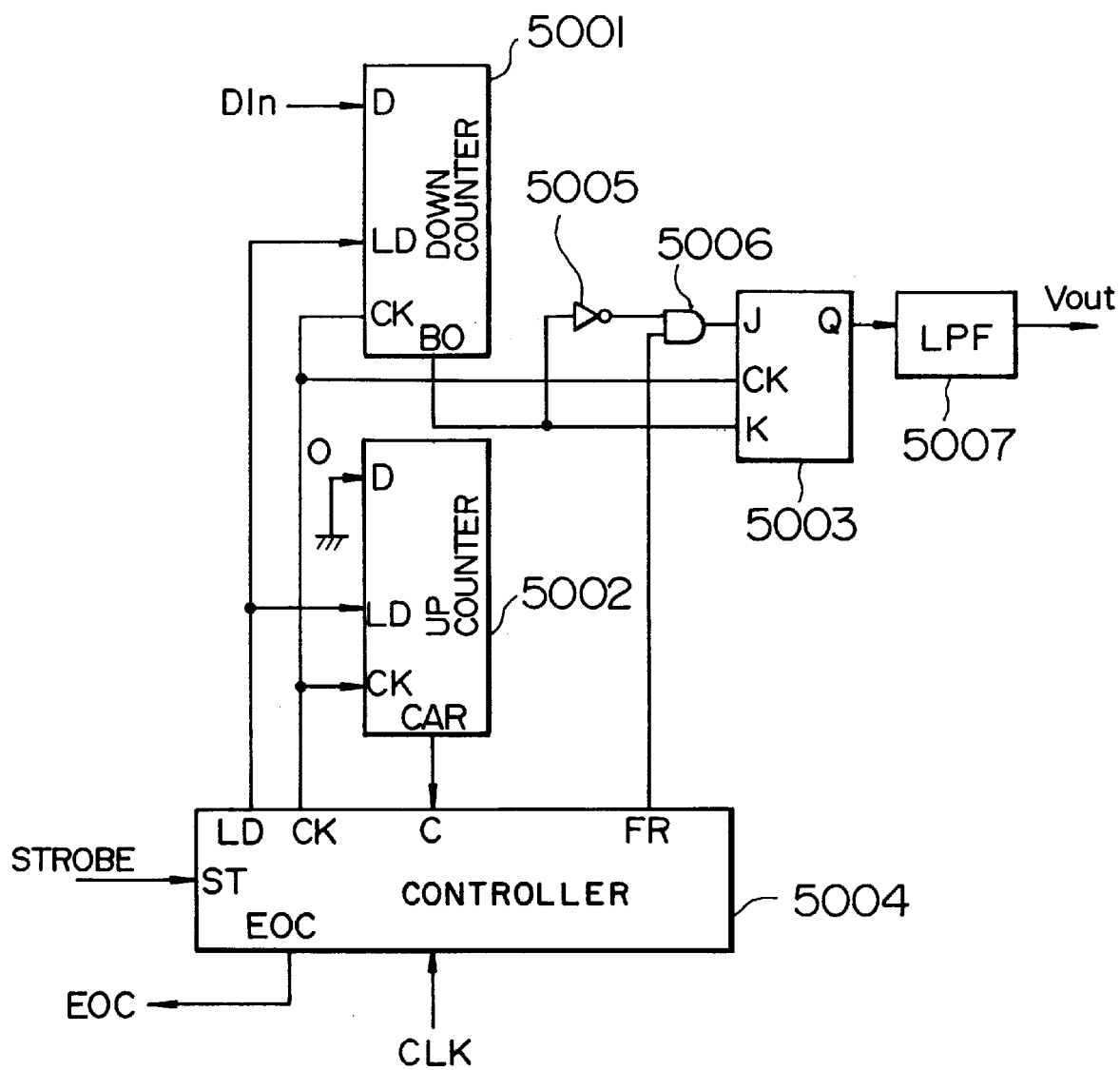
FIG. 50 is a block diagram showing still another embodiment of a digital-to-analog converter according to the present invention.

FIG. 50 is a block diagram showing another embodiment of a digital-to-analog converter according to the present invention.

The digital-to-analog converter shown in FIG. 49, in which a digital signal and a strobe are required to be formed at regular time intervals on input side, is limited in applications. According to the embodiment under consideration, by contrast, the period of the pulse width modulated signal outputted is defined by inserting an up-counter 5002. Specifically, the input D of the up-counter 5002 is supplied with 0 and cleared by a counter load pulse LD synchronous with the strobe, while a down-counter 5001 is supplied with an input digital signal Din from the counter load pulse LD.

The down-counter 5001 and the up-counter 5002 are supplied with the same clock CK. The borrow output BO of the down-counter 5001 is supplied to one of the inputs of an AND gate 5006 through an inverter 5005 and the input K of the flip-flop 5003. The clock terminal CK of the flip-flop 5003 is supplied with the above-mentioned clock pulse, and the input J of the flip-flop 5003 with the output signal of the AND gate 5006. The other input of this AND gate 5006 is supplied with a set signal FR generated from a controller 5004. The carry output CAR of the counter is supplied to the controller 5004.

The controller 5004 is turned on by a strobe ST received in synchronism with the digital signal Din, thereby outputting a counter load signal LD for the down-counter 5001 and the up-counter 5002 and a set signal FR for the flip-flop 5003. Also, the controller 5004, in response to the clock CLK and a strobe inputted thereto, sends out a clock pulse to the down-counter 5001 and the up-counter 5002, and upon receipt of the carry output CAR from the up-counter 5002, sends out a conversion-over signal EOC, thus entering a ready state.

The flip-flop 5003 is turned on at the leading edge of the clock pulse. In the process, the flip-flop 5003 is held if the inputs J and K are 00 (both low in level), reset if the inputs J and K are 01 (low and high in level), set if the inputs J and K are 10 (high and low in level), and inverted if the inputs J and K are 11 (both high in level).

Now, the operation of the digital-to-analog conversion will be described in detail.

In initial state, all the counters and the flip-flop 5003 are reset. When a conversion start signal is inputted to the strobe input terminal ST of the controller 5004, the controller 5004 sets the output signal from the end-of-conversion signal terminal EOC to logic "1" and thus declares that conversion is going on.

The controller 5004 outputs a count load signal LD, thereby loading the down-counter 5001 with a digital signal, and the up-counter 5002 with 0 in synchronism with the leading edge of the clock CK. The down-counter 5001 and the up-counter 5002 start the counting operation at the end of loading.

The controller 5004 outputs a set signal FR of the flip-flop 5003 at a point later than the counter load signal LD by one half period of the counter clock. Since the borrow output BO of the down counter 5001 is logic "0", the flip-flop 5003 has the input J thereof in "1" state and the input K in "0" state, and is thus set in synchronism with the leading edge of the clock pulse.

The down counter 5001 performs the down-counting operation (−1) each time of arrival of the clock, and when the count becomes 0, outputs the borrow output BO. As a result, the borrow signal BO changes to logic "1", and the input J of the flip-flop 5003 to "0", and the input K thereof to "1". Thus the flip-flop 5003 is reset in synchronism with the leading edge of the clock pulse.

When the input digital signal Din is decimal 0, the borrow output BO of the down-counter 5001 and the set signal FR of the controller 5004 are outputted in the same timing. According to the present embodiment including an AND gate 5006 to give priority to the borrow output BO of the down-counter 5001. This AND gate 5006 inhibits the set signal FR of the flip-flop 5003 from the controller 5004. In this way, when the digital signal Din is decimal 0, no pulse is outputted from the flip-flop 5003. When the digital signal Din is 1 or more, in contrast, a pulse having a pulse width corresponding to the output Q of the flip-flop 5003 is outputted. The output signal thus subjected to pulse width modulation is smoothed by a low-pass filter 5007 thereby to form an analog signal Vout.

The up-counter 5002 continues the counting operation, and outputs a carry signal CAR when the count reaches the maximum. The controller 5004, upon receipt of the carry signal CAR, changes the conversion-over signal EOC to logic "0" thereby to end the whole series of the converting operation. Upon completion of the conversion, the next digital signal is inputted. Specifically, in the case where the up-counter 5002 is provided as described above, an address signal is generated by the end-of-conversion signal EOC following a digital-to-analog conversion to read the next input digital signal.

As explained above, when the input digital signal and the strobe are inputted, the above-mentioned operation is repeated to form an analog signal Vout corresponding to the input digital signal Din. The controller 5004 raises the end-of-conversion signal EOC to high level and notices the fact to an external circuit during the conversion process, and continues the conversion without answering to a strobe ignoring the notice.

In reducing the ripple component of the analog conversion output Vout, a repeat counter or the like is provided for each conversion start signal like a strobe to repeat a designated number of digital-to-analog conversions as mentioned above. In the case where no input of a digital signal Din is assured during this repetition, a register should be provided to fetch an input digital signal in the same manner as described above.

The embodiments explained with reference to FIGS. 47 to 50 may be applied widely as a signal converter for converting a digital signal into a pulse width modulated signal as well as to a digital-to-analog converter.

Figure 51:
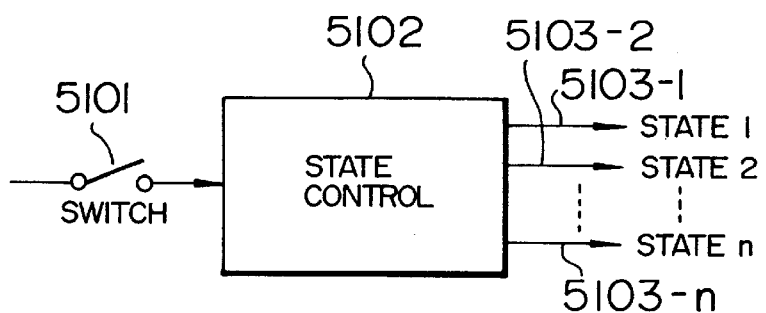
FIG. 51 is a fundamental block diagram showing an embodiment of a switch input circuit of a player used in a digital signal receiving/delivery system.

FIG. 51 is a basic block diagram showing an embodiment of a switch input circuit for the player 101 used with the digital information system described above.

As described already, the player 101 is reduced in size and thickness so as to be compatible with an IC memory card or the like. As a result, it is considered important to reduce the switches or the like for designating an operation mode. In view of this, according to this embodiment, signals 5103-1 to 5103-n for designating the states 1 to state n are formed by a state controller 5102 receiving an on/off signal of a key switch 5101. By doing so, a package of switches can be accommodated in a limited space of the small and thin player 101 as described above.

Figure 52:
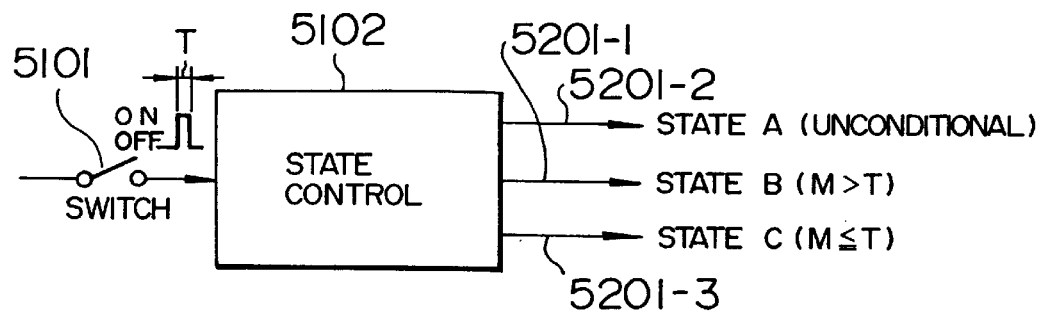
FIG. 52 is a block showing a specific configuration of a state controller according to an embodiment of the present invention.

FIG. 52 is a block diagram for explaining an embodiment of a specific configuration of a state controller.

According to this embodiment, an on time of the switch 5101 is judged by the state controller 5102. The state controller 5102 forms a signal 5201-1 for turning on state A unconditionally once the switch is turned on regardless of the on time T of the switch 5101. The state controller 5102 forms a signal 5201-2 for turning on state B when the on time T of the switch 5101 is smaller than a predetermined time length M (M>T). The state controller 5102 further forms a signal 5101-3 for turning on state C when the on time T of the switch 5101 is judged to be larger than a predetermined time length M (M≦T). By combining the signals 5101-1 to 5101-3 representing these three states A to C, the playback control operation mentioned below is realized.

FIG. 52 is a schematic diagram for explaining this operating mode.

The player 101 is set in a stop state immediately after power is thrown in. In this state 5302, assume that the switch 5101 is turned on. A signal 5301a indicating an unconditional state A regardless of the on time T is formed to set the player 101 in playback state 5303. In this playback state 5303, it is necessary to select one of two choices, one to change to a pause state 5305 and the other to return to the stop state 5302. When the switch 5101 is turned on again, the signal 5301b indicating the state A is formed and the time judgement 5304 is started, thereby judging the time T turned on. If the judgement is a signal 5301c indicating the state B, the player 101 is set to the pause 5305. If the judgement is a signal 5301e indicating the state C, on the other hand, the player 101 is returned to the stop state 5302. In the stop state 5305, the only meaningful operation is to return to the playback state 5303, and therefore the switch 5101 is only turned on so that the playback state 5303 is restored by the signal 5301d indicating the state A as described above.

In the case where a plurality of types of operation are designated by a switch, the disadvantage is a complicated operating procedure. According to the embodiment under consideration, in order to enable the user to master the operating procedure easily, light-emitting diodes or liquid crystal display devices are provided as elements corresponding to the stop state 5302, playback state 5303 and the pause state 5305 shown in FIG. 51. These elements are lit in accordance with the present state, and are combined with arrows shown in FIG. 51 thereby to indicate a state into which a change is possible by the input of the states A to C. This indication is effected only for a predetermined time of switching operation to save power consumption in the case where a light-emitting diode is used as the display unit.

Figure 54:
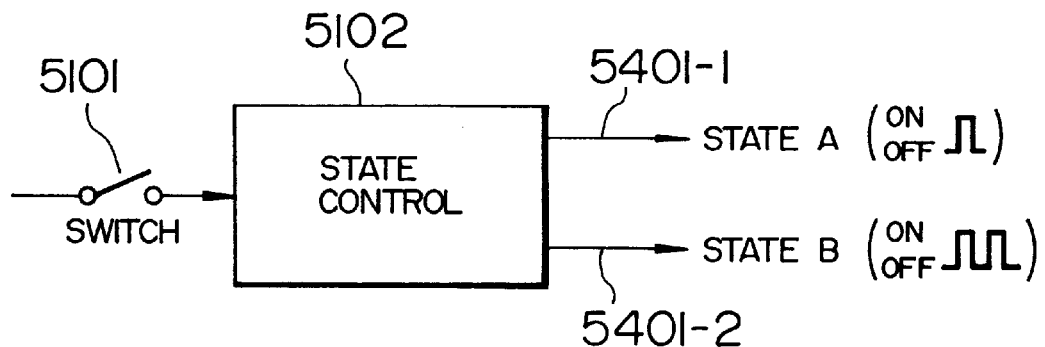
FIG. 54 is a block showing a specific configuration of a state controller according to another embodiment of the invention.

FIG. 54 is a block diagram showing another embodiment for explaining a specific configuration of a state controller.

According to this embodiment, the number of turnings on of the switch 5101, not the on time T of the switch 5101 as mentioned above, is judged by the state controller 5102. The state controller 5102 counts the number of turnings on of the switch 5101 and forms a signal 5401-1 for entering state A if the number of turning on is one. When the number of turnings on of the switch 5101 is two, on the other hand, a signal 5401-2 for entering state B is formed. By combining the signals 5401-1 and 5401-2 indicating two states A and B in this way, the playback control operation mentioned below is realized.

Figure 55:
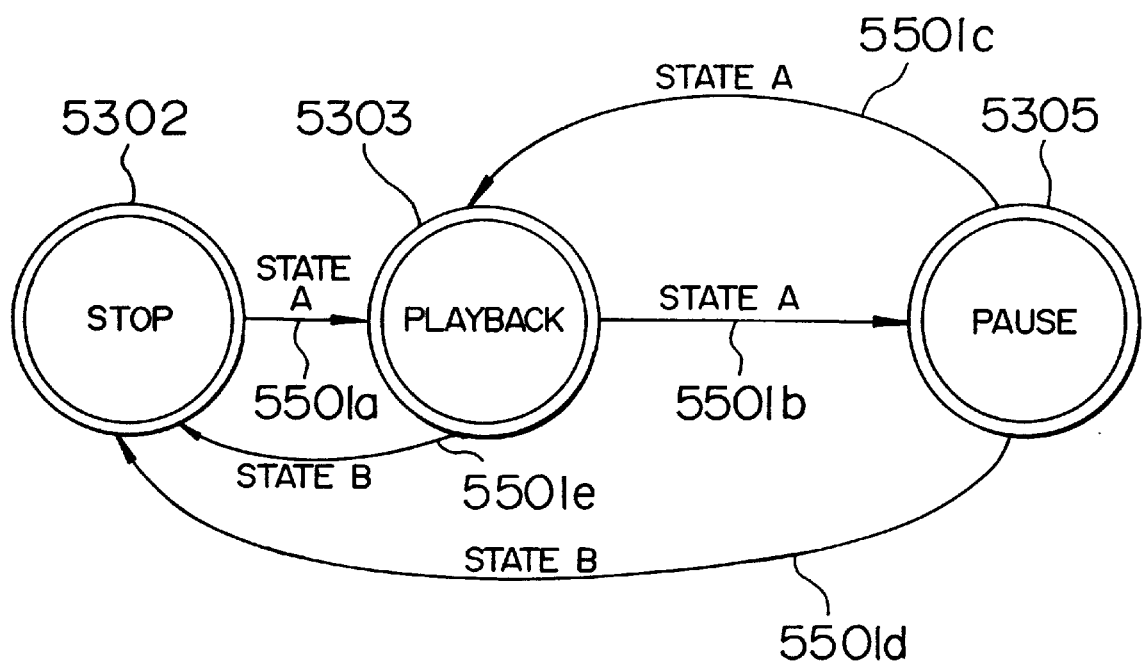
FIG. 55 is a schematic diagram for explaining the operating mode according to the embodiment shown in FIG. 54.

FIG. 55 is a schematic diagram for explaining the operating mode.

Figure 53:
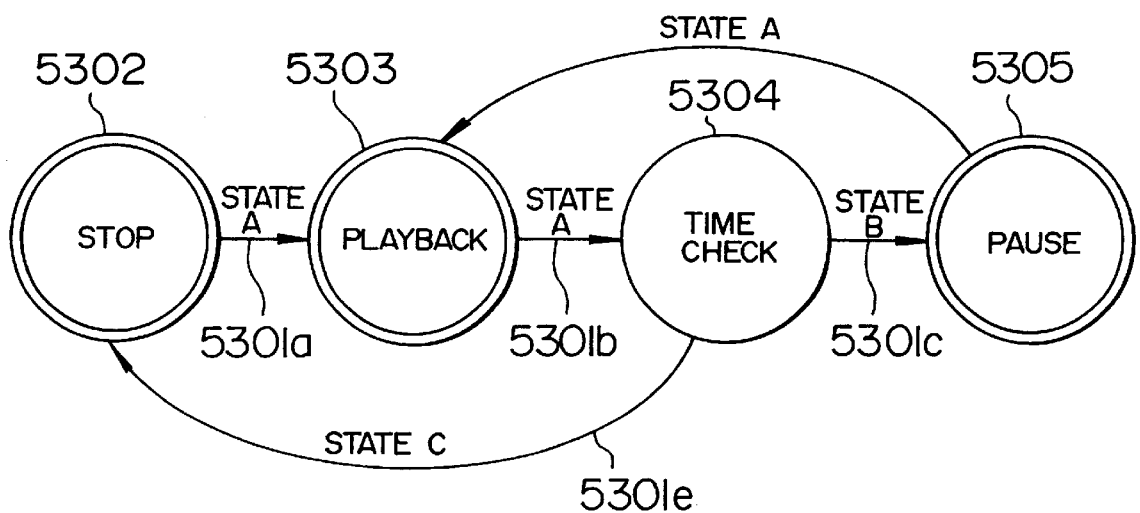
FIG. 53 is a schematic diagram for explaining the operating mode of the embodiment shown in FIG. 52.

Immediately after power is switched on, the player 101 is set to the stop state 5302 as described above. When the switch 5101 is turned on once under this state 5302, a signal 5501a indicating the state A is formed to set the player 101 to playback state 5303. In this playback state 5303, it is necessary to select one of the two choices, one for changing to the pause state 5305 and the other for returning to the stop state 5302. When the switch 5101 is turned on once, the signal 5501b indicating the state A is formed to set the player 101 to the pause state 5305. As an alternative, if the switch 5101 is turned on twice, the signal 5501e indicating the state B is formed to return the player 101 to the stop state 5302. In this embodiment, the stop state 5302, as well as the playback state 5303, may be restored from the pause state 5305. As a result, if the switch 5101 is turned on once in the pause state 5305, a signal 5501c indicating the state A is formed to shift the player 101 to the playback state 5303. When the switch 5101 is turned on twice in the pause state 5305, a signal 5501d indicating the state B is formed to shift the player 101 to the stop state 5302. According to this embodiment, too, the operating procedure is easily mastered by plotting corresponding display units and arrows in FIG. 53 as in the preceding embodiment.

Figure 56:
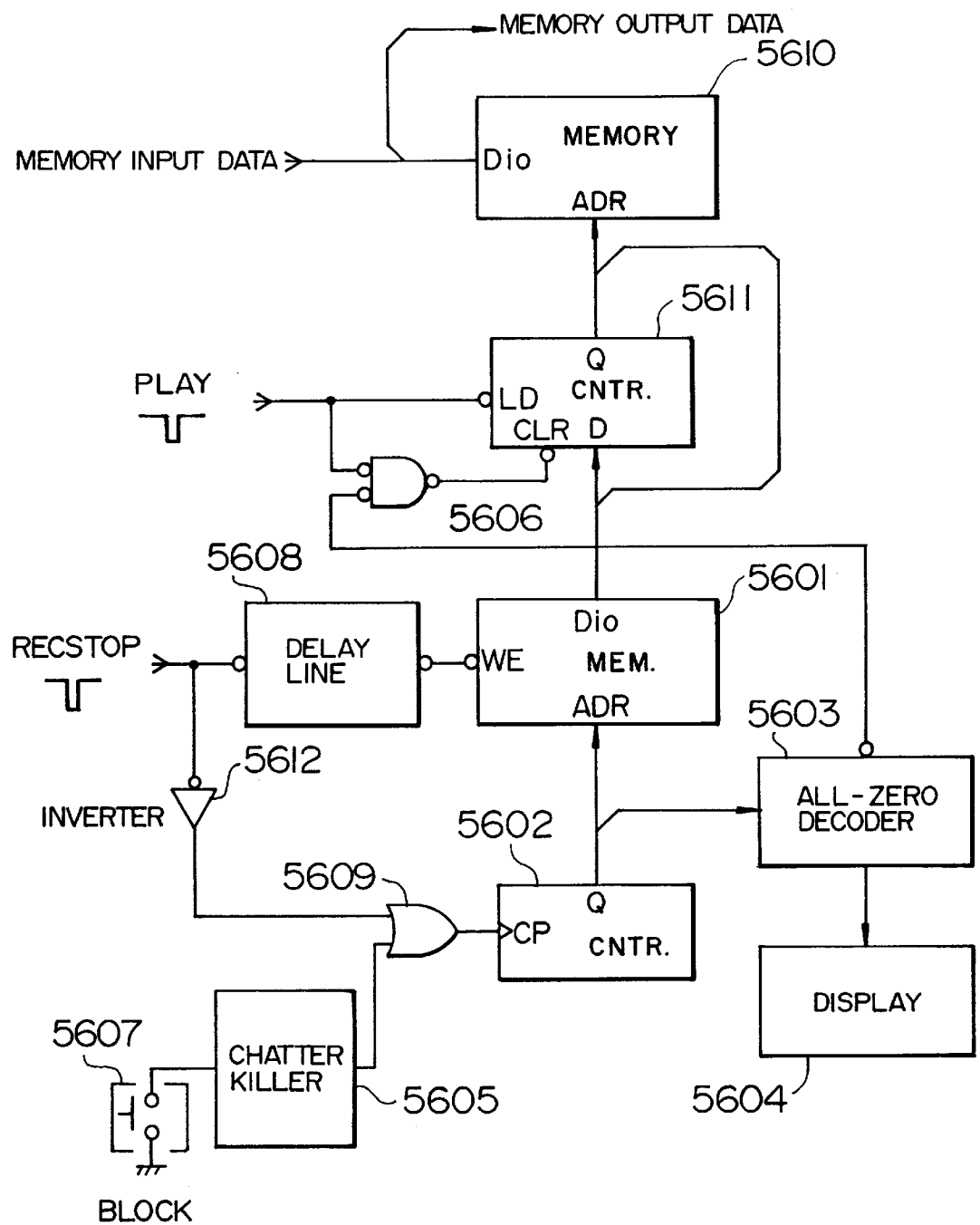
FIG. 56 is a block diagram showing an embodiment of a storage area management system of a memory mounted in the player.

FIG. 56 is a block diagram showing an embodiment in which the information to be stored, which may be available in a plurality of number of pieces, is divided (by block) for storage, and in playback mode, selective playback, i.e., what is called the head search, is made possible by designating a desired block by an operating switch or the like. This embodiment, in addition to a data memory 5610 and a data address counter 5611, includes a block address memory 5601 for setting the block address in the data address counter 5611 for determining a memory address of the data memory 5610, a block address counter 5602 for designating the address of the block address memory, a decoder 5603 for decoding the contents of the block address counter 5602, a display unit 5604 for displaying the contents decoded, an operating switch 5607 for selecting a block, and a chatter killer for removing chatters. This circuit section is supplied with a PLAY signal (a pulse with the width of 100 ns) for indicating the start of storage/playback and a RECSTOP signal (a pulse with the width of 100 ns) for indicating storage stop.

Now, the operation of this circuit will be explained. To facilitate the understanding, the count on the block address counter 5602 is assumed to be zero. If the storage mode is started in this state, the data are stored sequentially from the address 0 of the data memory 5610. Assume that the storage stop is designated at a given timing. First, the block address counter 5602 is incremented (the contents become 1) at the leading edge of the RECSTOP signal, and further, the contents of the data address counter 5611 are stored at the address 1 of the block address memory 5601 through a 100 ns delay line 5608 (the head address of the second data is involved). When the storage mode is entered in order to store another data and a PLAY signal is outputted, the contents of the address 1 of the block address memory 5601 stored previously are loaded (set) directly in the data address counter 5611 as a head address, so that the second data is stored sequentially. Each time the storage stop is designated, the contents of the data address counter 5611 are sequentially written into the block address memory 5601. The playback operation, on the other hand, is effected in the manner that will be described now. First, when it is desired to reproduce an intended block, say, the second data, the block address counter 5602 is incremented each time the operating switch 5607 is pressed, and the contents thereof are displayed on a numerical display 5604 (which may be a simple LED) through the decoder 5603. Until the intended address 1 (the second address is stored in the address 1) is displayed, the operating switch 5607 continues to be pressed, and when the address 1 is displayed, stops being pressed. When the playback is designated in the next instant, the PLAY signal is outputted, and the contents of the address 1, i.e., the head address having the second data stored therein, is loaded (set) in the data address counter 5611 to proceed with the reading. When it is desired to reproduce (or store) the first data, the incrementing operation of the block address counter 5602 is suspended at the time point when zero is indicated on the display 5604, whereby the all-zero output of the decoder 5603 becomes low in level, so that the PLAY signal is passed through the AND gate 5606 thereby to clear the data address counter. As a result, the data memory 5610 starts the playback (or storage) operation from the address 0, and the first data is reproduced (or stored).

As explained above, according to the present embodiment, a desired block can be selected by a simple operation, thus providing a system very easy to operate. Another feature of this embodiment lies in that since the block length can be determined exactly as desired, and therefore the data memory 5610 can be utilized without waste very efficiently. This is due to the fact that the performance of a semiconductor memory is fully used taking advantage of the characteristics thereof, and shows an example of effectiveness of the system according to the invention. Although a memory is divided into the data memory 5610 and the block address memory 5601 in this embodiment, they may be arranged as a single memory unit with equal effect.

Figure 57:
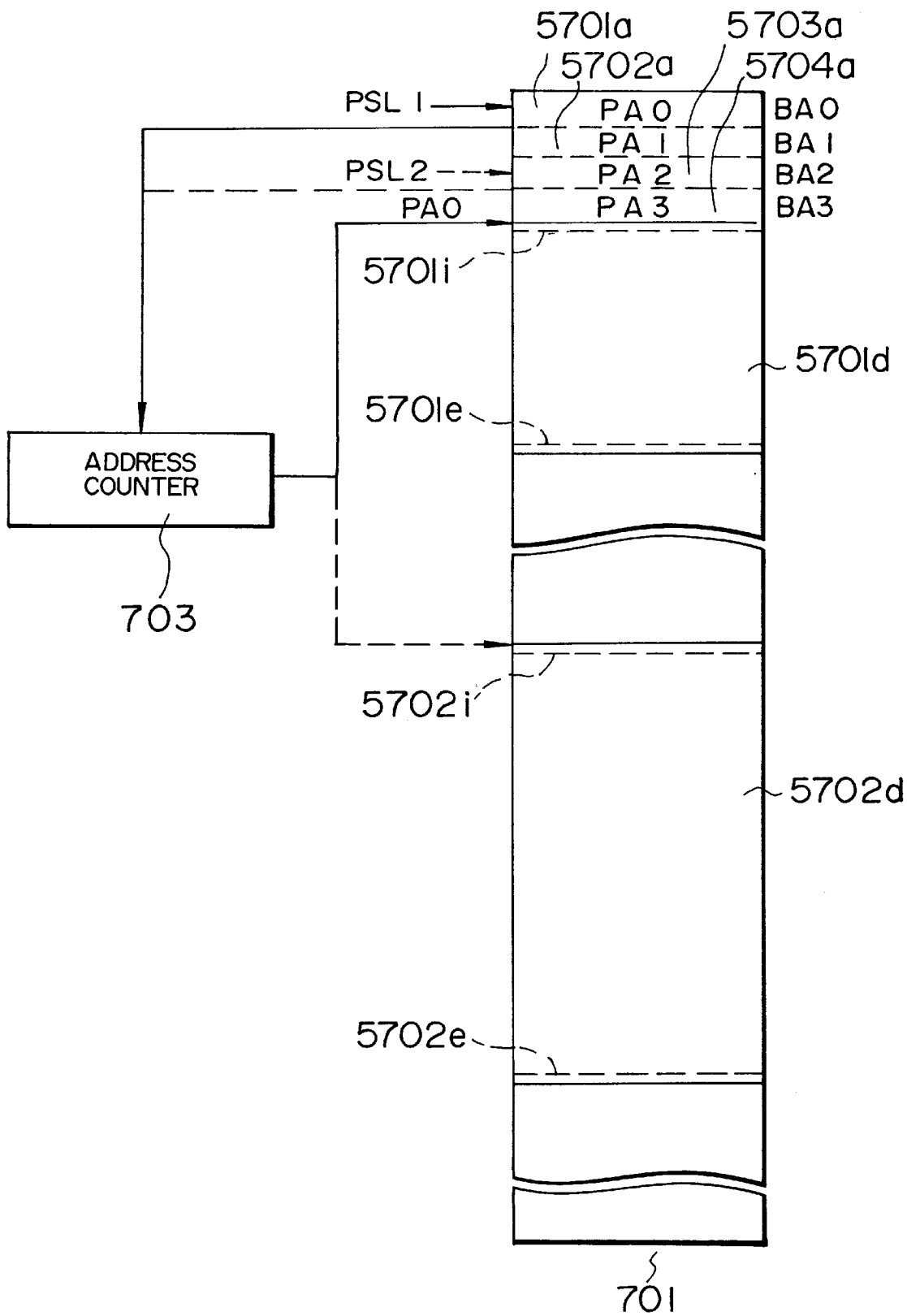
FIG. 57 is a schematic diagram showing an embodiment of a storage area management system of a memory built in the player.

FIG. 57 is a schematic diagram showing an embodiment of a storage area management system of the memory circuit 701 of the player 101.

In order to assure efficient use of the storage capacity of the memory circuit 701 mounted in the player 101 against a plurality of pieces of information, the memory circuit 701 is divided into a contents area and a data area. The contents area, though not specifically limited, has four contents 5701a to 5704a, capable of storing block addresses BA0 to BA3 respectively. The contents 5701a to 5704a are selected by program select signals PSL1, PSL2 and the like thereby making it possible to write or read the block addresses BA0, BA1, etc.

In the above-described digital information system, the terminal device 100, when connected with the player 101, accesses the contents area and reads an effective block address. As a result, the terminal device 100 is in a position to know a vacant area of the memory circuit 701 of the player 101. When a new digital signal to be received is designated, the block address is stored in the vacant contents area while at the same time storing a digital signal in the vacant area.

If the contents are in short supply or the vacant storage capacity is lacking for the digital signal received, a digital signal that has been already stored and that may be erased by display is selected, and by erasing the particular digital signal, a new digital signal is inputted. In the process, the digital signal that is already stored in the player 101 is also read out, and an address is allocated in such a manner as not to cause any vacancy of storage area in accordance with the storage capacity of the new digital signal.

In FIG. 57, the contents 5701a are addressed by a program access signal PSL1, so that the block address BA0 stored therein is read and set in the address counter 703. Assuming that the block address BA0 set in the address counter 703 is the data block 5701d of the head address of the data area as shown by solid line, for example, the ID code 5701i at the head of the block and subsequent addresses start to be read sequentially. The last address of the data, though not specifically specified, has an end mark 5701e stored therein, by detection of which the reading process is ended. In this configuration, it is sufficient to store only the head address in the contents and therefore the address information can be reduced.

Also, the contents 5702 are accessed by the program select signal PSL2, and the block address BA2 stored therein is read and set in the address counter 703. In the case where the block address set in the address counter 703 makes up an intermediate block as shown by dotted line, for instance, the addresses having the head ID code 5702i of the particular block and subsequent addresses start to be read in that order. The last address of the data 5702d has the end mark 5702e stored therein in the manner similar to the preceding case, and the reading process is ended upon detection of the end mark 5702e.

Assume that some data blocks storing the above-mentioned two types of program are vacated by erasure of a digital signal corresponding to the contents 5701a or otherwise, for example. The terminal device 100 changes the block address BA2 of the contents 5702a to an address of the end mark 5701e of the data area corresponding to the contents 5701a, while at the same time writing a corresponding digital signal. By doing so, a digital signal corresponding to the program newly received is usable successively for the remaining vacant areas.

The player 101 can be connected with the terminal device 100 so that the contents area and the data area may be cleared and a new digital signal may be stored. In such a case, desired programs may be reserved by designating a no-erasure on the player 101 side or a no-erasure program as an operation of receiving of a digital signal with the terminal device 100.

Figure 58:
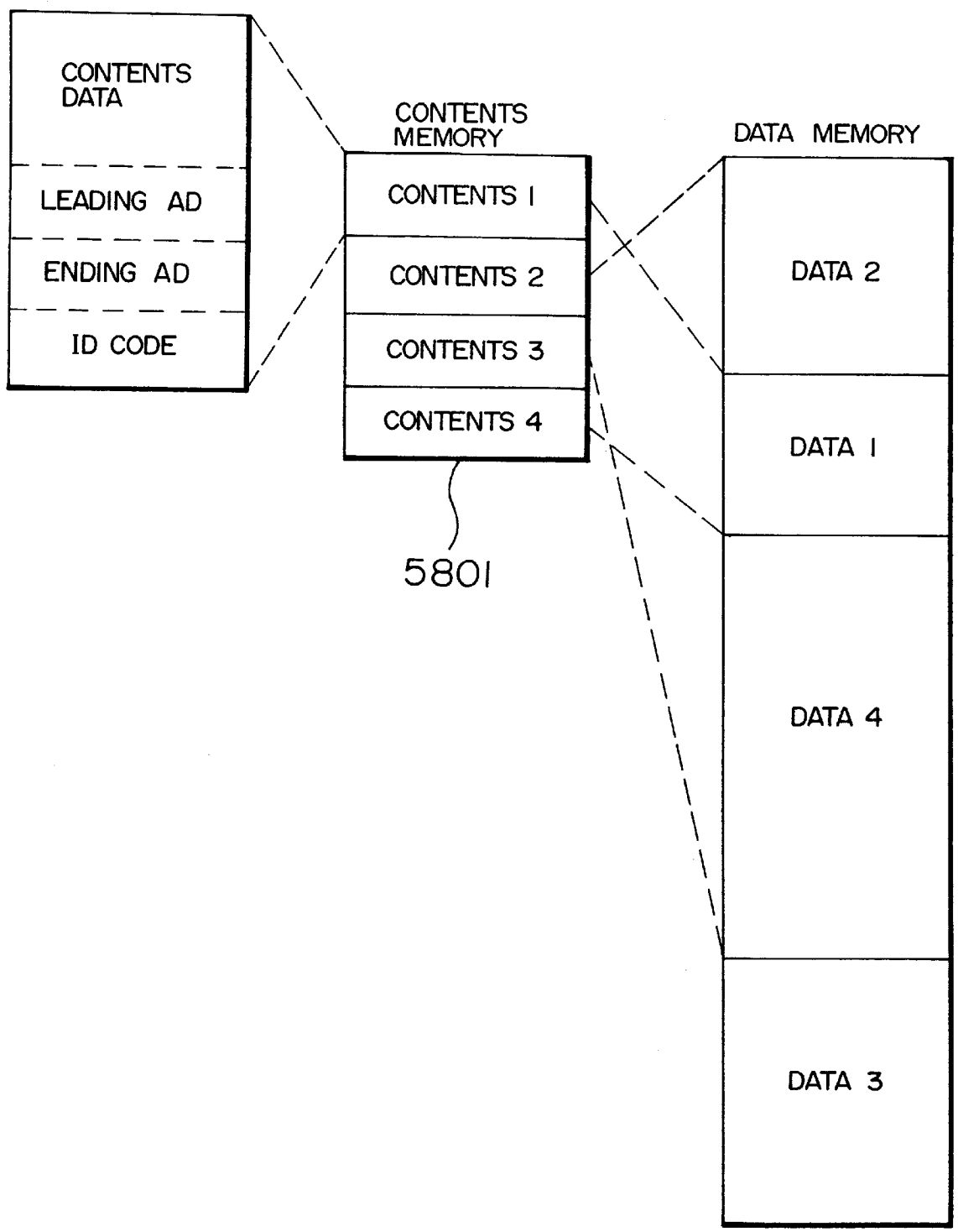
FIG. 58 is a schematic diagram showing another embodiment of a storage area management system of a memory built in the player.

FIG. 58 is a schematic diagram showing another embodiment of the storage area management system of the memory circuit 701 of the player 101.

According to this embodiment, a digital signal is stored and managed by a contents memory 5801 and a data memory 5802. The contents memory 5801 can store a maximum of four types of digital signals (programs) including contents 1 to 4, for example. The contents memory 5801 may store only the head address as in the aforementioned embodiment or the contents information in addition to the end address or ID code. This contents information, though not specifically limited, includes character information, so that the program contents can be displayed by characters with a liquid display unit mounted in the player 101.

Each content of the contents memory 5801 and the data area of the data memory 5802 is arranged as desired in such forms as data 2, data 1, data 4 and data 3, for example, from the head address side of the data memory 5802 in the order of storage. Specifically, digital signals are stored in the data memory 5802 in the order of designation.

Figure 59:
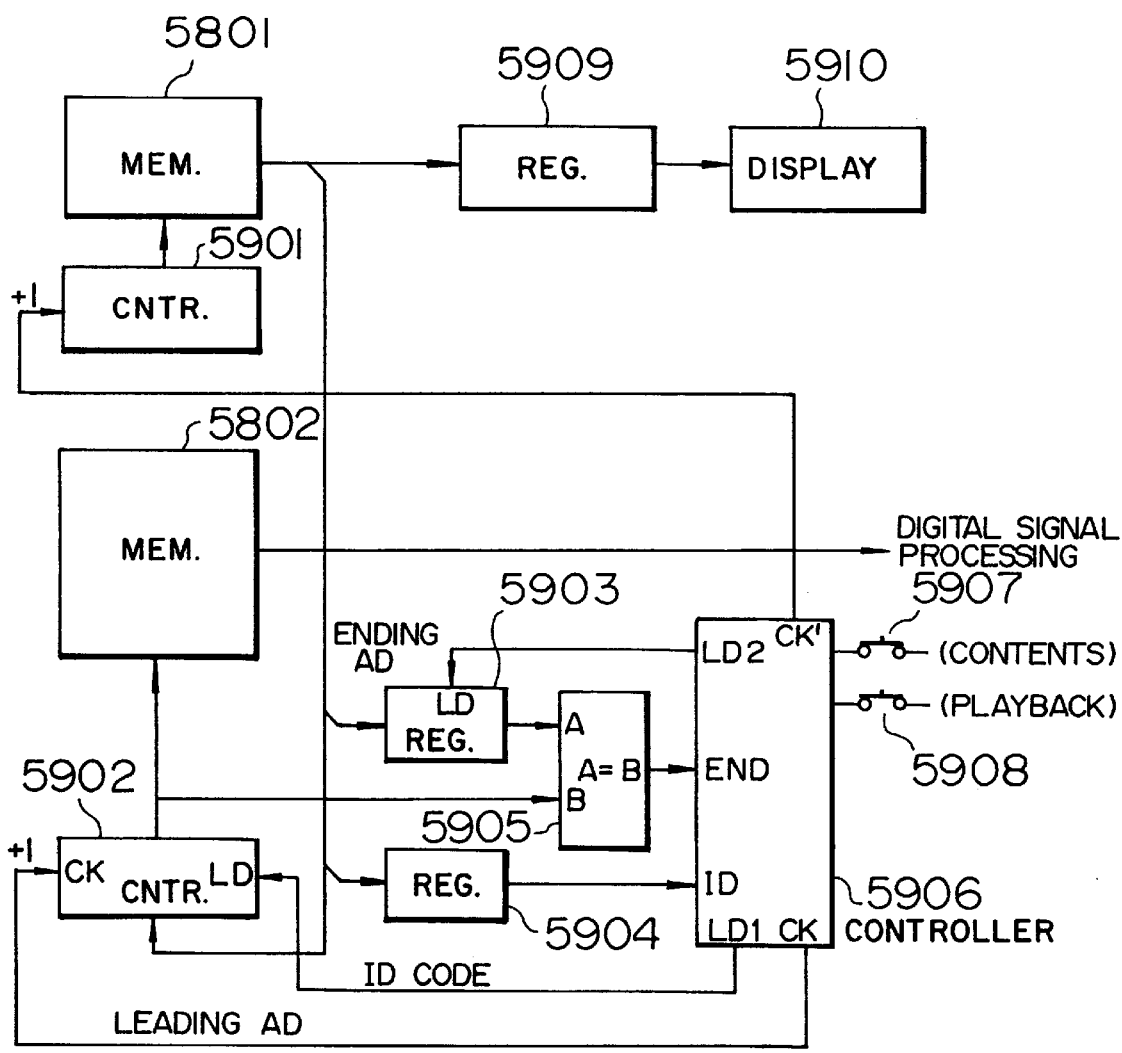
FIG. 59 is a block diagram showing the essential parts of an embodiment of the player having the indexing function in FIG. 58.

FIG. 59 is a block diagram showing the essential parts of an embodiment of the player 101 with the contents function added thereto.

The controller 5906 includes a switch 5907 for designating contents (designating programs) in addition to the switch 5908 for operation control mentioned above. When this switch 5907 is turned on, though not specifically limited, a +1 pulse is supplied to the contents address counter 5901, and the contents memory 5801 is accessed. The contents information read out of the contents memory 5801 is stored in the contents register 5909 whereby such characters as title are displayed on the liquid crystal display 5910.

The head address read out of the contents memory 5801 is set in the address counter 5902 of the data memory 5802, while the end address and the ID code are loaded in the registers 5903 and 5904 respectively. The ID code is transmitted to the controller 5906 and is decoded for automatically setting the sampling frequency, the data length, the stereo/monaural mode and the like.

The address signal outputted from the address counter 5902 is used for accessing the data memory 5802 on the one hand and is supplied to the comparator 5905 on the other hand. The other input of the comparator 5905 is supplied with the last address loaded in the register 5903. As a result, when a digital signal (data) corresponding to the designated contents is completely read, this fact is detected by the comparator 5905 and an end signal is inputted to the controller 5906, thereby ending the operation of reading a series of digital signals.

In the above-mentioned indexing function, the number of contents may be four or as desired. If such a number is the square N of 2, however, a binary address counter can be conveniently used directly and selection is facilitated. Also, in the case where the contents memory 5801 is provided separate from the data memory 5802, they are accessible in parallel independently of each other thereby to simplify the control of the address counter. The contents memory 5801, as in the embodiment of FIG. 57, may be course be configured by the use of a predetermined storage area of the data memory 5802.

Figure 60:
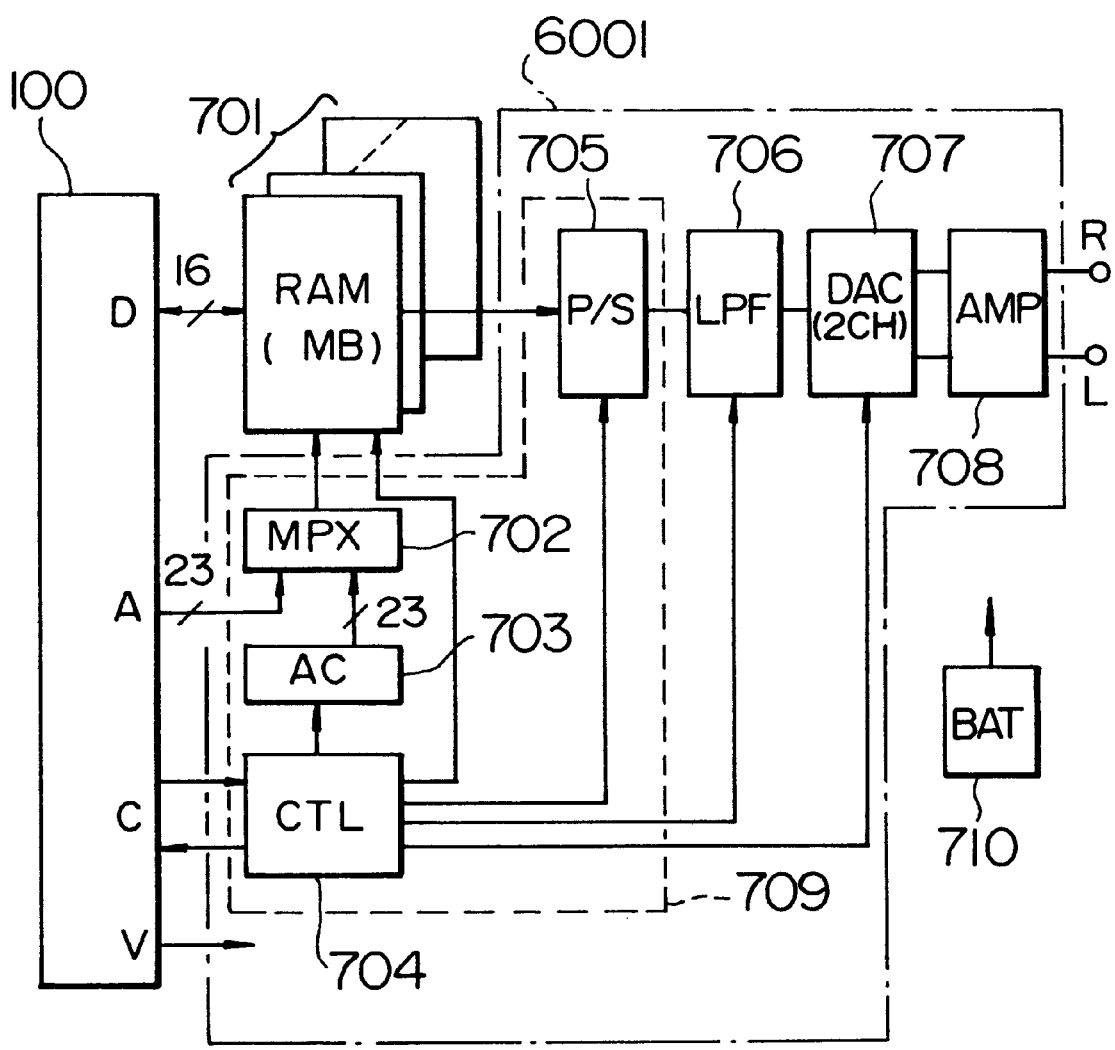
FIG. 60 is a block diagram showing an embodiment of the player similar to FIG. 7.

FIG. 60 shows an embodiment of the player 101 according to the present invention similar to that of FIG. 7. This embodiment comprises a one-chip integrated circuit 6001 in the form of IC or hybrid IC defined by one-dot chain including a multiplexer 702, an address counter 703, a controller 704, a parallel-to-serial converter 705, a low-pass filter 706, a digital-to-analog converter 707 and an amplifier 708 except for the memory circuit 701 of the player 101. This one-chip integrated circuit includes a signal and a terminal for realizing the data transfer of the digital information system described above, a signal and a terminal for controlling the memory, a signal and a terminal for outputting an analog audio signal, a signal and a terminal for supporting the operation against the one-chip integrated circuit, a signal and a terminal for indicating the state of the one-chip integrated circuit, and a signal and a terminal for supplying power to the one-chip integrated circuit. Also, the configuration of a one-chip integrated circuit need not include all the functions described above and is not confined specifically.

This embodiment is reduced in size to such an extent that a body circuit including a cell can be entirely packaged in the ear portion of the headphone with microphone used by the telephone operator or the like. At the same time, actual measurement of the power consumption is only about 50 microwatts in standby state and about 20 milliwatts at the time of playback, thus realizing a system very small in size and extremely small in power consumption. This indicates that the continuous playback operation of 30 hours or longer is possible even with a small-capacity (180 mAh) button-type lithium cell is used, or that a given data stored and left to stand may be reproduced effectively 450 days later. There is still a room for remarkable improvement of these values by technological advance, with the probable result that a record may be held over several years, the playback operation over one hundred hours may be made possible, or a still smaller and lighter system may be realized.

Figure 61:
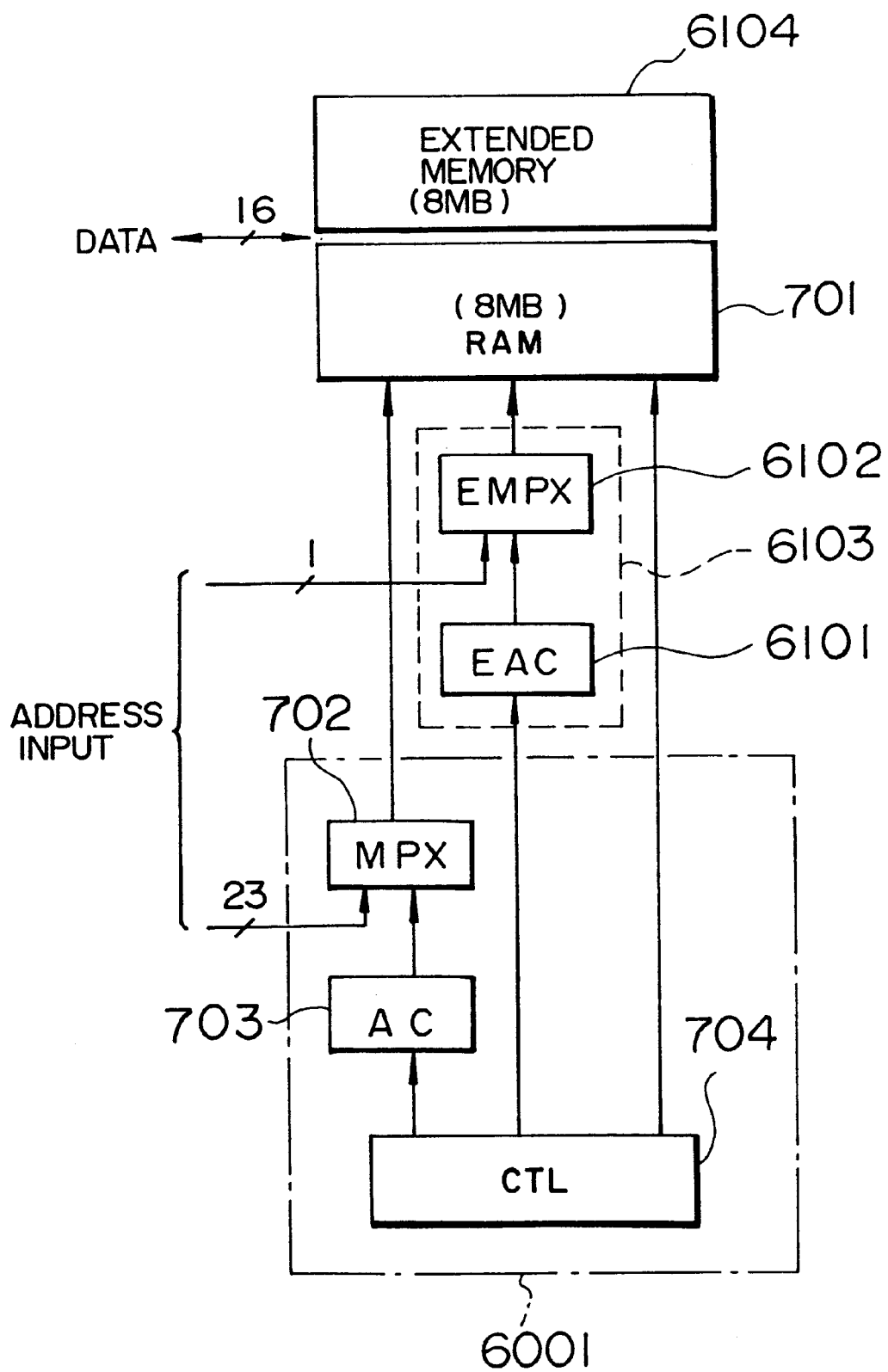
FIG. 61 is a block diagram showing the embodiment of FIG. 60 with an enlarged memory.

In the case where the controller is incorporated in a one-chip integrated circuit, the problem may be posed that the storage capacity of a directly controllable memory is limited. In order to obviate this problem, as shown in FIG. 61, the control signal and the terminal of the memory may be provided with an extending signal and another terminal as an option, whereby it is possible to enlarge the storage capacity of the memory. In the case where the address generated by the address counter 703 incorporated in the one-chip integrated circuit is 23 bits (a data is assumed to have eight bits) as shown in FIG. 60, for instance, the storage capacity of the memory is 8,388,608 bytes at maximum. If it is desired to double the storage capacity to 16,777,216, an address extender including an extended address counter 6101 operated in cooperation with an internal address counter 703 and an extended multiplexer 6102 operated the same way as an internal multiplexer 702 is inserted outside of the one-chip integrated circuit to extend the address applied to the memory to 24 bits.

Figure 62:
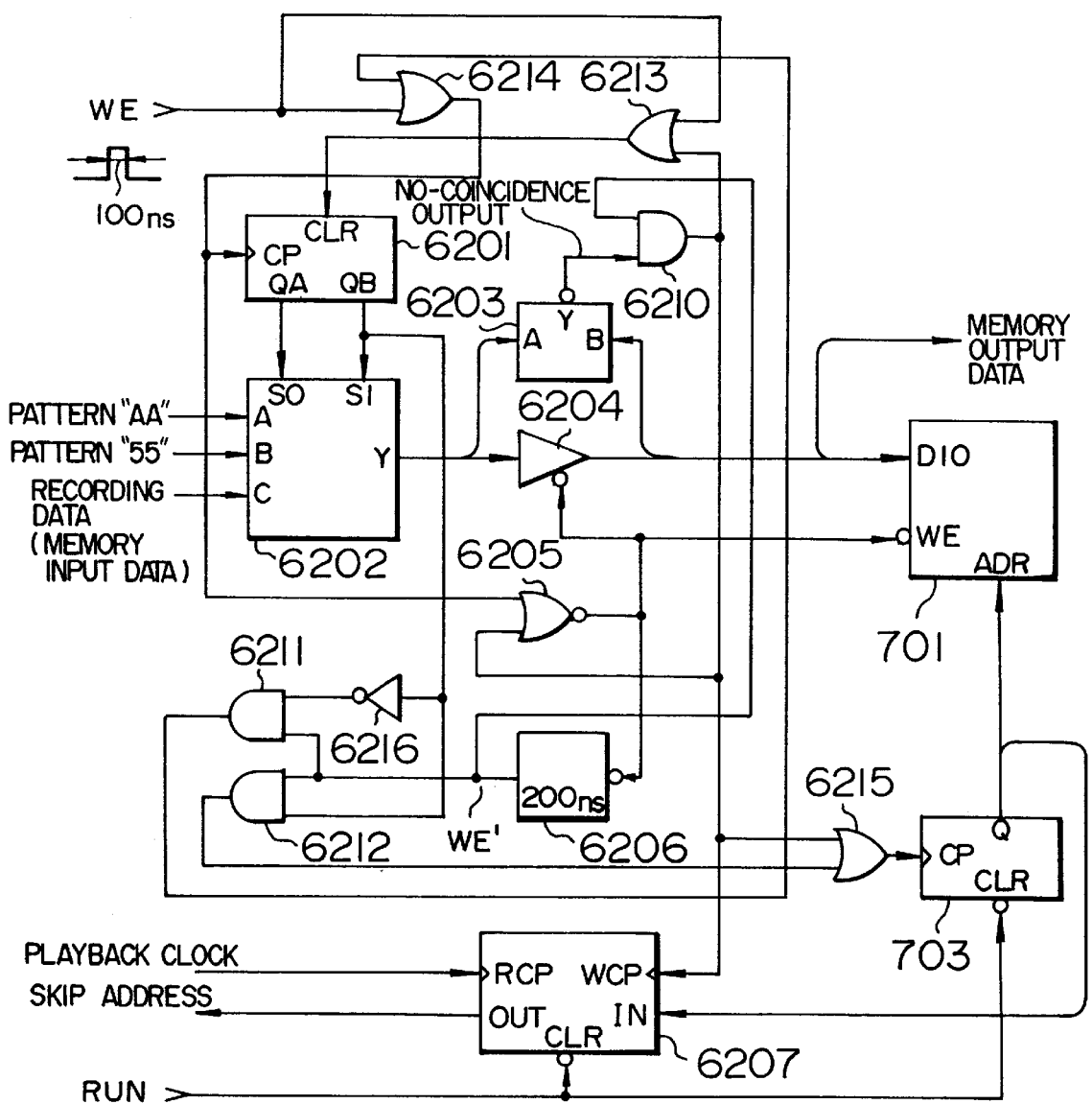
FIG. 62 is a block diagram showing the essential parts of a self-diagnosis circuit according to an embodiment of the invention.

FIG. 62 is a block diagram showing a self-diagnosis circuit for automatically discriminating a defective bit of the memory in the player 101 and skipping the defective bit.

In the player shown in FIG. 7, the memory circuit 701 has added thereto a self-diagnosis circuit. This self-diagnosis circuit includes a multiplexer 6202 for selecting the data inputted to the memory circuit 701 and the two types of data patterns "AA" and "55" for testing the memory, a ternary counter 6201 for supplying a selection signal to the multiplexer 6202, a buffer 6204 for connecting the output of the multiplexer 6202 to the memory, a delay line 6206, an address counter 703, a comparator 6203 and a first-in first-out memory 6207. Signals inputted to and outputted from this circuit section include an input data from the terminal device 100, an output data from the memory, a write strobe signal (WE) from the controller to the memory, a RUN signal for indicating "under storage/playback", and two types of memory test pattern data "AA" and "55" as an input. A skip address output and a playback clock input are for skipping the defective portions (defective addresses) of the memory in the process of reading during the playback operation. Immediately after the stored data is changed, the write strobe signal (WE) is inputted with a pulse width of 100 ns (the repetitive frequency of 8 kHz), clears the ternary counter 6201 through the AND gate 6213, and is connected to the control terminal of the buffer 6204 and the WE (write enable) terminal of the memory through the AND gate 6214 and the inverter 6205. The buffer 6204 is a device which is in a high impedance state when the control terminal is at a high level, and the input thereto is reflected in the output terminal thereof only when the control terminal becomes low. The data terminal (DIO) of the memory, on the other hand, outputs the contents of a designated address when the WE terminal is high in level, while when the WE becomes low, the DIO terminal switches to a state capable of accepting a data input, thereby writing the data input of the DIO terminal into a designated address. When the data on the input and output sides of the buffer 6204 immediately after the WE pulse signal has returned to high level (exactly, after the lapse of 50 ns as an access time of the memory), therefore, a normal data should have been written into the memory. If the two data fail to coincide with each other, by contrast, it indicates that a normal data has not been written into the memory. In order to make this judgment, a comparator 6203 is inserted which is so logically configured that the Y output thereof becomes high in level when the contents at the A and B input terminals fail to coincide with each other, and the Y output of this comparator 6203 is supplied as an input to the AND gate 6210. In this configuration, the output of a NOR gate 6205 is also inputted to the pulse delay line 6206 with inverter function. By this delay line 6206, a WE' pulse about 200 ns delayed is outputted and inputted to the other input terminal of the AND gate 6210. In the processes, if the no-coincidence output is at low level, i.e., if the data is normally written into the memory 710, the AND gate 6210 outputs no signal. The ternary counter 6201 is reset at the time of input of a WE pulse thereto (although the clock input CP is also supplied with a pulse, the clearing operation is given priority), and both the QA and QB outputs thereof are at low level with the multiplexer 6202 selecting the pattern "AA" (10101010 sequentially from the seventh power of 2 bits side in hexadecimal or binary notation). Therefore, the data normally written into the memory circuit 701 makes up the first test pattern. Since the QB output (first power of two bits) of the ternary counter 6201 is at low level, this output is raised to high level at the inverter 6216. The AND gate 6211 passes the WE', which passing through the OR gate 6214, counts up the ternary counter 6201 whereby the multiplexer 6202 selects the test pattern "55" (01010101 sequentially from the seventh power of 2 bits side in hexadecimal or binary notation). At the same time, the output of the OR gate 6214 is inputted to the NOR gate 6205 and functions as a write pulse for the memory. Subsequently, when the test pattern "55" or the stored data (input data of the memory) is normally written, the AND gate 6211 is inhibited (since the QB output of the ternary counter 6201 is raised to high level), so that the round loop mentioned above is released. Instead, the WE' pulse is passed through the AND gate 6212, and after counting up the address counter 703, the next write pulse (WE) from the controller is awaited. In the case where the Y output (no-coincidence output) of the comparator 6203 is at high level, i.e., in the case where no normal data has been written into the memory circuit 701, the WE' pulse is passed through the AND gate 6210, and the associated contents of the address counter 703 are written into the first-in first-out memory 6207, while at the same time being inputted to the NOR gate 6205 and the OR gate 6213, thereby repeating once again the same operation as when the WE pulse is inputted. This repetitive operation is continued until a data is normally written into the memory circuit 701 (this repetitive operation requires about 300 ns and the WE input period is about 125 $\mu$s. Therefore, the number of repetitions actually allowed is about 400 in the first pattern check, i.e., by generation of an error at the time of writing the pattern "AA", or about 200 in the second pattern check, i.e., by generation of an error at the time of writing the pattern "55".)

According to this embodiment, it is possible to use a semiconductor chip which otherwise might be discarded as a result of inspection when only several bits of large capacity memory cells of megabit class such as four or 16 megabits are defective, and therefore a very inexpensive system is provided. The basic concept here is to conduct inspection before writing and utilize any defective bit by the use of the result of inspection, and various modifications and applications are of course possible by use of this concept. When a defective bit fixed to "1" at the time of writing "1" is detected as a result of inspection, for instance, that bit may be used as "1" as it is.

If the operation of the multiplexer 6202 in FIG. 62 is fixed (QA output of the ternary counter 6201 is fixed to low level and the QB output thereof to high level), a simple self-diagnosis circuit may be configured for checking while writing into the memory by use of only a write data.

Also, the present embodiment is effective especially when the recording function (also, image or medical data as audio information) is added to the player.

Figure 67:
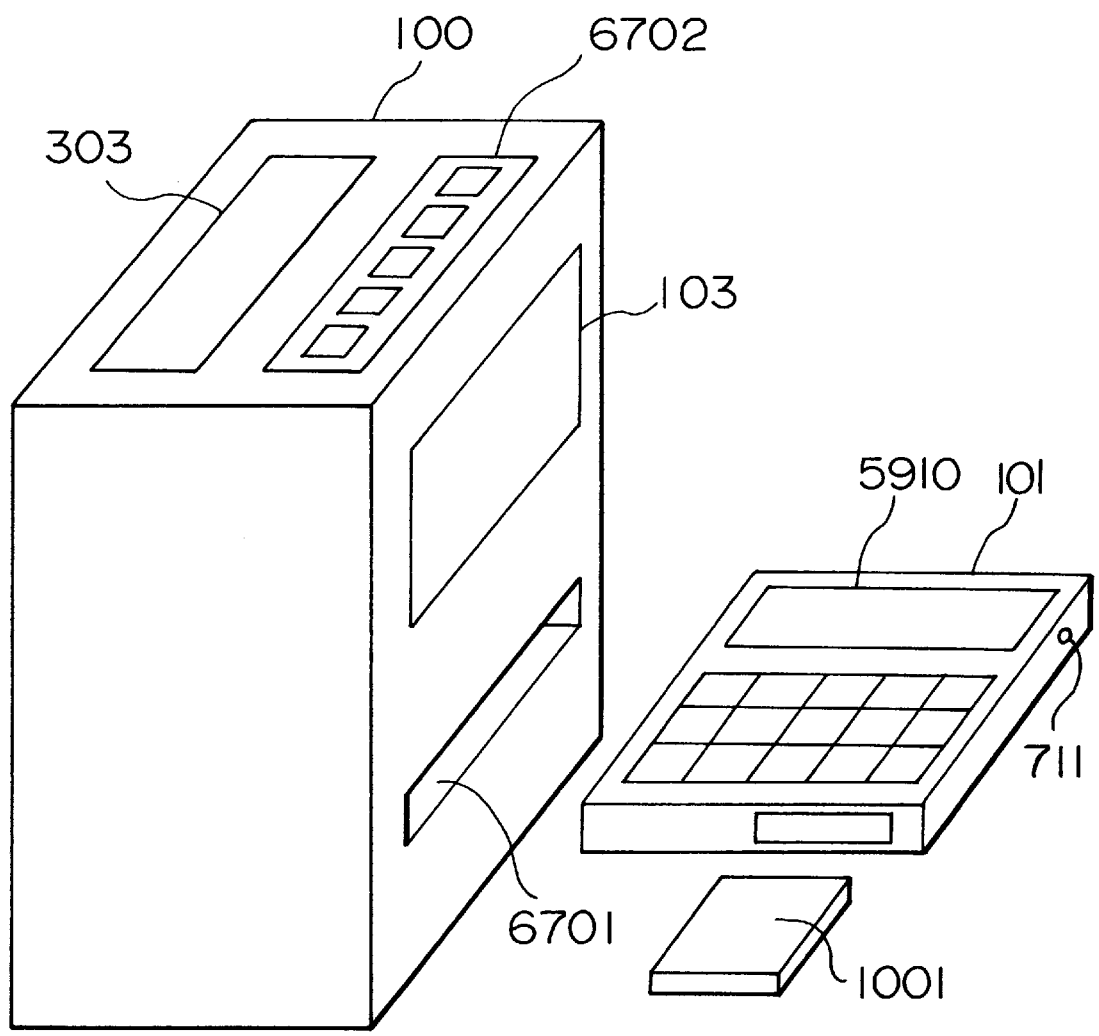
FIG. 67 is a diagram specifically showing the appearance of an embodiment of a digital signal receiving/delivery system according to the present invention.

FIG. 67 is an outside view showing a specific embodiment of a digital information system according to the present invention. In FIG. 67, the same component parts as in FIGS. 1, 3, 7, 10 and 59 are designated by the same reference numerals respectively and will not be described in detail.

Numeral 1001 designates a small memory section including a memory card or an IC card mainly formed of a semiconductor memory. This embodiment represents a digital signal receiving/delivery system of a hierarchical type or tree-structure type in order to add other functions or an additional memory. In this diagram, the terminal device 100 has a first clock making up a sampling frequency for an analog-to-digital converter at the time of recording an external input signal and a high-speed second clock for transferring an audio digital signal from the terminal device 100 to the player 101. Further, the player 101 has a third clock making up a sampling frequency of the digital-to-analog converter at the time of playback.

The player 101 also has a high-speed fourth clock for transferring a digital signal from itself to the memory. In the case where the terminal device 100 is used in connection with the player 101, however, the fourth clock may be replaced with the second clock. At least in that case, the fourth clock may be done without. Of all these clocks, the first and third clocks for recording or playback may be variable. In music applications, the audio sampling frequency may be increased in speed and a higher sound quality is thus expected. In the case of conversation, on the other hand, the sampling frequency may be decreased in speed to save the memory consumption.

In the application shown in FIG. 67, for example, a given audio file is selected from the terminal device 100 acting as a parent, is written at high speed with the second clock for transferring information to the player 101 as large as an electronic notebook making up a child, and is further transferred and recorded in a small memory card or an IC card making up a grandchild at a memory by the high speed fourth clock. The contents thus recorded may be shared with other players 101, electronic notebooks or the like.

Also, the software makers or developers may supply audio information, processing programs and the like in the form of memory card or IC card. Further, it is possible to add an optional function to the player 101 such as for converting an audio signal to a sentence or storing a sentence in the memory section. The grandchild card is not limited to the one using a semiconductor memory, but various media such as ultra-small optical or magnetic disks may become available in the future.

The player according to this embodiment, which has a replaceable memory circuit shown in FIG. 10, is not limited to such type of memory circuit. In the case where information is transferred from the terminal device 100 to the player 101, the player mounted in the memory is packaged in the player insertion port 6701 of the terminal device 100, so that selected information is transferred at high speed to the player. In the process, the operating switches 6702 of the terminal device 100 are operated to select information to be transferred from among the information accumulated in the memory 303. At the time of playback, the player is drawn out of the terminal device 100 for independent reproduction. This embodiment is comparatively large in scale and is intended for installation in ordinary stores and station stands.

Figure 68:
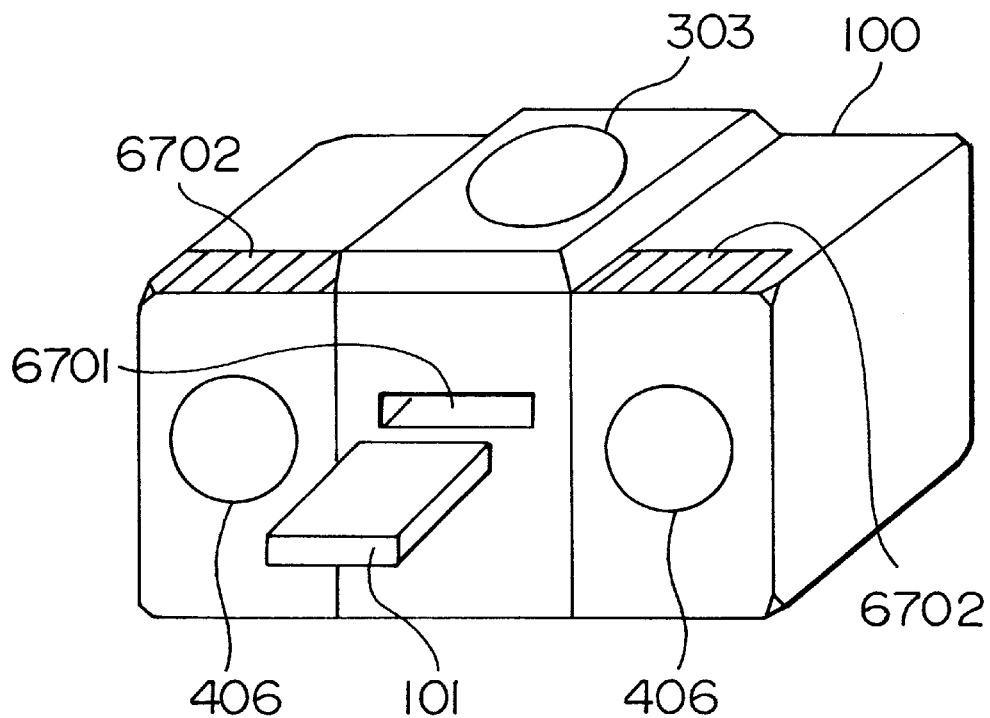
FIG. 68 is a diagram specifically showing the appearance of another embodiment of a digital information system according to the present invention.

FIG. 68 shows an outside view of a specific embodiment of a digital information system according to the present invention. In FIG. 68, the same component parts as those in FIGS. 1, 3, 4, 7, 10, 59 and 67 are designated by the same reference numerals respectively and will not be described in detail.

Numeral 406 designates a speaker, and numeral 6702 an operating section for recording and playback operation. The terminal device 100 itself has a recording and playback function. The terminal device 100, for instance, is made up of a multi-purpose audio recording and playback system at least having the functions of FM, AM, TV, radio, optical disk, magnetic disk, digital audio tape or timer-reserved recording. The multi-medium functions of the terminal device 100 may be promoted by adding the digital information system according to the present invention.

The terminal device 100 may of course be of either free-standing or portable type depending on the environment involved. Also, the digital information system according to the present invention may be introduced to the telephone or the like system to acquire a great amount of information through the automatic answering telephone function.

The present embodiment represents a comparatively small type of system for home use.

Figure 69:
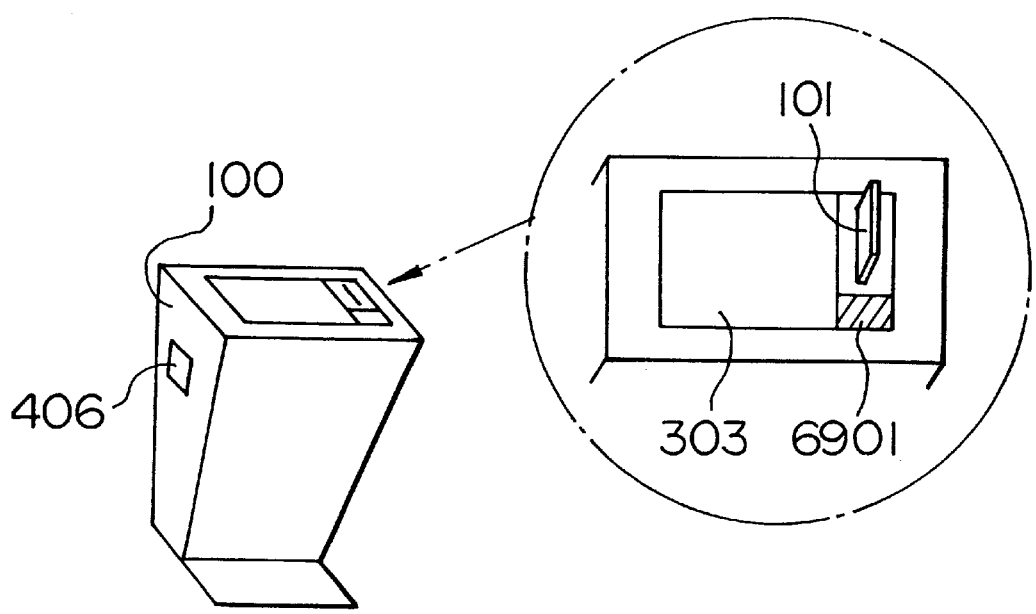
FIG. 69 is a diagram specifically showing the appearance of still another embodiment of a digital signal receiving/delivery system according to the present invention.

FIG. 69 is an outside view showing a specific embodiment having the most conspicuous features of a digital information system according to the present invention. In FIG. 69, the same component parts as in FIGS. 1, 3, 4, 7 and 10 are designated by the same reference numerals respectively, and will not be described in detail. The present embodiment has the features mentioned below in order to realize simple operability. Though not specifically shown in FIG. 69, a touch panel is employed for the liquid crystal display 303 to display the operating procedure and the functions of the operating switches on the screen, thus minimizing the requirement of operating switches (limited to the confirmation switch described later) by a tiered operating screen. As a result, the convenience to the user is greatly improved. Further, the inverted insertion of the terminal 100 into the player is prevented by appropriate machining. Also, the confirmation switch 6901 is used to prevent erroneous selection of information by the user. After the user confirms the selected information by the testing function mentioned above, the confirmation switch 6901 is depressed to transfer the information instantaneously to the player 101. Further, the display panel 303 is adapted to display, in addition to the normal operation screen, the result of checking the conditions of the cell 710 in the player 101 by the terminal device 100 and a message confirming the insertion of the player.

Furthermore, the terminal device 100 is connected with the player 101 by a connector conforming to the JEIDA or equivalent standard.

The player 101 according to the present embodiment includes a switch for turning on/off a power supply, a switch for designating the slow/fast playback mode, a switch for designating the loudness mode and a pushbutton switch for designating the playback/stop/pause state.

The present invention is not limited to the monochromatic display of the graphic screen or characters on the liquid crystal display unit 303 of the terminal device 100 as according to the present embodiment, but still images or animation may be displayed in color with equal effect.

The effects obtained from the embodiments described above are as follows:

(1) In receiving/delivering a digital signal, a player is directly connected one-to-one with a digital signal source, so that a specified digital signal is directly received and stored in a memory and the digital signal stored independently in the memory is reproduced. In this configuration, the player receives the digital signal and reproduces it independently, so that the value of the digital signal delivered is exhibited in direct form.

(2) As a result of the effect described in (1) above, the digital information as a commodity or the like can be easily processed or produced or the selling system thereof easily set up.

(3) As a result of the effect described in (1) above, the value of the digital signal itself received/delivered is recognized as a commodity or the like, and the player has a simple function of reproducing the particular value. The player thus has a simple configuration and is easily operated by any one.

(4) A digital signal is received from a digital signal source by a terminal device through a communication channel or an appropriate storage medium. A player and a connector are connected with the terminal device to receive/deliver a digital signal, whereby a digital signal selling system is provided for selling a digital signal as a commodity or the like both rationally and at high speed.

(5) A magnetic disk memory having a comparatively large storage capacity is used as a backup memory for the terminal device, and the digital signal large in the amount of receiving/delivery or updated with time is stored in a buffer memory configured of a semiconductor memory accessible at high speed, thus realizing an efficient receiving/delivery of a digital signal.

(6) The terminal device is provided with the microcomputer function to manage the magnetic disk memory or the buffer memory and to exchange a digital signal with the source through a communication channel. Also, the storage area of the memory in the player is managed to permit effective utilization of the memory as well as simplification of the player.

(7) The terminal device is provided with the function of monitoring a part of the digital signal for a predetermined length of time, thereby preventing a selection error or facilitating the selection of an intended digital signal.

(8) The digital signal received/delivered is limited to audio information as a digital audio signal, and therefore the player function is simplified to storage and playback.

(9) The digital signal received/delivered has added thereto an ID code, whereby the playback conditions for the player are automatically designated thereby to receive/deliver a variety of digital signals corresponding to a given information program while at the same time offering an operating ease.

(10) By providing a card-like memory section replaceable from the player body, various RAM, EEPROM or ROM may be used as a memory, thereby increasing the variety of functions.

(11) The outline of the player and the connector are compatible with the existing memory card, whereby an internal memory can be used equivalently to the existing memory card.

(12) As a result of the effects described in (10) and (11) above, the multiple functions and enlarged applications of the player are assured.

(13) The player is provided with a security function for protecting the input and/or output operation of the memory in accordance with a password or a password coincidence detection signal, whereby easy duplication, eavesdropping or the like is prevented thereby increasing the commercial value of a digital signal received/delivered.

(14) As a part of the memory section of the player, a thin card-like memory is replaceably mounted. This makes it possible to enlarge the storage capacity or reproduce a program configured of various ROMs as required, thereby realizing a variety of functions.

(15) The security system may be configured in such a manner that at least one bit of digital signal at the address input section or the data input and/or data output of the digital signal memory circuit is inverted, or is replaced by another bit, thereby realizing a confidentiality with a simple configuration.

(16) The player is provided with a storage area or a contents memory for storing contents information including a storage address corresponding to a plurality of digital signals, and a data area or a data memory accessible by the storage address, so that a digital signal as a plurality of types of information is efficiently stored in the memory.

(17) The operation of the player is controlled by designating a plurality of types of operating modes by a combination of on time or the number of turnings on, thereby realizing a miniaturization and reduced thickness of the player.

(18) The voice interval of a digitized audio signal is detected, and the digital signal inputted to a digital-to-analog converter is forcibly replaced by a signal corresponding to an AC-like 0 level during the particular voice interval, thereby eliminating a cacophonous quantizing noise.

(19) A voice interval is detected on the basis of output signals of a pair of comparators for comparing a digital signal corresponding to adjustable positive and negative levels considered voiceless with a reproduced digital signal, thereby making it possible to detect a voice interval accurately in accordance with the contents of a program of a digital signal.

(20) The voice interval of a digitized audio signal is detected and the length thereof is extended or enlarged thereby to permit a slow playback with high sound quality.

(21) The operation of updating the address of a memory having a digital signal stored therein is delayed substantially behind normal operation by a simple configuration, thereby realizing a slow playback with high sound quality.

(22) The voice interval of a digitized audio signal is detected, and by shortening the length thereof, a fast playback is made possible while maintaining a high sound quality.

(23) The operation of updating the address of a memory having a digital signal stored therein is increased in speed as compared with normal operation by a simple configuration, thereby realizing a fast playback while maintaining a high sound quality.

(24) By replacing a voice interval of a digital signal with a voice interval code data and voice interval time data, data compression is made possible, while at the same time producing a voice interval corresponding to the time data. Further, by adding a simple circuit, the time data is enlarged with a longer voice interval or neglected for playback, thus permitting fast or slow playback.

(25) At least two continuous digital signals corresponding to substantially positive and negative maximum values are combined as a voice interval code, whereby the digital audio signal and the voice interval code are discriminated easily.

(26) A maximum voice interval is set and the voice interval enlarged with the slow playback is limited not to exceed the maximum voice interval, whereby the wasteful time required for playback in slow playback mode is eliminated.

(27) The difference between an input data and an immediately preceding sampling data is determined, and in the case where the difference is larger than the maximum value of a compressed code, the maximum value is outputted, while when the difference is smaller than the maximum value, the result of subtraction is outputted thereby to output a compressed data for attaining a data compression. In this system, a data such as an acoustic signal changing in amplitude or frequency distribution comparatively gently with time can be compressed very faithfully with a simple configuration of subtraction and addition.

(28) As a result of the effect described in (27) above, a data compression or extension circuit can be realized with a simple circuit including a subtracter, an adder, a register or a comparator with minimum power consumption.

(29) By using a data conversion system and circuit as mentioned above, a small and lightweight player is realized for reproducing the acoustic signal stored in a memory.

(30) A digital input signal is stored in a memory, and the output of a counter for performing the counting operation corresponding to the maximum value of the digital input signal in response to a reference time pulse is compared with the digital signal stored in the memory thereby to form a pulse width modulated signal. This operation is repeated a plurality of times by a repeat counter, thereby producing an analog signal of high sound quality.

(31) A digital signal supplied in a predetermined period corresponding to the maximum value of the digital signal is inputted to a down counter to form a reference time pulse by a simple circuit, thereby producing a pulse width modulated signal corresponding to the digital signal.

(32) A predetermined period corresponding to the maximum value of the digital signal is formed by an up counter for performing the counting operation corresponding to the digital input signal in response to the reference time pulse, whereby a digital signal corresponding to the address conversion can be inputted with a simple configuration.

(33) Of the functions making up a memory card with a playback mechanism, a digital-to-analog converter, a low-pass filter, an amplifier and a controller except for a memory are integrated as a one-chip integrated circuit, thereby providing a very small device with extremely small power consumption. Also, the mass production is made possible with lower cost.

(34) The above-mentioned memory card with playback function is provided with the function of skipping a defective bit, whereby defective memory chips which have thus far been discarded can be used, thereby providing a device very low in cost.

(35) By providing a player conforming to the JEIDA standard, the compatibility with the existing memory cards is assured.

The present invention which has been explained above with reference to embodiments is not limited to such embodiments and various modifications are of course possible without departing from the spirit of the invention. In a digital information system, for example, a digital signal may be not only sold as a commodity but also offered free of charge to a person specified by the player as one of the services offered by securities firms, financial institutions or the like. As an alternative, the whole digital signal may be utilized for receiving/delivery of information required periodically or from time to time by a collective agreement. Also, the digital signal may be in such a form as capable of being transmitted by an audio signal like the data required for language study or memorization for various test objects.

Further, a digital information system mentioned above makes it possible to build a very efficient and timely futuristic media for supplying various information and amenities using a digital audio signal in place of the conventional newspaper, weekly magazines, etc. using prints.

The player may be constructed of a connector connectable with an extending ROM card or RAM card. In such a case, in order to prevent the player itself from being increased in thickness, the ROM or RAM card may be made up of a thin plastic card with a memory chip built therein. The ROM card is convenient for a music program or language learning. The RAM card makes up effective means for enlarging the memory capacity. The RAM card is effective, for example, when receiving a music program or the like with a long performance time.

The configuration, function, etc. of the terminal device and the player used with the digital information system may take various forms of embodiment. The memory built in the player may be a static RAM or a combination of a dynamic RAM and an automatic refresh circuit as well as a pseudo-static RAM mentioned above, or as a further alternative, may be a flash memory (EEPROM) or any of various ROMs or a small, thin rewritable optical disk.

The digital signal may be character or image information, or a combination of an audio signal and a character or image information as well as an audio signal mentioned above. For reproducing such character or audio information, a display unit is required. A display unit, though not specifically limited, may include a thin and lightweight liquid crystal display unit.

What is claimed is:

1. A digital information system comprising a digital signal source; and a memory card, having a playback function, removably connected with the digital signal source to store digital data received from said digital signal source and to reproduce the digital data stored therein independently of said digital signal source;

wherein said memory card includes a built-in memory circuit formed of a semiconductor memory for storing digital data received with addresses of said digital data from said digital signal source, and a built-in playback circuit, including at least a digital-to-analog converter, a filter circuit and an audio amplifier, for reproducing digital data stored in said memory circuit as an analog audio signal output from said memory card.

2. A digital information system according to claim 1, wherein a digital signal is received/delivered between the digital signal source and the memory card at a rate at least higher than that at which the signal is processed.

3. A digital information system according to claim 1, wherein said digital signal source includes a digital signal supply circuit for supplying digital data and a terminal device for storing digital data received from the digital signal supply circuit through a selected one of a communication channel and a storage medium, said terminal device being connected through a connector to the memory card for receiving/delivery of digital data.

4. A digital information system according to claim 3, wherein the storage capacity of the terminal device is equal to or greater than that of the memory circuit on the memory card.

5. A digital information system according to claim 3, wherein the terminal device includes a magnetic disk memory having a comparatively large storage capacity operating as a backup memory, and a buffer memory in the form of a high speed semiconductor memory for storing selected one of a digital signal received/delivered in large amount from/to the memory card and a digital signal updated with time.

6. A digital information system according to claim 3, wherein the terminal device includes means for managing a magnetic disk memory and a buffer memory and means for exchanging a digital signal with a digital signal supplied through said communication channel, said terminal device further including means for managing a storage area for said memory circuit in the memory card when connected thereto.

7. A digital information system according to claim 4, wherein the terminal device includes means for managing a magnetic disk memory and a buffer memory and means for exchanging a digital signal with a digital signal supplied through said communication channel, said terminal device further including means for managing a storage area for said memory circuit in the memory card when connected thereto.

8. A digital information system according to claim 5, wherein the terminal device includes means for managing the magnetic disk memory and the buffer memory and means for exchanging a digital signal with a digital signal supplied through said communication channel, said terminal device further including means for managing the storage area for said memory circuit in the memory card when connected thereto.

9. A digital information system according to claim 3, wherein said terminal device includes means for reproducing and outputting a part of a designated digital signal for a predetermined length of time.

10. A digital information system comprising a digital signal source; and a memory card removably connected with said digital signal source for receiving/delivery of a digital signal and having a built-in memory formed of a semiconductor memory for storing said digital signal according to an address signal received from said digital signal source, said memory card having built therein means including at least a digital-to-analog converter, a filter circuit and an audio amplifier for reproducing a digital signal stored in said memory independently of said digital signal source, said memory card further having a rechargeable battery built therein, said rechargeable battery being charged by a power supply in said digital signal source when said memory card is connected with the digital signal source.

11. A digital information system according to claim 10, wherein said memory card has a playback circuit for reading out a digital audio signal from said memory and for converting the digital audio signal into an analog audio signal.

12. A digital information system according to claim 11, in which the memory card is a selected one of a separable and a removable thin card-like storage medium.

13. A digital information system according to claim 11, wherein the playback circuit has playback conditions which are automatically designated in accordance with the contents of an ID code.

14. A digital information system according to claim 13, wherein the playback circuit has playback conditions which include at least one of stereo/monaural playback, a resolution of 8 and 16 bits and a sampling frequency.

15. A digital information system comprising a digital signal source; and a memory card, having a playback function, removably connected with the digital signal source for receiving/delivery of a digital signal, said memory card having means for receiving from said digital signal source and for storing a specified digital signal according to an address signal received from said digital signal source and means for reproducing a digital signal stored therein independently of said digital signal source, connectors for receiving/delivery of a digital signal from an external source, and an operating section for controlling said playback;

wherein said receiving and storing means includes a memory circuit in the form of a built-in semiconductor memory for storing digital signals received from said digital signal source, and said reproducing means comprises a built-in playback circuit having a digital-to-analog converter, a filter circuit and an audio amplifier for reproducing digital signals, stored in said memory circuit, as an analog audio signal and/or image signal output from said memory card via a headphone jack.

16. A digital information system according to claim 15, wherein said connectors for receiving/delivery of a digital signal conform to a selected one of the JEIDA standard and an equivalent standard.

17. A digital information system comprising a digital signal source and a memory card, having a playback function, connected with the digital signal source for receiving/delivery of a digital signal, said memory card having a memory in the form of a built-in semiconductor memory for receiving and storing a specified digital signal and a built-in playback circuit including at least a digital-to-analog converter, a filter circuit and an audio amplifier for reproducing a digital signal stored in said memory independently of said digital signal source, wherein said memory has security means for performing a selected one of the operations of inverting at least a one-bit digital signal of the input and/or output section of the memory in accordance with a selected one of a password and a password coincidence detection signal and replacing the digital signal with another bit so as to present a user from reproducing a correct digital signal.

18. A digital information system according to claim 17, wherein at least one-bit of a digital signal at the address input section of the memory is subjected by said security means to selected one of being inverted and replaced with another bit in accordance with a selected one of a password and a password coincidence detection signal, thereby preventing a user from reproducing a correct digital signal.

19. A digital information system according to claim 17, wherein said security means includes means for performing a selected one of the operations of nullifying and replacing with another bit at least one-bit of a digital signal at the output section of the memory in accordance with a selected one of a password and a password coincidence detection signal, thereby to prevent a correct digital signal from being read out from the memory card.

20. A digital information system according to claim 17, wherein said security means includes means for performing a selected one of the operations of nullifying and replacing with another bit at least one bit of a digital signal at the address input section of the memory in accordance with a selected one of a password and a password coincidence signal, thereby to prevent a correct digital signal from being read out from the memory card.

21. A digital information system according to claim 17, in which said memory is divided into given storage capacities thereby to store a plurality of different types of information, wherein a user can select a given type of information from the stored information at the time of playback.

22. A digital information system according to claim 17, wherein said memory has a storage area and a contents memory for storing contents information having storage addresses corresponding to a plurality of digital signals stored in said storage area and means for selecting one of a data area and a data memory accessible from the storage addresses.

23. A digital information system card with playback function according to claim 15, wherein said operating section designates a plurality of types of operating modes by a selected one of the on time and the number of turnings on of a single key switch.

24. A digital information system according to claim 1, said system further comprising means for performing a selected one of the operations of compressing and extending an information amount in comparison with the original information amount of a digital signal and noise-neglecting means for removing noises from said digital signal.

25. A digital information system according to claim 24, wherein said noise-neglecting means includes means for detecting a voice interval of a digitized audio signal and means for forcibly replacing the digital signal inputted to a digital-to-analog converter with a signal corresponding to an AC-like 0 level.

26. A digital information system according to claim 24, wherein said detecting means includes comparator means for comparing a digital signal with predetermined positive and negative levels which are considered voiceless as a voice interval, wherein a predetermined period within a predetermined level is considered voiceless on the basis of the result of comparison.

27. A digital information system according to claim 24, wherein said compressing and extending means includes means for detecting a voice interval of a digitized audio signal, and means for performing a slow playback.

28. A digital information system according to claim 27, wherein said means for compressing and extending includes means for enlarging the voice interval by substantially delaying the address-updating operation of a memory storing a digital signal as compared with a normal storing operation.

29. A digital information system according to claim 24, wherein said compressing and extending means includes compression means for detecting a voice interval of a digitized audio signal and for shortening the voice interval for fast playback.

30. A digital information system according to claim 29, wherein said compression means for detecting and shortening a voice interval increases the speed of the address-updating operation of the memory storing a digital signal as compared with a normal storing operation.

31. A digital information system according to claim 24, wherein said compressing and extending means includes
    means for determining the difference between an immediately preceding sampling data of a digital signal and currently input data,
    means for outputting the maximum value of compressed data when said difference is larger than the maximum value of a compressed code, and
    means for outputting the difference result on the basis of the compressed data when the difference result is smaller than the maximum value of the compressed code.

32. A digital information system according to claim 24, wherein said compressing and extending means includes extension means for extending the data of a digital signal into original data by adding an immediately preceding sampling data thereto.

33. A digital information system comprising a server including a digital signal source and a power supply terminal; and a memory card, having a playback function, removably connected with said server to store digital data received from said digital signal source and to reproduce the digital data stored therein independently of said server; wherein said memory card includes a battery serving as a power supply for the card, a terminal removably connected with said server for use in charging said battery with power from said power supply terminal, a memory circuit in the form of a built-in semiconductor memory for storing digital data received from said digital signal source, and a built-in playback circuit including at least a digital-to-analog converter, a filter circuit and an audio amplifier for reproducing digital data, stored in said memory circuit, as an analog audio signal output from said memory card via a headphone jack.

34. A digital information system comprising a digital signal source; and a memory card removably connected with said digital signal source for receiving/delivery of a digital signal and having a memory in the form of a built-in semiconductor memory for storing said digital signal, said memory card having built therein means including at least a digital-to-analog converter, a filter circuit and an audio amplifier for reproducing a digital signal stored in said memory independently of said digital signal source, said memory card further having a rechargeable battery built therein, and means for charging said rechargeable battery from a power supply in said digital signal source when said memory card is connected with the digital signal source.

35. A digital information system comprising a digital signal source operating as a server and a memory card removably connected with said digital signal source for receiving/delivery of a digital signal and its address and having a semiconductor memory for storing said digital signal according to its address, said memory card having built therein a playback circuit including at least a digital-to-analog converter, a filter circuit and an audio amplifier for reproducing a digital signal stored in said semiconductor memory as an analog audio signal independently of said digital signal source, said memory card further having a rechargeable battery which is charged by a power supply in said digital signal source when said memory card is connected with the digital signal source, wherein said playback circuit has playback conditions which are automatically designated in accordance with the contents of an identification code added to said digital signal at the digital signal source, said digital signal source including means for writing the digital signal to said semiconductor memory at a clock rate substantially higher than a read clock rate to said semiconductor memory.

36. A digital information system according to claim 35, wherein said semiconductor memory is a random access memory.

37. A digital information system according to claim 35, wherein said memory card is a pocket-size memory card.

* * * * *